US011798089B1

(12) United States Patent
Iqbal et al.

(10) Patent No.: US 11,798,089 B1
(45) Date of Patent: Oct. 24, 2023

(54) VEHICLE TELEMATICS AND ACCOUNT MANAGEMENT

(71) Applicant: Arity International Limited, Belfast (GB)

(72) Inventors: Imran Iqbal, Elgin, IL (US); Srinath Gopalan, Hoffman Estates, IL (US); Yuval Saban, Oak Park, IL (US)

(73) Assignee: Arity International Limited, Belfast (GB)

(*) Notice: Subject to any disclaimer, the term of this patent is extended or adjusted under 35 U.S.C. 154(b) by 683 days.

(21) Appl. No.: 16/507,389

(22) Filed: Jul. 10, 2019

Related U.S. Application Data

(63) Continuation of application No. 14/685,761, filed on Apr. 14, 2015 (U.S. filing date under 35 U.S.C. 384), and having an international filing date of Mar. 10, 2017, now Pat. No. 10,373,257, which is a continuation-in-part of application No. 14/505,014, filed on Oct. 2, 2014 (U.S. filing date under 35 U.S.C. 384), and having an international filing date of Mar. 10, 2017, now Pat. No. 9,754,425.

(60) Provisional application No. 61/943,200, filed on Feb. 21, 2014.

(51) Int. Cl.
*G06Q 40/08* (2012.01)
*G06Q 30/0207* (2023.01)

(52) U.S. Cl.
CPC .............. *G06Q 40/08* (2013.01); *G06Q 30/0207* (2013.01)

(58) Field of Classification Search
CPC ................................................ G06Q 40/08
USPC ................................................ 705/4
See application file for complete search history.

(56) References Cited

U.S. PATENT DOCUMENTS

| 3,594,861 A | 7/1971 | Fischer et al. |
| 5,002,283 A | 3/1991 | Langham et al. |
| 5,954,510 A | 9/1999 | Merrill et al. |

(Continued)

FOREIGN PATENT DOCUMENTS

| AU | 2008216988 A1 | 4/2010 |
| WO | 2001018531 A1 | 3/2001 |

(Continued)

OTHER PUBLICATIONS

"Auto Insurance Discounts," Liberty Mutual Insurance, Retrieved from the internet: URL: http://www.libertymutual.com/auto-insurance/auto-insurance-coverage/auto-insurance-discounts, downloaded on Jan. 8, 2014, 2 pages.

(Continued)

*Primary Examiner* — Cho Kwong
(74) *Attorney, Agent, or Firm* — Polsinelli PC

(57) ABSTRACT

Methods, computer-readable media, software, and apparatuses provide a system that may facilitate communications so that parents or other superiors may monitor driving behavior of a vehicle carrying children or other subordinates. The system may allow communications to be sent from a parent computing device to a particular child computing device to set conditions for notifying the parent or superior of the driving behavior of a vehicle. Child computing devices may collect drive data (e.g., vehicle telematics data) for the system to evaluate and determine whether conditions are met (e.g., whether parental restrictions, like a geo-fence, are violated). Further, the system may send notifications to child computing devices and parent computing devices indicating whether the drive data meets the conditions of an agreement between a parent and teen. The system may also provide a web portal for use in forming the agreement between parents and their teens.

20 Claims, 36 Drawing Sheets

(56) References Cited

U.S. PATENT DOCUMENTS

| | | | |
|---|---|---|---|
| 5,978,729 | A | 11/1999 | Landes et al. |
| 6,227,862 | B1 | 5/2001 | Harkness |
| 6,488,505 | B1 | 12/2002 | Hightower |
| 7,375,624 | B2 | 5/2008 | Hines et al. |
| 7,397,365 | B2 | 7/2008 | Wang |
| 7,659,827 | B2 | 2/2010 | Gunderson et al. |
| 7,769,629 | B1 | 8/2010 | Kriza et al. |
| 7,821,421 | B2 | 10/2010 | Tamir et al. |
| 8,085,166 | B2 | 12/2011 | Tamir et al. |
| 8,086,523 | B1 | 12/2011 | Palmer |
| 8,140,359 | B2 | 3/2012 | Daniel |
| 8,217,772 | B2 | 7/2012 | Morgan et al. |
| 8,380,640 | B2 | 2/2013 | Olsen, III et al. |
| 8,510,200 | B2 | 8/2013 | Pearlman et al. |
| 8,594,861 | B2 | 11/2013 | Rovik et al. |
| 8,653,986 | B2 | 2/2014 | Tamir et al. |
| 8,751,563 | B1 | 6/2014 | Warden et al. |
| 8,930,227 | B2 | 1/2015 | Nepomuceno |
| 9,596,287 | B2 | 3/2017 | Rybak et al. |
| 9,754,425 | B1 | 9/2017 | Iqbal et al. |
| 2002/0111725 | A1 | 8/2002 | Burge |
| 2002/0186144 | A1 | 12/2002 | Meunier |
| 2004/0210353 | A1 | 10/2004 | Rice |
| 2005/0171663 | A1 | 8/2005 | Mittelsteadt et al. |
| 2005/0173523 | A1 | 8/2005 | Yushio et al. |
| 2006/0047540 | A1 | 3/2006 | Hutten et al. |
| 2007/0005404 | A1 | 1/2007 | Raz et al. |
| 2007/0027583 | A1 | 2/2007 | Tamir et al. |
| 2007/0027726 | A1 | 2/2007 | Warren et al. |
| 2007/0174004 | A1 | 7/2007 | Tenzer et al. |
| 2007/0185728 | A1 | 8/2007 | Schwarz et al. |
| 2007/0203625 | A1 | 8/2007 | Quigley et al. |
| 2008/0065427 | A1 | 3/2008 | Helitzer et al. |
| 2008/0082372 | A1 | 4/2008 | Burch |
| 2008/0243558 | A1 | 10/2008 | Gupte |
| 2008/0255722 | A1 | 10/2008 | McClellan et al. |
| 2008/0261680 | A1 | 10/2008 | Buecheler et al. |
| 2008/0268816 | A1 | 10/2008 | Wormald |
| 2008/0270519 | A1 | 10/2008 | Ekdahl et al. |
| 2009/0024419 | A1 | 1/2009 | McClellan et al. |
| 2009/0079555 | A1 | 3/2009 | Aguirre De Carcer et al. |
| 2009/0284361 | A1 | 11/2009 | Boddie et al. |
| 2010/0030582 | A1 | 2/2010 | Rippel et al. |
| 2010/0030586 | A1 | 2/2010 | Taylor et al. |
| 2010/0157061 | A1 | 6/2010 | Katsman et al. |
| 2010/0205012 | A1 | 8/2010 | McClellan |
| 2010/0209892 | A1 | 8/2010 | Lin et al. |
| 2010/0238009 | A1 | 9/2010 | Cook et al. |
| 2010/0250021 | A1 | 9/2010 | Cook et al. |
| 2010/0280935 | A1 | 11/2010 | Fellowes et al. |
| 2010/0299021 | A1 | 11/2010 | Jalili |
| 2010/0311017 | A1 | 12/2010 | Coil et al. |
| 2010/0332266 | A1 | 12/2010 | Tamir et al. |
| 2011/0009107 | A1 | 1/2011 | Guba et al. |
| 2011/0040579 | A1 | 2/2011 | Havens |
| 2011/0059754 | A1 | 3/2011 | Cai et al. |
| 2011/0077028 | A1 | 3/2011 | Wilkes, III et al. |
| 2011/0090075 | A1 | 4/2011 | Armitage et al. |
| 2011/0106370 | A1 | 5/2011 | Duddle et al. |
| 2011/0145042 | A1 | 6/2011 | Green et al. |
| 2011/0160964 | A1 | 6/2011 | Obradovich |
| 2011/0171663 | A1 | 7/2011 | Smith et al. |
| 2011/0254655 | A1 | 10/2011 | Maalouf et al. |
| 2011/0320492 | A1 | 12/2011 | Inghelbrecht |
| 2012/0040665 | A1* | 2/2012 | Liu et al. ............ H04W 4/029 455/426.1 |
| 2012/0045452 | A1* | 2/2012 | Steuernagel et al. .... A61P 3/06 424/158.1 |
| 2012/0066007 | A1 | 3/2012 | Ferrick et al. |
| 2012/0069131 | A1 | 3/2012 | Abelow |
| 2012/0071151 | A1 | 3/2012 | Abramson et al. |
| 2012/0089423 | A1 | 4/2012 | Tamir et al. |
| 2012/0116936 | A1 | 5/2012 | Keniry et al. |
| 2012/0135382 | A1 | 5/2012 | Winston et al. |
| 2012/0140688 | A1 | 6/2012 | Hering et al. |
| 2012/0185282 | A1 | 7/2012 | Gore et al. |
| 2012/0232749 | A1 | 9/2012 | Schoenberg et al. |
| 2012/0253670 | A1 | 10/2012 | Nagda |
| 2013/0006674 | A1 | 1/2013 | Bowne et al. |
| 2013/0018677 | A1 | 1/2013 | Chevrette |
| 2013/0046562 | A1 | 2/2013 | Taylor et al. |
| 2013/0090821 | A1 | 4/2013 | Abboud et al. |
| 2013/0091452 | A1 | 4/2013 | Sorden et al. |
| 2013/0151111 | A1 | 6/2013 | Skelton |
| 2013/0164715 | A1 | 6/2013 | Hunt et al. |
| 2013/0179027 | A1 | 7/2013 | Mitchell |
| 2013/0185124 | A1 | 7/2013 | Aaron et al. |
| 2013/0204517 | A1 | 8/2013 | Raju et al. |
| 2013/0204645 | A1 | 8/2013 | Lehman et al. |
| 2013/0217331 | A1 | 8/2013 | Manente |
| 2013/0226369 | A1 | 8/2013 | Yorio et al. |
| 2013/0261874 | A1 | 10/2013 | McQuade et al. |
| 2013/0261907 | A1 | 10/2013 | McQuade et al. |
| 2013/0302758 | A1 | 11/2013 | Wright |
| 2013/0310053 | A1 | 11/2013 | Srivastava et al. |
| 2013/0311250 | A1* | 11/2013 | Hickethier et al. ... G06Q 30/0207 705/14.1 |
| 2013/0317665 | A1 | 11/2013 | Fernandes et al. |
| 2013/0337417 | A1 | 12/2013 | Nepomuceno |
| 2013/0338914 | A1 | 12/2013 | Weiss |
| 2014/0045473 | A1 | 2/2014 | Salisbury et al. |
| 2014/0059695 | A1 | 2/2014 | Parecki et al. |
| 2014/0113619 | A1 | 4/2014 | Tibbitts et al. |
| 2014/0163848 | A1 | 6/2014 | Tamir et al. |
| 2014/0195272 | A1 | 7/2014 | Sadiq et al. |
| 2014/0278574 | A1 | 9/2014 | Barber |
| 2015/0174486 | A1 | 6/2015 | Brunn |
| 2015/0274062 | A1 | 10/2015 | Wen |
| 2017/0041737 | A1 | 2/2017 | Fischer |
| 2017/0293848 | A1 | 10/2017 | Sorden et al. |

FOREIGN PATENT DOCUMENTS

| | | | |
|---|---|---|---|
| WO | 2005003885 | A2 | 1/2005 |
| WO | 2011057217 | A2 | 5/2011 |
| WO | 2011128873 | A2 | 10/2011 |
| WO | 2012109742 | A2 | 8/2012 |
| WO | 2012166059 | A2 | 12/2012 |

OTHER PUBLICATIONS

"Apps For Parents to Monitor Teen Driving Habits: Safe Driving Tools" http://blog.cochran.com/wordpress/index.php/apps-monitor-teen-drivers/ site last visited on Oct. 15, 2015.

"Auto Insurance Discounts" https://www.libertymutual.com/auto-insurance/auto-insurance-discounts, Aug. 26, 2013.

"Autonet Mobile" http://www.autonetmobile.com/apps/, last visited on Feb. 3, 2015.

"Business Mobile Phone or Vehicle Tracking" https://www.youtube.com/watch?v=-smeCZpgveU, video, last visited Feb. 3, 2015.

"Confused.com rewards good driving with a new mobile phone app" http://www.confused.com/press/releases/confused-com-rewards-good-driving-with-a-new-mobile-phone-app, last visited Feb. 10, 2015.

"Driver Awards" http://w3.primeinc.com/driver-awards, last visited Feb. 10, 2015.

"GTA-SanAndreas.com-Driving School Guide" http://www.gta-sanandreas.com/guides/drivingschool/. Aug. 26, 2013.

"Guidelines for Employers to Reduce Motor Vehicle Crashes" https://www.osha.gov/Publications/motor_vehicle_guide.html, Aug. 26, 2013.

"mbrace Your World, From Your Car" Mercedes-Benz mbrace, #1527 Rev. Aug. 13, 2013.

"Parents Invent Device to Track Teen Driving Habits" http://www.autobiog.com/2014/03/12/parents-invent-device-to-track-teen-driving-habits/ May 12, 2014.

"Teen GPS Tracking" http://gpsandtrack.com/teen-gps-tracking/, last visited Nov. 12, 2013.

"Teen Vehicle Tracking" http://www.safewatch360.com/applications/family-personal/teenvehicletracking/ site last visited on Oct. 15, 2015.

"The Safe Driver App from AAMI" http://www.aami.com.au/car-insurance/safe-driver-smartphone-app.html site last visited on Oct. 15, 2015.

(56) References Cited

OTHER PUBLICATIONS

"Ways To Get Affordable Auto Insurance" http://www.21st.com/auto-insurance-information/discount-car-insurance.htm, 21st Century Insurance, last visited on Feb. 10, 2015.
"Zubie | Making Driving Easier, Safer and Less Expensive" http://zubie.com/ site last visited on Oct. 15, 2015.
Apr. 4, 2017 - (US) Non-Final Office Action - U.S. Appl. No. 14/883,186.
Aug. 16, 2017 - (US) Office Action - U.S. Appl. No. 14/685,761.
Aug. 28, 2018- (US) Notice of Allowance - U.S. Appl. No. 16/381,688.
Aug. 30, 2018 - (US) Non-Final Office Action - U.S. Appl. No. 16/011,312.
Chris Tijerina, "How Your Auto Insurance Rates Are Determined", Ezine Articles, date unknown captured May 9, 2012.
Computer Weekly Website, "How pay-as-you-behave technology could transform car insurance", published Apr. 4, 2011.
Dec. 4, 2015 - (US) Non Final Rejection - U.S. Appl. No. 14/505,014.
Feb. 21, 2019 - (US) Non-Final Office Action - U.S. Appl. No. 15/661,748.
Golden State Mutual Life Website; "Introducing Universal Life Insurance", www.gsmlife.com/universallife-Conserv.htm date unknown, captured May 9, 2012.
Jan. 4, 2018 - (US) Final Office Action - U.S. Appl. No. 14/685,761.
Jan. 14, 2019 - (US) Notice of Allowance - U.S. Appl. No. 16/011,312.
Jul. 12, 2017 - (US) Notice of Allowance - U.S. Appl. No. 14/883,186.
Jul. 15, 2019- (US) Notice of Allowance - U.S. Appl. No. 15/661,748.
Jun. 7, 2017 - (US) Corrected Notice of Allowability - U.S. Appl. No. 14/505,014.
Jun. 27, 2016 - (US) Office Action - U.S. Appl. No. 14/505,014.
Manitoba Public Insurance, "Moving Toward a Better Driver Rating System" dated 2008.
Mar. 25, 2019 - (US) Notice of Allowance - U.S. Appl. No. 14/685,761.
Mar. 29, 2018 - (US) Notice of Allowance - U.S. Appl. No. 15/861,884.
May 13, 2021 - (US) Notice of Allowance - U.S. Appl. No. 16/600,941.
May 15, 2017 - (US) Notice of Allowance - U.S. Appl. No. 14/505,014.
May 16, 2019 (US) Non-Final Office Action - U.S. Appl. No. 16/381,688.
Megan Kowalski et al. "Apps, etc. remotely monitor teen drivers" http://www.usatoday.com/story/money/cars/2013107/17parents-monitor-teen-driving/2482753 Jul. 18, 2013.
Michael P. O'Donnell, "Should Employees Get Insurance Discounts for Completing Wellness Programs?" http://www.wsj.com/articles/SB10001424127887324610504578273673319849976 Feb. 18, 2013.
Non-Final Office Action for related U.S. Appl. No. 13/770,622 mailed Sep. 29, 2014. (6591.494).
Notice of Allowance for related U.S. Appl. No. 13/770,622 mailed Feb. 12, 2015.
Nov. 3, 2016 - (US) Non-Final Office Action - U.S. Appl. No. 14/505,014.
Nov. 16, 2018 - (US) Non-Final Office Action - U.S. Appl. No. 14/685,761.
Oct. 4, 2017 - (US) Notice of Allowance - U.S. Appl. No. 14/883,186.
Rob Schneider,"Insurance Underwriting and Credit Scores", Consumer Union, Jan. 2003.
Robin Harbage, "Usage-based Auto Insurance (UBI)" © 2010 Towers Watson.
"ABF Proudly Recognizes 4944 Drivers Who Have Earned Safe Driving Awards", http://www.abfs.com/about/news/employee/safedriving.asp, Aug. 26, 2013.
"Commercial Motor Vehicle Driver Retention and Safety" U.S. Department of Transportation Federal Motor Carrier Safety Administration, Publication No. FMCSA-RT-04-002 Oct. 2003.
Farmers Essential Life Â® Universal Life Website; "Universal Life Insurance Designed To Be Flexible To Fit Your Needs", www.farmers.com/universal_life_insurance.html; date unknown, captured May 9, 2012.
MyDrive Solutions website, "How does MyDrive work?", date unknown, captured May 9, 2012.
Neighborhood Link Website, Your Credit Score Affects Your Auto Insurance Rates, date unknown captured May 9, 2012.

\* cited by examiner

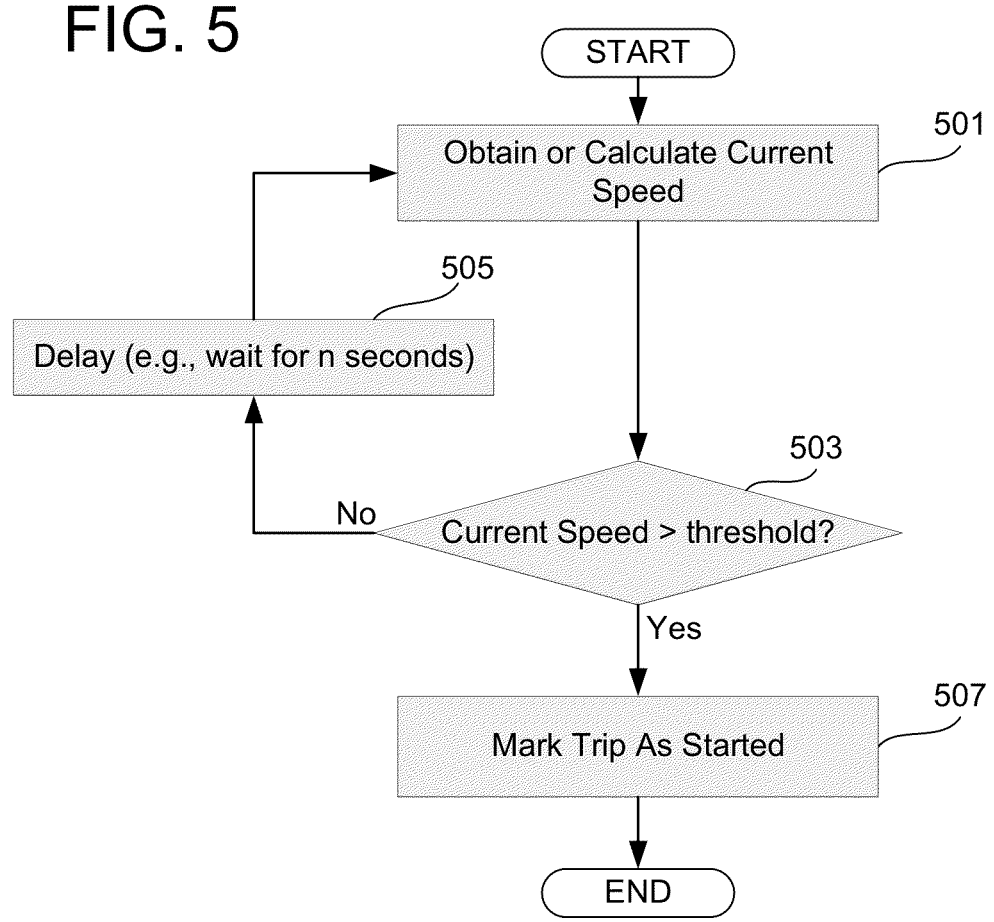

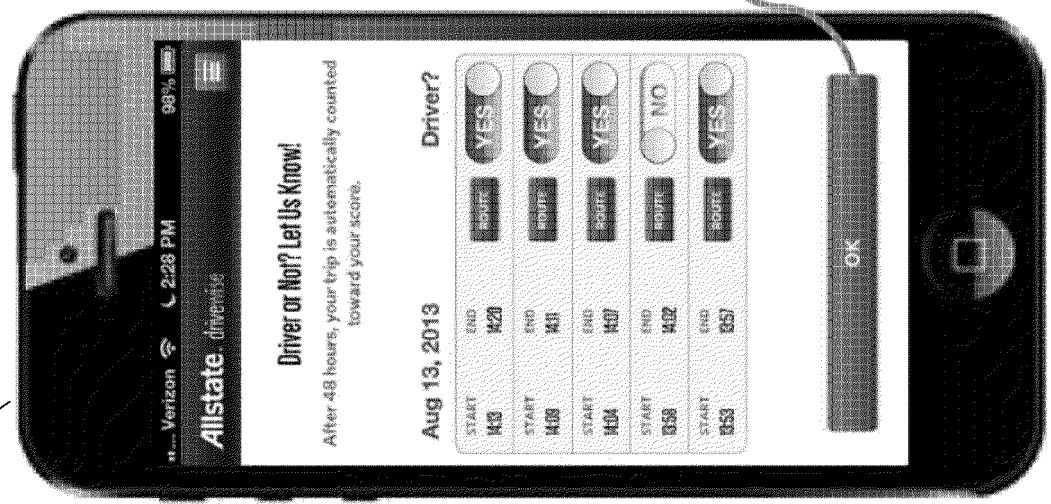
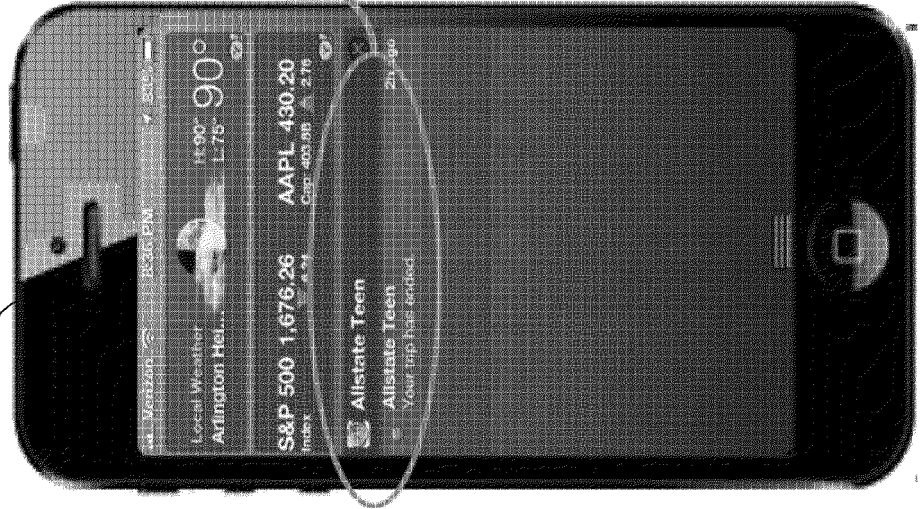
FIG. 12

VEHICLE TELEMATICS AND ACCOUNT MANAGEMENT

CROSS REFERENCE TO RELATED APPLICATION

This application is a continuation of and claims priority to U.S. Pat. Application No. 14/685,761, filed Apr. 14, 2015 and entitled "Vehicle Telematics and Account Management," which is a continuation-in-part of and claims priority to U.S. Pat. Application No. 14/505,014, filed Oct. 2, 2014 and entitled "Vehicle Telematics and Account Management," which is a non-provisional of and claims priority to U.S. Pat. Application No. 61/943,200, filed Feb. 21, 2014 and entitled "Vehicle Telematics and Account Management." The entire contents of each of the aforementioned applications are hereby incorporated by reference herein.

FIELD OF ART

Aspects of the disclosure generally relate to methods and computer systems, including one or more computers particularly configured and/or executing computer software. More specifically, aspects of this disclosure relate to a system for capturing, evaluating, and communicating vehicle telematics.

BACKGROUND

People and organizations, such as auto-insurance companies, are interested in collecting vehicle telematics data. Vehicle telematics data includes various data from measurements related to a vehicle's operation. For example, vehicle telematics data may include global positioning system (GPS) coordinates of an automobile that allow the location of the automobile to be tracked. Also, for example, vehicle telematics data may include acceleration data of an automobile that allow the speed of the automobile to be tracked. Auto-insurance companies are interested in this information because they would like to evaluate the risk of customers and potential customers. Other organizations may also be interested in such information to determine a person's behavior. Moreover, parents or other guardians may also be interested in monitoring a vehicle carrying their children or other dependents.

Some vehicles have been equipped with devices for collecting some vehicle telematics data. However, this vehicle telematics data might not be obtained by people and/or organizations remote from the vehicle in real time or while a vehicle is moving. Moreover, vehicle telematics data might not be evaluated in real time or while the vehicle is moving so it may be difficult for people and organizations to take action in response to the vehicle telematics data in a timely manner. In some cases, people or organizations wishing to monitor a vehicle may be unaware that the vehicle is in use (e.g., moving).

As technology advances and adoption of such technology increases, more and more vehicle telematics data may be collected and more and more people may desire access to this data. As such, challenges for making this vehicle telematics data user-friendly and readily accessible may emerge. Specifically, challenges may include implementing a manner for regulating an amount of vehicle telematics data collected, for organizing this data, and for controlling when, how, and what data is reported. Different people and different organizations may want different information reported to them. As more and more vehicle telematics data becomes available, it becomes more difficult to strike a balance between providing too much information and too little information. On one hand, reporting too much information may cause people and organizations to ignore desired information, and therefore, may be detrimental to the effectiveness of monitoring vehicle behavior. On the other hand, reporting too little information may cause false alarms or unnecessary concern for people and organizations that are monitoring a vehicle.

Accordingly, new systems, devices, methodologies, and software are desired to collect and communicate vehicle telematics data. Further, new systems, devices, methodologies, and software are desired to evaluate and share the vehicle telematics data in real time or while a vehicle is moving. In particular, new systems, devices, methodologies, and software are desired to provide people and organizations a means to monitor vehicle behavior and respond to vehicle behavior in a timely manner (e.g., in real time or while the vehicle is moving). For example, parents may desire a tool for monitoring a vehicle carrying their teenage son or teenage daughter. Further, as mentioned above, different people and different organizations may want different information, and thus, new systems, devices, methodologies, and software are desired to allow people and organizations control over when, how, and what information is reported.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for providing a vehicle telematics management system that may facilitate communications so that parents or other superiors may monitor driving behavior of a vehicle carrying children or other subordinates. The system may allow communications to be sent from a parent computing device (e.g., a smartphone of a parent) to a particular child computing device (e.g., a smartphone of a child) to set conditions for notifying the parent of the driving behavior of a vehicle. Further, the system may allow notifications to be sent from child computing devices to corresponding parent computing devices to alert parents when conditions are met. In some cases, notifications may be transmitted from the child computing device while the child (e.g., teenager) is driving. As such, notifications of driving violations may be sent in real time as they occur.

The system may also implement features, e.g., automatic detection of a start and end of a vehicle trip and determination of a driver of the vehicle, to allow control over when notifications are sent to parents and other superiors to avoid overwhelming the parents or other superiors with notifications. The system may also provide notifications to reduce misunderstandings and false alarms and to deter children and other subordinates from attempting to circumvent being tracked.

Aspects of this disclosure provide a system comprising a first computing device associated with a first user in a vehicle and a second computing device associated with a second user. In some embodiments, the first user may be a child (e.g., teenager) and the first computing device may be the child's smartphone, while the second user may be a parent of the child and the second computing device may be the parent's smartphone. The first computing device may be configured to collect drive data (e.g., vehicle telematics data) representing a driving behavior of the vehicle. The first computing device may also be configured to transmit information based on the drive data. Moreover, the first computing device may be configured to transmit a notification indicating that the first computing device will stop transmitting the information and a reason (e.g., because a user shutdown a program or a battery of the first computing device died) that the first computing device will stop transmitting the information. Meanwhile, the second computing device may be configured to receive the information to monitor the driving behavior of the vehicle and to receive the notification. The system may further include a third computing device. The third computing device may be a server or other computing device connected to the first and second computing devices via a network (e.g., including the Internet). The third computing device may be configured to receive the information from the first computing device; identify that the second computing device corresponds to the first computing device; and transmit the information to the second computing device.

Aspects of the disclosure also provide the computing devices of the system as well as the computer readable media of those computing devices that store one or more programs for implementing features of the system. For example, aspects of the disclosure provide a computing device (e.g., a server), comprising a network interface configured to communicate, via a network (e.g., the Internet and/or a cellular backhaul), with one or more first computing devices and one or more second computing devices. The computing device may also include at least one processor. The at least one processor may be configured to receive, via the network interface from a first computing device from among the one or more first computing devices, information reflecting a performance of a driver driving a vehicle. The at least one processor may also be configured to identify a second computing device, from among the one or more second computing devices, that corresponds to the first computing device; and transmit the information to the identified second computing device. Moreover, the at least one processor may be configured to transmit, to the second computing device, a notification indicating that the first computing device will stop transmitting the information and a reason that the first computing device will stop transmitting the information. In some examples, the at least one processor may access, read, and write data to a particular memory device. The memory device may store computer-executable instructions of a vehicle telematics management program. The computing device may include the memory device or the memory device may be separate from the computing device. The computing device may also have access to other memory (e.g., databases) that store associations between the first computing devices and the second computing devices.

Aspects of the disclosure further provide a method including of automatically detecting, by a computing device (e.g., a smartphone), a start of a trip of a vehicle carrying a user associated with the computing device. The method may also include determining whether the user is driving the vehicle during the trip. Further, the method may include transmitting, during the trip, information reflecting a driving performance of the user after determining that the user is driving the vehicle. Detecting the start of the trip of the vehicle may include determining whether a speed of the vehicle exceeds a predetermined threshold (e.g., 15 miles per hour). In addition, the method may further include a step of transmitting a notification indicating that the computing device will stop transmitting the information and a reason that the computing device will stop transmitting the information. For example, in one case, a first notification may be transmitted to indicate that a program on the computing device has closed or is closing because of a user selection (e.g., a user selection to shut down the program). In another case, a second notification (which may be different from the first notification) may be transmitted to indicate that the program on the computing device has closed (or is closing) or is in a sleep mode because a power level of a battery of the computing device is low.

Further aspects of the disclosure relate to an account management system that may be integrated with a vehicle telematics management system. The account management system may use vehicle telematics data collected and processed by the vehicle telematics management system. The account management system may be considered to have two primary components: a rewards program component and a service (e.g., value-added service) component. The rewards program component refers to the account management system's potential to implement a rewards program to encourage or incentivize safe driving behavior. The account management system may inform users (e.g., drivers, parents of drivers, etc.) of available rewards, issue rewards when earned, track rewards, and allow for rewards to be redeemed. Rewards may be tangible (e.g., gifts) or intangible (e.g., a virtual reward, such as "badges," "miles," points, etc.).

The service component of the account management system refers to the account management system's potential to provide a service to users (e.g., customers such as insurance policy holders) that allows users to monitor driving behavior. In particular, the service may be designed to encourage or incentivize novice drivers, such as teenagers, to drive safely and get parents involved in monitoring their child's driving. By providing such a service (also referred to herein as the teen safety service), the service provider (e.g., an insurance company) may increase interactions with users, engage users in a positive environment (e.g., helping parents monitor their teen's driving), and build user loyalty. While the service may provide benefits that assist in retaining users (e.g., may improve customer retention), it may also cut down on the service provider's costs (e.g., insurance costs) by encouraging safe driving behavior. Safe driving may lead to fewer accidents thereby reducing costs of insuring users. Further, by involving parents in the monitoring process, service providers (such as insurance companies) can reduce the burden of having to analyze vehicle telematics data themselves.

Aspects of this disclosure provide a system including a first computing device associated with a first user in a vehicle, where the first computing device (e.g., a smartphone or other mobile device) is configured to collect drive data representing a driving behavior of the vehicle, and transmit information based on the drive data. The system may also include a second computing device configured to evaluate the drive data for compliance with an agreement between the first user and a second user. Moreover, the system may include a third computing device configured to provide a web portal for establishing the agreement. Also, the second computing device may be further configured to provide a user interface configured to accept information used to form the agreement. The information used to form the agreement may include at least one of: information defining times when the first user is permitted to drive, information defining where the first user is permitted to drive, or information defining how the first user is permitted to drive. The information used to form the agreement may also comprise information defining one or more rewards for meeting at least one term of the agreement or information defining one or more penalties for breaching at least one term of the agreement. The second computing device may be further configured to track the one or more rewards or one or more penalties. Additionally or alternatively, the second computing device may be further configured to determine a risk associated with the first user based on a compliance or lack thereof with the agreement. Further, the second computing device may also be configured to determine an insurance premium associated with the first user based on a compliance or lack thereof with the agreement. Also, the second computing device may be further configured to determine an advertisement based on information obtained from the agreement and to provide the advertisement to the first user. Additionally or alternatively, the second computing device may be further configured to compare information from the agreement with information representing a driving history of the first user and to offer an insurance rate to a second user based on a result of the comparison.

Aspects of this disclosure provide a method for issuing driving challenges to, for example, students learning to drive. In one embodiment, the method may include receiving, at a server, drive data from a first computing device (e.g., cell phone, tablet, PDA, OBD plug-in device, etc.) associated with a first user driving a vehicle. The drive data may include an identifier (e.g., phone number, PIN number, etc.) identifying the first computing device. The method may also include identifying a contract associated with the first user based on the identifier, and retrieving (from a database, e.g., an insurance company storage device) contract information of the contract. The method may also include receiving, at the server, a request for a challenge, and in response to the request, determining a particular challenge based on the contract information and transmitting the particular challenge to the first computing device. Subsequently, the server may receive additional drive data from the first computing device. As such, the method may include determining whether the first user passed the particular challenge based on the additional drive data. The method may also include determining, by the server, whether to issue a reward to the first user based on whether the first user passed the particular challenge.

In the method just described, the contract information may include information describing at least one term related to a driving behavior with which the first user agreed to comply. Also, in some embodiments, he request may come from the student, a parent or coach of the student, or another entity (e.g., an agent of an insurance company). For example, the receiving of the request may include receiving a driver request for the challenge from the first computing device, receiving a parent request for the challenge from a second computing device associated with a parent who is a party to the contract, or receiving an insurance company request for the challenge from a third computing device associated with an insurance company managing the server. Also, the determining the particular challenge based on the contract information may include determining, based on the contract information, that the first user is on probation for violating the contract (e.g., for driving outside a geo-fence, exceeding a speed limit or other threshold, driving around a corner too fast, etc.), and selecting, as the particular challenge, a challenge designated for users on probation (e.g., a challenge to drive for one week without breaking the speed limit or another threshold).

The method may further include tracking a number of trips that the first user drives. The particular challenge may be a challenge to comply with a driving condition for a predetermined number of trips, and so the determining whether the first user passed the particular challenge may include 1) determining that the first user has driven the predetermined number of trips, and 2) determining whether the first user complied with the driving condition for the predetermined number of trips. This determination may be performed because the server may keep track of the number of trips taken.

The method may also include, in response to determining to issue the reward to the first user, determining the reward (e.g., a badge specific to a particular challenge, such as a speed badge for a challenge to drive below a certain speed) based on at least one of the contract information or another reward previously selected by the first user. In addition, the method may further include tracking results of multiple challenges issued to the first user, and in response to determining that the first user failed the particular challenge, determining whether the first user breached a term of the contract specifying a number of challenges that the first user cannot fail. For example, if the contract specifies that the first user will breach the contract by failing 5 or more challenges, the server may keep track of the number of challenges to determine if this condition is met.

In some embodiments, the method's step of determining the particular challenge may include determining a type of the particular challenge and a difficulty level of the particular challenge. Also, in some embodiments, the method may include tracking a tier associated with the first user. The tier may represent or otherwise indicate progress of the first user's driving skills. The difficulty level of a challenge may be determined based on the tier. Difficulty levels may increase over time. For example, the difficulty level of a current challenge issued to the first user may be greater than a previous difficulty level of a previous challenge issued to the first user.

Additionally, aspects of this disclosure include a system for issuing driving challenges to, for example, students learning to drive. In some implementations, the system may include a database (including, e.g., RAM, ROM, and any other data storage media) storing information for each of a plurality of contracts. The system may also include a first computing device (e.g., cell phone, tablet, etc.) associated with a first user driving a vehicle. The first computing device may be configured to: collect drive data representing a driving behavior associated with the vehicle; transmit the drive data and an identifier identifying the first computing device; receive a particular challenge; and transmit additional drive data pertaining to the particular challenge. The system may also include a server configured to: identify a contract associated with the first user based on the identifier; retrieve, from the database, contract information of the contract; receive a request for a challenge; in response to the request, determine the particular challenge based on the contract information; transmit, to the first computing device, the particular challenge; receive, from the first computing device, the additional drive data; determine whether the first user passed the particular challenge based on the additional drive data; and determine whether to issue a reward to the first user based on whether the first user passed the particular challenge.

In this system, the determining the particular challenge based on the contract information may include determining, based on the contract information, that the first user is on probation for violating the contract; and selecting, as the particular challenge, a challenge designated for users on probation.

In some embodiments of this system, the server may be further configured to track results of a plurality of challenges issued to the first user; determine assign a probation status to the first user in response to determining that the first user failed the particular challenge; and transmit, to the first computing device, a probation challenge designated for users with the probation status.

Additionally, or alternatively, in some embodiments of this system, the server may be further configured to track a tier associated with the first user (the tier representing progress of the first user's driving skills). Also, in some embodiments of this system, the server may be configured to determine the particular challenge further based on a location of the vehicle and a route that the vehicle is set to travel.

Aspects of this disclosure also provide a computing device to facilitate the issuing of driving challenges. Such a computing device may include a network interface configured to communicate, via a network, with one or more additional computing devices. The computing device may also include at least one processor configure to cause it to perform various functions. For example, the computing device may receive, via the network interface from a first computing device associated with a first user driving a vehicle, drive data reflecting a driving performance of the first user driving the vehicle. The computing device may also identify a contract associated with the first user; retrieve, from a database in communication with the computing device, contract information of the contract; determine a particular challenge based on the contract information and the drive data; and transmit, via the network to the first computing device, the particular challenge. The computing device may then receive, via the network from the first computing device, additional drive data; determine whether the first user passed the particular challenge based on the additional drive data; and determine whether to issue a reward to the first user in response to determining that the first user passed the particular challenge.

In response to determining to issue the reward to the first user, the computing device may retrieve an insurance premium associated with the first user from an insurance policy stored on an insurance company database, and determine an amount by which to decrease the insurance premium. Also, in response to determining that the first user failed the particular challenge, the computing device may determine whether the first user is to be put on probation. And, in response to determining that the first user is to be put on probation, the computing device may determine a probation challenge designated for users on probation, and transmit, to the first computing device, the probation challenge.

In some examples, the computing device may, prior to transmitting the particular challenge, receive, from a second computing device associated with a person who is a party to the contract, a request to issue a challenge to the first user.

In some embodiments, the computing device may be configured to track results of a plurality of challenges issued to the first user; and to, in response to determining that the first user passed the particular challenge, determine whether the first user met a term of the contract specifying a number of challenges that the first user must pass to earn a reward. As such, for example, if the contract states that a user should receive a certain reward for passing ten challenges, the computing device may determine that a user passed ten challenges and assign the user the appropriate reward.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which:

FIG. 5 illustrates a flow diagram of an example process in accordance with aspects of the present disclosure.

FIGS. 10-15 illustrate diagrams of example interfaces presented by computing devices configured according to aspects of the present disclosure.

FIG. 18 illustrates another example webpage provided by a web portal in accordance with the present disclosure.

FIG. 20 illustrates another example webpage provided by a web portal in accordance with the present disclosure.

DETAILED DESCRIPTION

Figure 1:
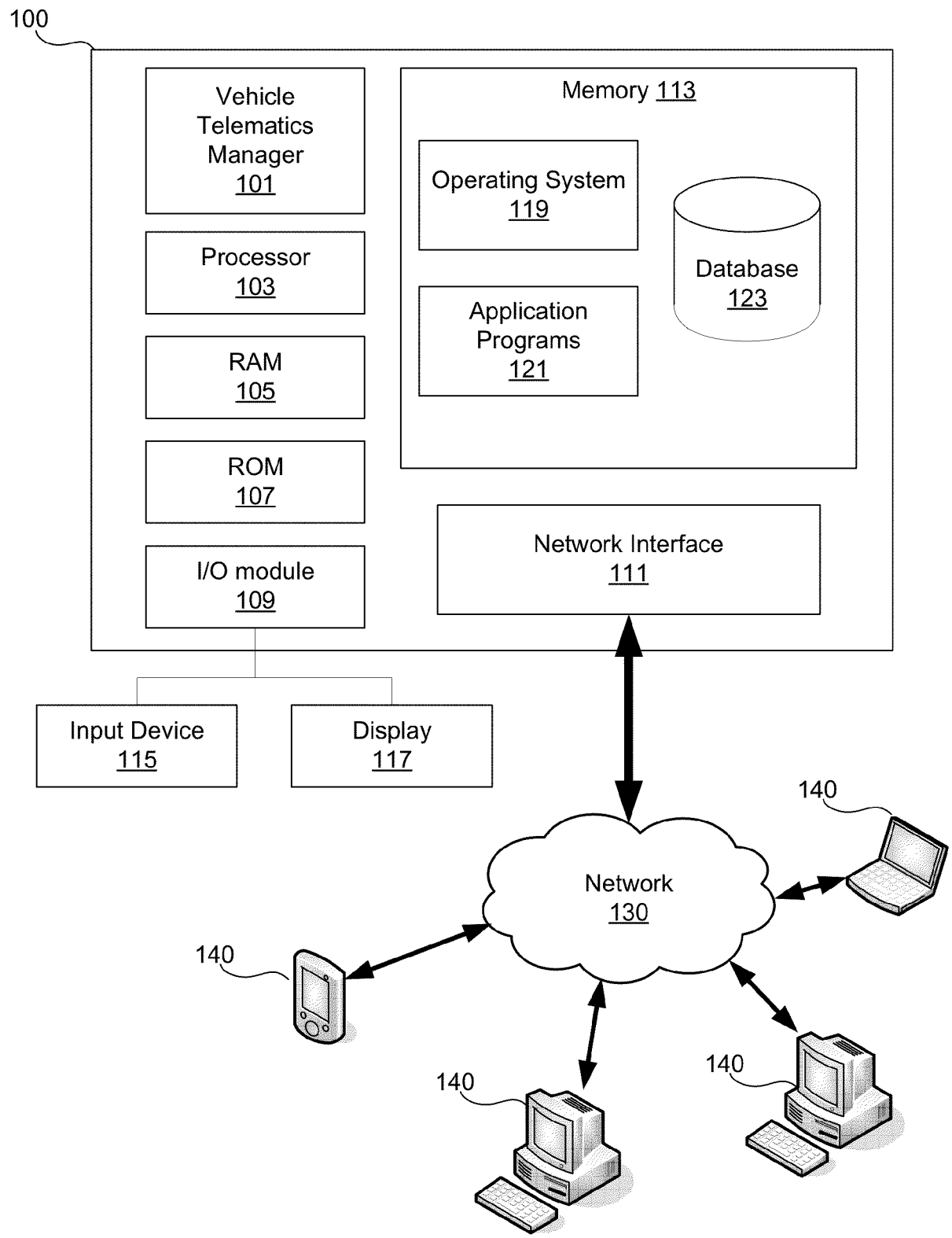
FIG. 1 is a block diagram of an example computing device that may be used according to an illustrative embodiment of the present disclosure.

In accordance with various aspects of the disclosure, methods, computer-readable media, software, and apparatuses are disclosed that provide a vehicle telematics management system for collecting, evaluating, and communicating vehicle telematics. The vehicle telematics management system may allow people and/or organizations to monitor operations of a vehicle carrying certain individuals. For example, the vehicle telematics system may allow a parent, guardian, caretaker, superior, etc. to monitor the behavior of a vehicle carrying a child, subordinate, etc. In particular, the vehicle telematics data may be suited to allow a parent to monitor the driving behavior of his/her teenage son or daughter. The vehicle telematics management system may evaluate vehicle telematics data and communicate notifications to a parent, guardian, caretaker, superior, etc. if certain conditions are met. For example, the system may transmit notifications to a parent or other superior if restrictions are violated (e.g., driving outside a geo-fence, driving at high speeds, braking too hard, cornering too hard, etc.). Other uses of the vehicle telematics management system include allowing an auto-insurance company or rental car company to monitor the behavior of its customers, potential customers, or others operating a vehicle that it covers. The vehicle telematics management system may evaluate vehicle telematics data and communicate notifications to an auto-insurance company or rental car company if certain conditions are met, such as the violations of one or more restrictions (e.g., speed restrictions, acceleration/deceleration restrictions, etc.).

The vehicle telematics management system may be implemented using mobile user devices (e.g., smartphones). For example, a driver's smartphone may be configured to collect and evaluate vehicle telematics data. When certain restrictions are violated, the driver's smartphone may be configured to transmit a notification to one or more other devices. In particular, the driver's smartphone may transmit a notification to a parent's smartphone indicating a violation of a restriction, which may be imposed by the parent. Some aspects include transmitting a notification after a hard-braking event occurs, a vehicle exceeds a certain speed, and/or the vehicle exits a geo-fence. In some embodiments, the child computing devices may transmit (intermittently, periodically, continuously, etc.) raw data to a central computing device, which may analyze the raw data. The central computing device may determine whether any conditions (e.g., parental restrictions) have been met and whether notifications should be sent. The central computing device may then cause transmission of the appropriate notification to the appropriate devices (child computing device, parent computing device, or both).

The vehicle telematics management system may be customizable so that notifications may be controlled. For example, a parent may set which notifications they want to receive (e.g., speeding notifications, hard-braking notifications, etc.), when they want to receive them (e.g., over a certain speed, over a certain hard-braking threshold, etc.), and how they want to receive them (in a text message, email, audible alarm, etc.).

The notifications may be sent as driving events take place (e.g., in real time). For example, a parent may receive notifications of their child's driving behavior while the child is driving. As a result, the parent or other superior may take a desired action in a timely manner. Aspects of the vehicle telematics management system may facilitate communication from the parent (or superior) to their child (or subordinate) soon after a violation occurs (e.g., during the same trip). In some embodiments, aspects of the system may allow a parent (or superior) to change parameters during the trip (e.g., change a geo-fence). For example, a parent may expand a geo-fence if their child is driving well or desires to circumvent traffic, or may reduce a geo-fence if they do not approve of their child's driving. Other aspects of the system may include notifying the child (or subordinate) of their violation, deducting points/money from an account when a violation occurs, and/or disabling (e.g., shutting down) the vehicle that committed the violation.

The vehicle telematics management system may also automatically detect when a vehicle starts and stops thereby facilitating collection of vehicle telematics data. For example, a child's smartphone may execute an application in the background so that it may automatically detect when the child is in a moving vehicle. As such, a number of steps to be performed by the child for the collection of vehicle telematics data may be reduced and parents (or other superiors) may reliably receive notifications. In other words, aspects of the system may reduce the likelihood that a child or other subordinate forgets to or intentionally chooses not to allow notifications to be sent to their parents or superiors.

Further, the vehicle telematics management system may cut back on false alarms or other misunderstandings. For example, the system may send notifications indicating whether a program on the smartphone is terminated (or otherwise suspended) intentionally or due to lack of battery power. As a result, parents and other superiors may be able to determine whether their respective child or subordinate is attempting to circumvent their restrictions and/or avoid being monitored. Parents and superiors may be able to distinguish such behavior from a situation in which their child or subordinate is not sending notifications because their mobile devices are out of battery power.

As described herein, aspects of the vehicle telematics management system may be accomplished by implementing a suite of computer programs. Different programs of the suite of programs may be executed by different devices to perform different functions. For example, child computing devices may execute child device programs while parent computing devices may execute parent device programs. While different programs may be installed and executed on different devices, any device disclosed herein may execute any of the programs. Further, in some embodiments, the suite of programs may be implemented as different modules of a single program and the different devices may execute the different modules. For example, a child computing device may execute a child device module of a vehicle telematics management program, while a parent computing device may execute a parent device module of the same vehicle telematics management program. A computing device may determine which module to execute based on a setting that is, e.g., selected by a user when initially activating the program.

In accordance with various aspects of the disclosure, additional methods, computer-readable media, software, and apparatuses are disclosed that provide an account management system for engaging users (e.g., insurance policy holders, such as parents, and their dependents, such as teenagers), inviting users to access their account, studying users while they access their account, offering users products and services while they access their account, and allowing users to edit their account. One aspect of the account management system includes a web portal providing an interactive webpage (or a plurality of interactive webpages) that parents and/or their children may use to form an agreement or contract. The agreement or contract (also referred to as a safe driving agreement) may include terms for operating a vehicle. For example, the safe driving agreement may set forth times when a vehicle should be driven, where a vehicle may be driven (e.g., within a geo-fence), and how a vehicle should be driven (e.g., how safely as measured by speed data, braking data, cornering data, etc.). Additionally, the safe driving agreement may include information regarding the parties of the safe driving agreement (e.g., parents and/or their children), rewards (tangible and/or virtual) for meeting the terms of the safe driving agreement, and penalties for breaching the safe driving agreement. Another aspect of the account management system includes tracking rewards and/or penalties and allowing rewards to be redeemed.

The ability of the interactive webpage(s) to form the safe driving agreement may draw traffic to an organization's (e.g., insurance company's) website. Further, the interactive webpage(s) offer an organization another point of interaction with their customers. While customers are establishing their safe driving agreement, the organization may study their habits (e.g., by collecting web analytics) and/or offer additional products and services.

The account management system may also allow others (e.g., administrators, managers, etc. of an organization, such as an insurance company) to enhance a user's experience with their account and to modify the account to make corrections and update information. The account management system may give analysts (e.g., insurance company analysts) another source of information for determining risk assessments of insured customers. For example, an analyst may determine that teenagers who break a safe driving agreement with their parents may be more likely to take risks while driving, and thus, may be a greater potential liability than teenagers who abide by the safe driving agreement they make with their parents.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

In one or more arrangements, teachings of the present disclosure may be implemented with a computing device. FIG. 1 illustrates a block diagram of an example computing device 100 that may be used according to an illustrative embodiment of the present disclosure. The computing device 100 may be similar to any available computing device, such as a personal computer (e.g., a desktop computer), server, laptop computer, notebook, tablet, smartphone, etc. The computing device 100 may have a vehicle telematics manager 101 for performing methods and executing instructions of the vehicle telematics management program(s) described herein (e.g., parent device program and/or child device program). The vehicle telematics manager 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the vehicle telematics manager 101 may refer to the software and/or hardware used to implement the vehicle telematics manager 101. In cases where the vehicle telematics manager 101 includes one or more processors, such processors may be specially configured to perform the processes disclosed herein. Additionally, or alternatively, the vehicle telematics manager 101 may include one or more general processors configured to execute computer-executable instructions, which may be stored on a storage medium, to perform the processes disclosed herein. In some examples, the computing device 100 may include one or more general processors 103 in addition to, or instead of, the vehicle telematics manager 101. The general processor(s) 103 may be configured to operate in conjunction with vehicle telematics manager 101. Both the vehicle telematics manager 101 and the general processor 103 may be capable of controlling operations of the computing device 100 and its associated components, including RAM 105, ROM 107, an input/output (I/O) module 109, a network interface 111, and memory 113. For example, the vehicle telematics manager 101 and general processor 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100, however, they may be within the same structure. Using the input device 115, system administrators may update various aspects of the vehicle telematics management program, such as rules for collecting vehicle telematics data, rules for detecting vehicle starts and stops, rules for detecting violations of restrictions, and rules for communicating notifications, warnings, and parameter changes, such as what information should be communicated in these communications and what data structures to use for these communications. On some computing devices 100, the input device 115 may be operated by users (e.g., children and other subordinates and parents and other superiors) to interact with the vehicle telematics management program, including providing user information and/or preferences, vehicle information (e.g., make and model of a vehicle), account information, parameters for setting restrictions, warning/suggestion messages, etc., as described in further detail below. System administrators may use the input device 115 to make updates to the vehicle telematics management system, such as software updates. Meanwhile, the display device 117 may assist the system administrators and users to confirm/appreciate their inputs.

The memory 113 may be any computer readable medium for storing computer executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN), such as the Internet, a cellular network, or satellite network. Through the network 130, the computing device 100 may communicate with one or more other computing devices 140, such as laptops, notebooks, smartphones, personal computers, servers, etc. The computing devices 140 may also be configured in a similar manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

FIG. 1 is an example embodiment of a computing device 100. In other embodiments, the computing device 100 may include fewer or more elements. For example, the computing device 100 may use the general processor(s) 103 to perform functions of the vehicle telematics manager 101, and thus, might not include a separate processor for the vehicle telematics manager 101. Or, for example, the computing device 100 may be a mobile device (e.g., a smartphone, tablet, etc.), and thus, may also include various other components, such as a battery, speaker, and/or antennas (not shown). Also, the computing device 100 may be a vehicle computing device 100 (either installed by a vehicle manufacturer or as an aftermarket part) having vehicle compatible elements, such as a port for an on-board diagnostic connector or ports for other vehicle sensors (e.g., tire pressure sensors, engine temperature sensors, etc.).

Figure 2:
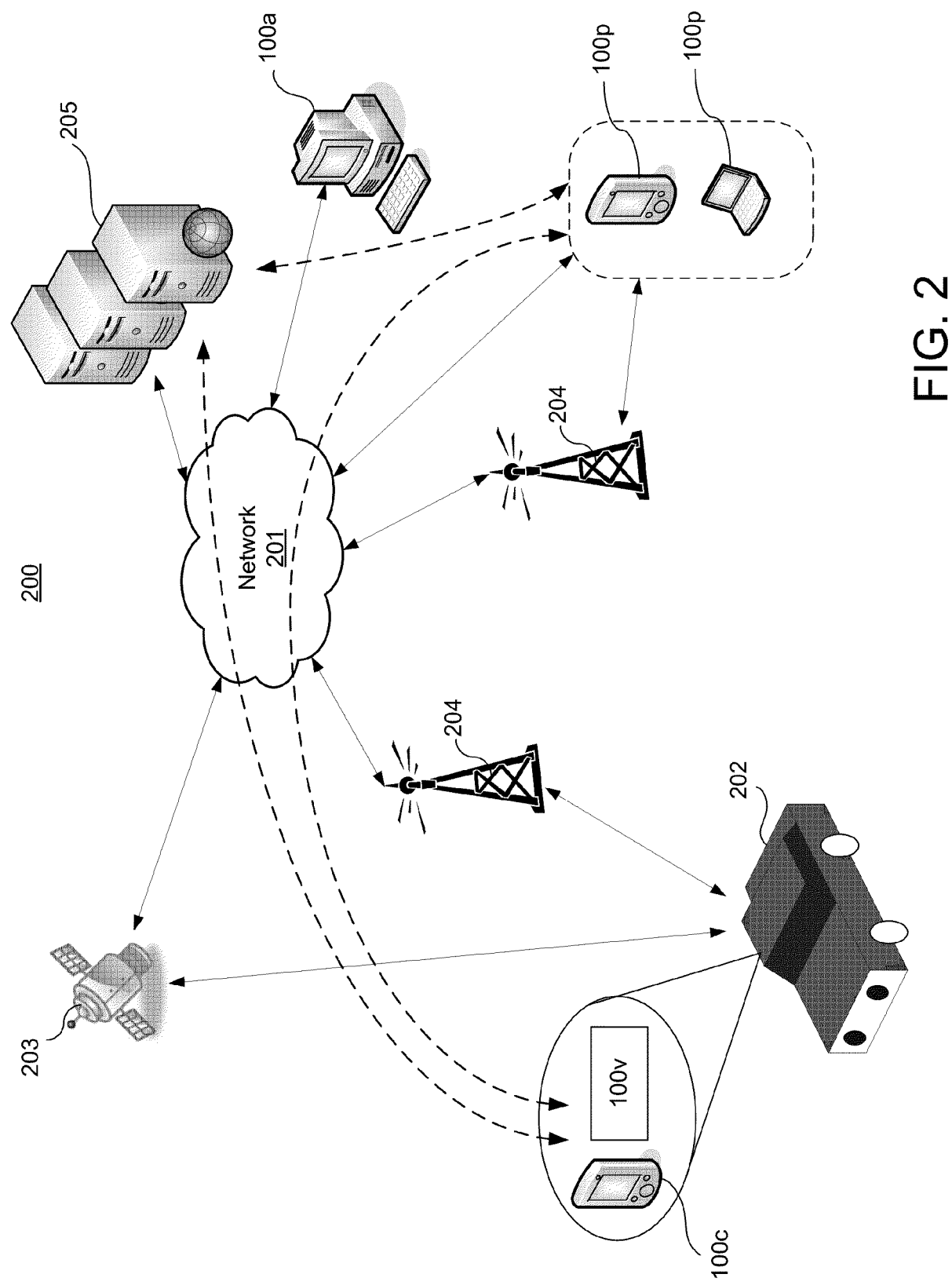
FIG. 2 illustrates an example network environment in which a system in accordance with the present disclosure may be implemented.

The methods and software for capturing and communicating vehicle telematics data as disclosed herein may be implemented on one or more computing devices 100 used in various network environments. FIG. 2 illustrates an example network environment 200 for implementing methods according to the present disclosure. As shown in FIG. 2, the network environment 200 may include a network 201 configured to connect computing devices within or associated with a vehicle 202 (e.g., child computing device 100c or vehicle computing device 100v), satellites 203, cellular network elements 204 (e.g., cell towers), one or more administrative computing devices 100a, one or more application servers 205, and one or more parent computing devices 100p. Collectively, one or more of these computing devices may form a vehicle telematics management system.

The network 201 may be any type of network, like the network 130 described above, and use one or more communication protocols (e.g., protocols for the Internet (IP), Bluetooth, cellular communications, satellite communications, etc.) to connect computing devices and servers within the network environment 200 so they may send and receive communications (e.g., notifications shown as dashed arrows) between each other. In particular, the network 201 may include a cellular network and its components, such as base stations. Accordingly, for example, a child computing device 100c (e.g., a smartphone) of a teenager in vehicle 202 may communicate, via a cellular backhaul of the network 201, with an application server 205 which in turn may communicate, via the cellular backhaul of the network 201, with a parent computing device 100p (e.g., another smartphone) to provide notifications. While FIG. 2 depicts arrows pointing to the vehicle 202, it should be understood that the connections may be made with the child computing device 100c and/or vehicle computing device 100v within the vehicle 202. For example, the child computing device 100c and/or vehicle computing device 100v may communicate with a satellite 203 to obtain GPS coordinates or to transfer notifications to the network 201 through the satellite 203. Further, it should be understood that the child computing device 100c (e.g., a smartphone) may connect to the network 201 even if it is removed from the vehicle 202.

FIG. 2 illustrates only one vehicle 202. However, the vehicle telematics management system may be configured to communicate with multiple vehicles 202 simultaneously. For example, different parents or superiors may be able to monitor different children or subordinates. Moreover, one parent (or superior) may be able to monitor multiple children (or subordinates). Vice versa, one child (or subordinate) may be tracked by multiple parents (or superiors).

Also, although FIG. 2 depicts the vehicle 202 as a car, the vehicle 202 may be any type of vehicle, including a motorcycle, bicycle, scooter, drone (or other automated device), truck, bus, boat, plane, helicopter, etc.

FIG. 2 also illustrates an example subsystem within the network environment 200. Specifically, FIG. 2 illustrates an example arrangement of computing devices that may exist within the vehicle 202 (and other vehicles not shown). To depict these computing devices, FIG. 2 includes a view of the inside of the vehicle 202. As shown in FIG. 2, the vehicle 202 may include a child computing device 100c and/or a vehicle computing device 100v. In some embodiments, the child computing device 100c and vehicle computing device 100v may communicate with one another (e.g., via Bluetooth). The child computing device 100c may be any mobile computing device (e.g., a smartphone, tablet, etc.) that is associated with a child or other subordinate whether they are a driver or passenger of the vehicle 202. The child computing device 100c may be configured in a similar manner to the computing device 100 of FIG. 1.

Further, the child computing device 100c may be configured to execute a child device program that provides computer-executable instructions for collecting and communicating vehicle telematics data as well as a user interface for a child (or other subordinate) to provide inputs to and receive outputs from the vehicle telematics management system. Such a child device program may be downloaded or otherwise installed onto the child computing device 100c using known methods. Once installed onto the child computing device 100c, a user may launch the child device program by, for example, operating buttons or a touchscreen on the child computing device 100c. Additionally, or alternatively, the child computing device 100c may be configured to execute a web browser (e.g., an application for accessing and navigating the Internet) to access a webpage providing an interface for the vehicle telematics management system.

In some embodiments, the child computing device 100c may also be configured to collect drive data using, e.g., an accelerometer, GPS, gyroscope, etc. of the child computing device 100c. Drive data may include vehicle telematics data or any other data related to events occurring during a vehicle's trip (e.g., an impact to a part of the vehicle, a deployed airbag, etc.). For example, drive data may include location information, such as GPS coordinates, indicating the geographical location of the child computing device 100c as well as speed and acceleration data that may be used to detect speeding and hard-braking events. The child computing device 100c may be further configured to evaluate the drive data and to send notifications to the vehicle telematics management system (e.g., application servers 205, administrative computing device 100a, etc.). Further, the child computing devices 100c may send notifications to specific parent computing devices 100p belonging to parents or other superiors interested in monitoring (or tracking) users of the child computing device 100c. As such, for example, a parent, using a parent computing device 100p, may monitor the driving behavior of their teenager based on notifications sent from their teenager's child computing device 100c. Also, the vehicle telematics management system may allow parents to monitor driving behavior of others too. The child computing device 100c might not necessarily be associated with (e.g., belong to) the driver, and instead, may be associated with a passenger. Thus, parents may also monitor the driving behavior of others who drive vehicles 202 carrying their children as passengers (such as friends of their children). Accordingly, parents (or superiors) may receive information for determining who they will permit their children to ride with.

Although FIG. 2 depicts just one child computing device 100c within the vehicle 202, the vehicle may contain more or fewer child computing devices 100c in some cases. For example, the vehicle 202 may carry one or more passengers in addition to the driver, and each person may have one or more child computing devices 100c. Or, for example, the people in the vehicle 202 might not have a child computing device 100c or might have left their child computing device 100c elsewhere. In such cases, where the vehicle 202 does not contain a child computing device 100c, a parent or superior may monitor the vehicle 202 carrying a child based on notifications received from the vehicle computing device 100v within the vehicle 202.

The child computing device 100c or vehicle computing device 100v may communicate notifications (see dashed arrows) to one or more parent computing devices 100p. The notifications may be transmitted directly from a child computing device 100c or vehicle computing device 100v to a parent computing device 100p or indirectly through, e.g., an application server 205 (e.g., a notification may be transmitted to an application server 205, which in turn may transmit a notification to the appropriate parent computing device100p). A parent computing device 100p may be any computing device (e.g., a smartphone, tablet, laptop, desktop computer, etc.) that is associated with a parent or other superior. FIG. 2 illustrates that the parent computing device 100p may be a mobile computing device (e.g., a smartphone) so that a parent may move around and still monitor their children or other subordinates. Where the parent computing device 100p is a mobile computing device, it may send and receive communications through a cellular network element 204 as shown in FIG. 2. FIG. 2 also illustrates that the parent computing device 100p may be a computer. For example, a parent's work computer may serve as the parent computing device 100p so that a parent may monitor their children while the parent is at work. Where the parent computing device 100p is a stationary computer, like some work computers, it may send and receive communications through the network 204 without the use of a cellular network element 204 as shown in FIG. 2.

The parent computing device 100p may be configured in a similar manner to the computing device 100 of FIG. 1. Further, the parent computing device 100d may be configured to execute a parent device program that provides computer-executable instructions for establishing restrictions and other conditions for triggering alerts based on vehicle telematics data. The parent device program may also provide computer-executable instructions for receiving notifications from child computing devices 100c and communicating parameter changes and other messages to child computing devices 100c. The parent device program may also provide a user interface for a parent (or other superior) to provide inputs to and receive outputs from the vehicle telematics management system. The parent device program may be downloaded or otherwise installed onto the parent computing device 100p using known methods. Once installed onto the parent computing device 100p, a user may launch the parent device program by, for example, operating buttons or a touchscreen on the parent computing device 100p. Additionally, or alternatively, the parent computing device 100p may be configured to execute a web browser (e.g., an application for accessing and navigating the Internet) to access a web page providing an interface for the vehicle telematics management system.

It should be understood that the terms "child" and "parent" (as used in, e.g., child computing device 100c and parent computing device 100p) are used herein to reflect a hierarchical relationship, and are not necessarily indicative of a familial (e.g., mother-daughter) relationship. Further, the use of the term "child" is not indicative of any particular age, and may include, for example, teenagers, young adults, adults, etc. Moreover, it should be understood that the user of a parent computing device 100p may actually be the child of a user of a child computing device 100c. For example, an adult child may wish to monitor the driving behavior of their elderly parents. Also, the terms "child" and "parent" (as well as "subordinate" and "superior") reflect a hierarchical relationship within the vehicle telematics management system where a parent (or superior) monitors a child (or subordinate), and do not necessarily reflect a position within other hierarchies. For example, a user of the child computing device 100c may be higher on the corporate ladder than a user of the parent computing device 100p (e.g., the user of the child computing device 100c may be a boss of the user of the parent computing device 100p).

Still referring to FIG. 2, as described above, the vehicle 202 may also include a vehicle computing device 100v. The vehicle computing device 100v may be configured in a similar manner to the computing device 100 of FIG. 1. Further, the vehicle computing device 100v may be configured to execute the child device program in addition to, or instead of, the child computing device 100c. In some cases, the vehicle computing device 100v and child computing device may operate in conjunction so that the vehicle computing device 100v performs some modules of the child device program while the child computing device 100c performs other modules of the child device program. For example, the vehicle computing device may collect drive data (e.g., vehicle telematics data) and communicate the drive data, via a wired (e.g., USB) or wireless (e.g., Bluetooth) connection, to a child computing device 100c within the same vehicle 202 so that the child computing device may evaluate the drive data and/or send notifications (providing evaluated drive data and/or raw drive data).

Further, the vehicle computing device 100v may be configured to connect to one or more devices (e.g., a GPS, sensors, etc.) installed on the vehicle 202 to collect the drive data. In some embodiments, the vehicle computing device 100v may be a system including multiple devices. For example, the vehicle computing device 100v may include the vehicle's on-board diagnostic (OBD) system. The vehicle computing device 100v may be configured to interface with one or more vehicle sensors (e.g., fuel gauge, tire pressure sensors, engine temperature sensors, etc.). The vehicle computing device may be configured to communicate directly or indirectly (e.g., through a child computing device 100c) with the vehicle telematics management system. In some embodiments, there might not be a vehicle computing device 100v installed on the vehicle 202 that is configurable to interface with the vehicle telematics management system, or the vehicle computing device 100v might not be able to communicate with a child computing device 100c.

In some embodiments, vehicles 202 carrying children or other subordinates may be autonomous or in an autonomous mode (e.g., auto-pilot mode). An autonomously controlled vehicle 202 may be controlled by its vehicle computing device 100v and/or a remote computing device via the network 201 or another network. The vehicle computing device 100v may employ sensors for inputting information related to a vehicle's surroundings (e.g., distance from nearby objects) and use the inputted information to control components of the vehicle 202 to drive the vehicle 202.

FIG. 2 further illustrates that the vehicle telematics management system may include one or more application servers 205. The application servers 205 may be configured to receive notifications (which may include the raw vehicle telematics data or information indicating driving events) from child computing devices 100c and process the notifications to determine if conditions are met (e.g., whether parental restrictions have been violated). The application servers 205 may determine whether to forward the notifications to parent computing devices 100p. The application servers 205 may also determine which parent computing devices 100p should receive a notification when determining whether a notification is to be forwarded. The application servers 205 may include one or more databases for associating one or more child computing devices 100c with one or more parent computing devices 100p so that notifications may be routed to the appropriate devices. Such associations may be represented by Table 1 below.

TABLE 1

| Child Username | Child Device ID | Parent Username | Parent Device ID | Account ID |
|---|---|---|---|---|
| Alice | 123 | Joe | 149 | XYZ9 |
|  |  | Jane | 258 |  |
| Bob | 456 | Jane | 258 | XYZ9 |
| Carol | 789 | Dave | 321 | ZZZ3 |
|  |  |  | 987 |  |

As shown in Table 1, for each child (or subordinate) participating in the vehicle telematics management system, a child username, a child device identifier (ID), a parent username, a parent device ID, and an account ID may be stored in association with each other. Table 1 shows that a child (or subordinate) with username "Alice" may be associated with a child computing device 100c used by Alice (e.g., Alice's smartphone). A unique identifier for the child computing device 100c of Alice may be stored. This child device ID may be, for example, a serial number or telephone number of the child computing device 100c used by Alice so that communications from Alice's child computing device may be identified as such. Table 1 also shows that Alice may be monitored by two parents (or superiors) having usernames "Joe" and "Jane." Each parent may have a separate parent computing device 100p, and thus, Table 1 shows a parent device ID (e.g., 149) for the parent computing device 100p of Joe and a parent device ID (e.g., 258) for the parent computing device 100p of Jane. A parent device ID may be a unique identifier so that communications may be directed to a specific parent computing device 100p. For example, the parent device ID may be a serial number, telephone number, or email address.

Table 1 also shows that Alice may be associated with an account ID (e.g., an auto-insurance policy ID) that may be the same as the account ID of her parents (Joe and Jane). Further, Table 1 illustrates that another child with username "Bob" may also be monitored by Jane. For example, Jane may be the mother of both Alice and Bob, and may wish to monitor both of her children. Table 1 also illustrates that a parent with username "Dave" may wish to receive notifications regarding a child with username "Carol" on multiple parent computing devices 100p. For example, Dave may wish to receive notifications on his work computer and his personal smartphone, and therefore, two parent device IDs (e.g., 321 and 987) may be stored in Table 1 in association with Dave. Table 1 is used to illustrate some associations. It should be understood that many other types of information may be stored in association with a child and/or parent. Also, the values of Table 1 are just examples, and many other values and data structures may be used to represent the information in Table 1. It should also be understood that information of Table 1 may be organized and stored in various manners by the application servers 205 and their databases.

In addition to receiving notifications from child computing devices 100c, the application servers 205 may also be configured to receive parameters and other values from parent computing devices 100p and establish conditions and restrictions. In some embodiments, the application servers 205 may host a website that parents (or superiors) and children (or subordinates) can visit to view a history of past drives by the children. This same website may be used by parents to establish conditions and restrictions. The application servers 205 may subsequently receive drive data from child computing devices 100c, process the drive data in light of the established conditions and restrictions, and send notifications to children and parents regarding the violations.

Auto-insurance companies (which may own or maintain the application servers 205) may also access the application servers 205 to check the operation of the vehicle telematics management system. In some examples, the application servers 205 may collect performance information related to how well children and other subordinates are driving. Further, the application servers 205 may include one or more databases and may maintain account information (e.g., auto-insurance policy account information) of parents and children. The application servers 205 may also maintain an account keeping track of points and/or money awarded to drivers for demonstrating good driving behavior.

The administrative computing device 100a of FIG. 2 may be maintained and/or operated by an administrator of the vehicle telematics management system. For example, in a case where the vehicle telematics management system is provided by an auto-insurance company, the administrator may be any personnel of the auto-insurance company with authorization to make changes/updates to the system. System administrators may use the administrative computing device 100a to update the vehicle telematics management system. For example, the administrative computing device 100a may be used to prepare and deploy software updates to the child device program, parent device program, or other software executing on devices within the system (e.g., software running on the application servers 205). The administrative computing device 100a may also be used by system administrators to ensure that the system is running smoothly. For example, the administrative computing device 100a may be used to check that child computing devices 100c are sending notifications and that the notifications are being properly routed to corresponding parent computing devices 100p.

Figure 3:
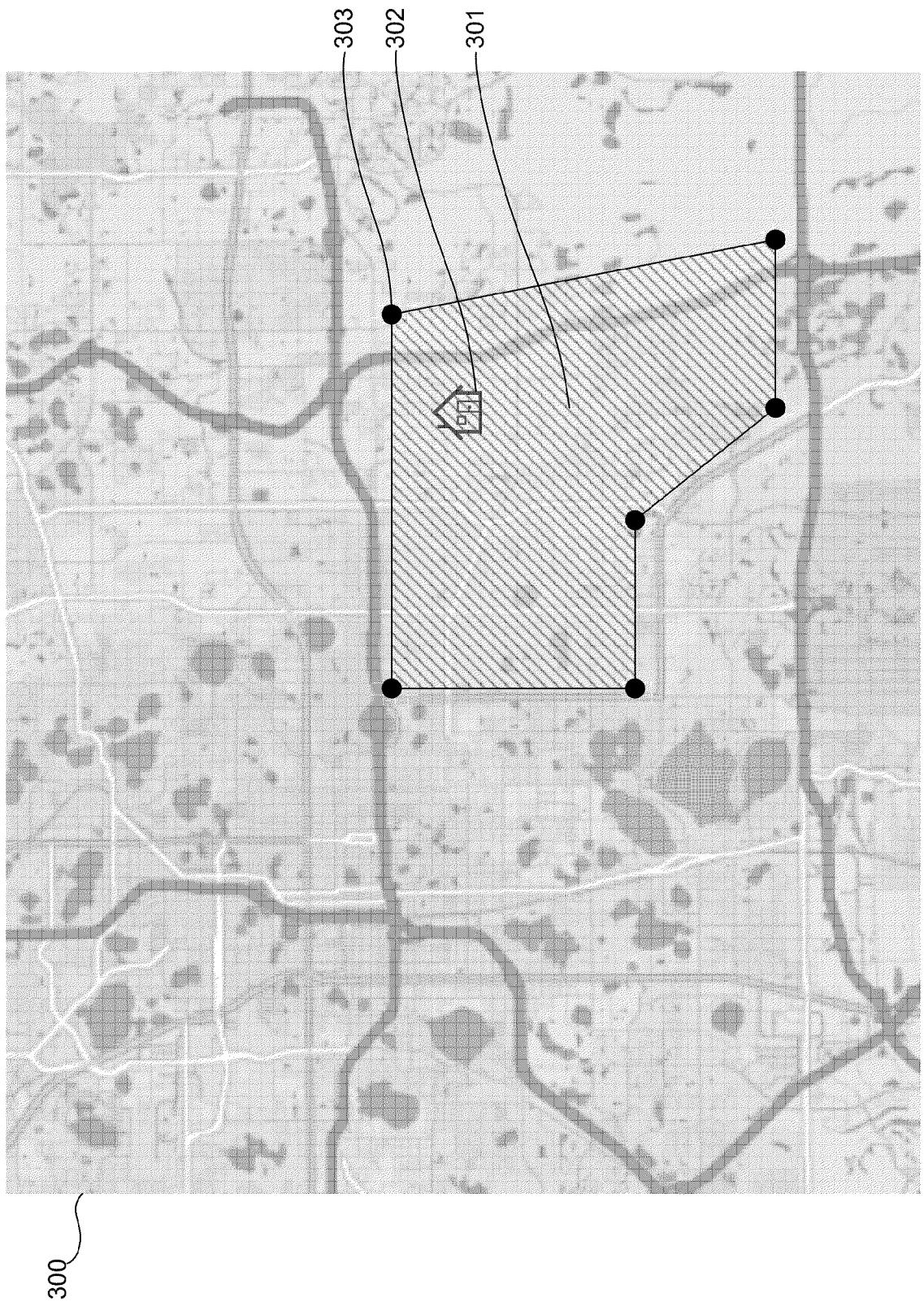
FIG. 3 illustrates a map with a geo-fence that may be applied to a particular user in accordance with aspects of the present disclosure.

FIG. 3 illustrates an example map 300 in accordance with the present disclosure. The map 300 may be accessed by a parent (or other superior) using a parent computing device 100p. For example, the parent computing device 100p may execute a parent device program that accesses map data stored on the application server(s) 205 to provide the map 300. Once a parent can view the map 300, the parent may set up a geo-fence 301. The geo-fence 301 may designate an area that a child (or other subordinate) of the parent is allowed to drive within. In some cases, the geo-fence 301 may be set up to surround a home 302 of the child so that the child is only permitted to drive in a vicinity of the home 302. As another example, a geo-fence 301 may be set up so that the child is permitted to drive between his/her home and school. If the child attempts to drive outside the geo-fence 301, the parent computing device 100p of the parent may be notified. In some cases, the parent may also be notified if the child (or other subordinate) is a passenger in a vehicle 202. In some embodiments, the parent may select that they only want to be notified when the child is the driver, that they only want to be notified when the child is the passenger, or that they want to be notified whether the child is the driver or a passenger.

In some embodiments, different parents may set up different geo-fences 301. For example, a father may set up a larger geo-fence 301 so that he is only alerted when the child drives far away, while a mother may set up a smaller geo-fence 301 so that she is alerted more often. Also, parents may set up different geo-fences 301 for different children. For example, a parent may set up a smaller geo-fence 301 for a child who is just learning to drive, and a larger geo-fence 301 for another child who has been driving for over a year (or is thought to be more trustworthy or a better driver).

Various methods may be implemented to set up the geo-fence 301. For example, using the parent computing device 100p, the parent may designate points 303 on the map 300 and the points may be connected to form a geo-fence 301. Alternatively, the parent may designate streets that define the borders of the geo-fence 301 or the parent may draw an area on the map 300 to define the borders of the geo-fence 301. In some cases, a hybrid method, in which a parent designates an area as well as streets which (may be within the area) that the child is not permitted to travel on, may be used to form the geo-fence 301. Or, a parent may designate points and a corresponding distance that the child is allowed to be from certain designated points and/or is not permitted to be from certain designated points. The geo-fence 301 may also be created by entering a route that the child is allowed to travel. For example, the parent may only want the child to drive from home to school, and thus, may enter a route accordingly so that if the child drives off of this route (or off the route given a tolerance, such as more than a mile off the route), the parent is alerted. The parent may permit the child to take multiple routes, and thus, multiple geo-fences 301 may be set up for the same child. These methods and others may be performed within the parent device program executing on the parent computing device 100p or on an interactive web page (which may be, e.g., provided by the application servers 205). In some cases, the parent may call a number and speak with a representative who may create the geo-fence 301 using the administrative computing device 100a. After the geo-fence 301 is set up, it may be stored in one of the application servers 205 in association with the parent who set it up and the child for whom it is set up. Further, after the geo-fence 301 is set up, it may be sent (e.g., in a push notification) to a child computing device 100c (or vehicle computing device 100v) so that the child may be made aware of the geo-fence 301.

Figure 4A:
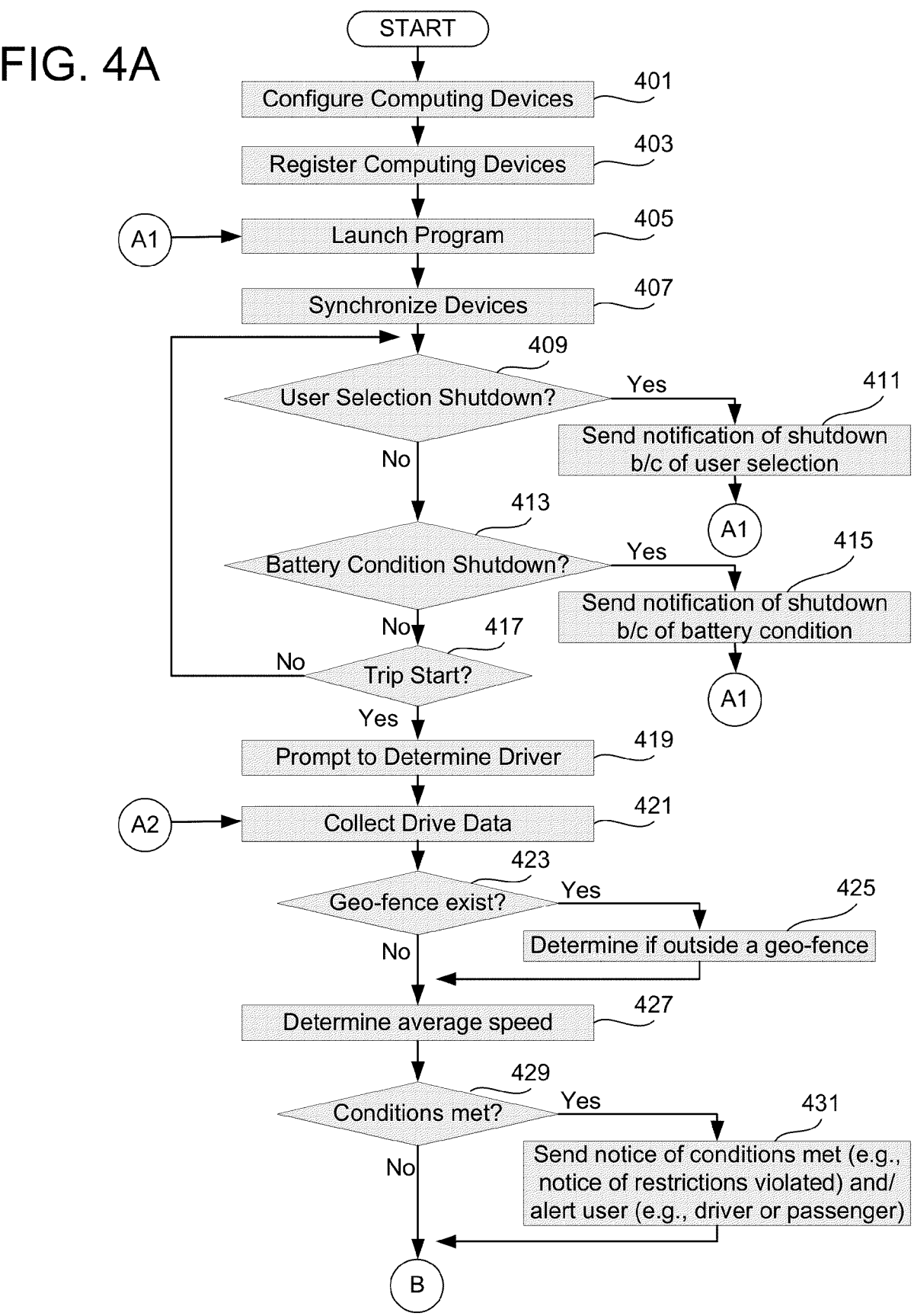
FIGS. 4A and 4B illustrate a flow diagram of an example process in accordance with aspects of the present disclosure.
Figure 4B:
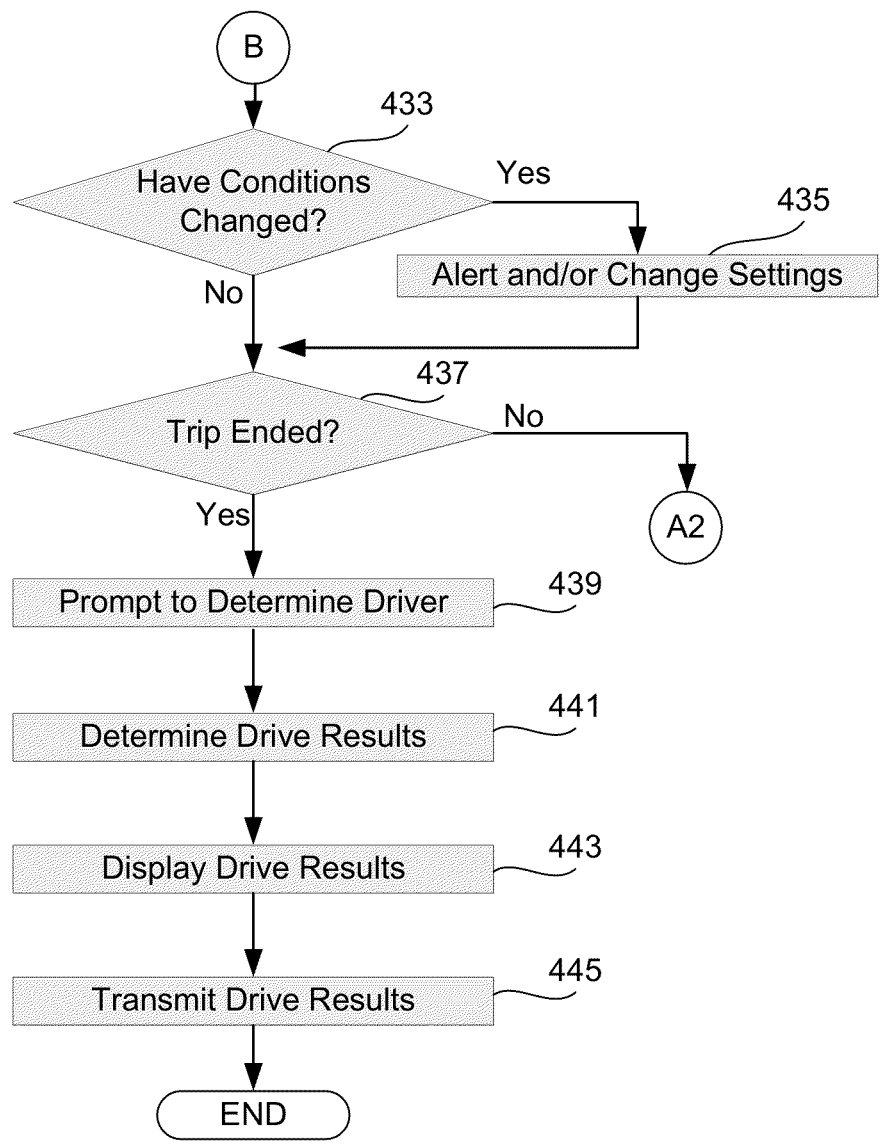

FIGS. 4A and 4B illustrate a flow diagram for an example method in accordance with aspects of the present disclosure. More specifically, FIGS. 4A and 4B illustrate a plurality of steps of a method for collecting and communicating vehicle telematics data to facilitate monitoring of driving behavior. The steps of FIGS. 4A and 4B may be performed by various devices disclosed herein, such as an administrative computing device 100a, a child computing device 100c, a vehicle computing device 100v, a parent computing device 100p, and/or an application server 205, which collectively form the vehicle telematics management system. In particular, one or more of the steps of FIGS. 4A and 4B may be performed by executing a child device program on a child computing device 100c of the vehicle telematics management system. As a result of the method of FIGS. 4A and 4B, parents and/or other superiors may effectively monitor driving behavior of vehicles carrying their children and/or other subordinates.

The method of FIGS. 4A and 4B may begin with a step 401 of configuring the computing devices of the vehicle telematics management system. In particular, step 401 may include configuring the child computing device 100c to interface with the vehicle telematics management system so that notifications related to driving behavior may be transmitted to the system. Also, the child computing device 100c may be configured to collect vehicle telematics data. This may include interfacing the child computing device 100c with a vehicle computing device 100v and its sensors. Alternatively, or additionally, configuring the child computing device 100c may include activating and/or calibrating a GPS, accelerometer, gyroscope, or other sensor of the child computing device 100c. Further, configuring the child computing device 100c may include installing an appropriate vehicle telematics management program, such as the child device program, thereon. Different child computing devices may install different versions of the child device program depending on their platforms. For example, a child computing device 100c running the iOS™ operating system may install a version for that platform, while a child computing device 100c running the ANDROID™ operating system may install a different version. Also, in some cases, step 401 may include a step of downloading the child device program onto a child computing device 100c from an administrative computing device 100a, application server 205, or another server or online marketplace (e.g., APP STORE, GOOGLE PLAY, etc.).

In step 403, the child or subordinate (or other user) may register the child computing device 100c with an organization (e.g., an insurance company) providing, maintaining, and/or managing the vehicle telematics management system. Registering the child computing device 100c may include creating a username and/or password and/or logging into an already established account with a username and/or password. In some embodiments, the account may correspond to an automotive insurance policy, which has previously been established and is associated with vehicle and user information (e.g., possible drivers). In any event, registration at step 403 may include associating an account with the child computing device 100c and/or user of the child computing device 100c. To perform registration, a user may provide various information, including information regarding a child computing device 100c (e.g., device identifier, device make, device model, etc.), information regarding a child or other subordinate (e.g., name, birthdate, address, insurance policy number, name of parents, etc.), and/or information regarding a vehicle (e.g., make, model, year, vehicle identification number (VIN), etc.). This information may be entered using the child computing device 100c or the parent computing device 100p, or a customer may contact a representative of an organization managing the vehicle telematics management system and the representative may enter the information using the administrative computing device 100a. Additionally, registering the child computing device 100c may include associating the child computing device 100c with one or more parent computing devices 100p or an account associated with a parent (and also associated with a parent computing device 100p). The child may have one account and the parent may have another account and these accounts may be associated with one another or the child and parent may be part of the same account (e.g., a household account). It should be understood that various manners may be used to associate the child and child computing device 100c with the parent and parent computing device 100p. By associating the child computing device 100c with a parent computing device 100p, the vehicle telematics management system may be configured so that notifications may be transmitted from the child computing device 100c to the appropriate (e.g., associated or corresponding) parent computing device 100p so that parents (or superiors) may monitor their respective children (or subordinates).

In some embodiments, when performing registration at step 403, a user profile may be created and a child or other subordinate may enter user preferences. The user preferences may permit the child device program on the child computing device 100c to provide a customized experience. For example, a user may create settings that affect what drive data is collected, how a user views drive data, how a user receives notifications of updated parameters (e.g., new geo-fence parameters), how warnings of violations are presented (e.g., what sounds/messages are played when a user violates a geo-fence), and how a user enters information (e.g., how a user indicates whether he/she is driving). Further, registration at step 403 may also include setting up an account for tracking rewards obtained by children and other subordinates when they exhibit acceptable driving behavior. When setting up such a rewards account a user may indicate which type of awards are desired (e.g., monetary awards, points, prizes, etc.).

In step 405, the child device program may be launched on the child computing device 100c. Launching the child device program may cause the vehicle telematics manager 101 and/or general processor 103 of the child computing device 100c to begin executing instructions of the child device program. The user of the child device program may select a shortcut or otherwise cause the operating system of the child computing device 100c to launch the child device program. This user may be a child (or other subordinate) or a parent (or other superior) of the child. That is, a parent may operate the child computing device 100c to launch the child device program. Upon launching the child device program, the parent may set the child device program into a lock mode, so that the program cannot be voluntarily terminated by an unauthorized person so long as the child computing device 100c is powered on. For example, the parent may set the child device program operating on the child computing device 100c into a lock mode so the child cannot terminate the child device program to avoid being monitored. In some embodiments, the parent may set the child device program in a lock mode by providing a username and/or password. Once this username and/or password is provided to the child computing device 100c, it may be sent to an application server 205 for safe storage in case it needs to be recovered by the parent later (e.g., in case the parent forgets the username and/or password). In some examples, before the child device program is put in a lock mode it may verify the username and/or password. Such verification may include checking the username and/or password against a username and/or password stored in an associated account on the application server 205 or against a username and/or password stored on an associated parent computing device 100p.

After the child device program is put in a lock mode, it might only be unlocked if the correct username and/or password is provided to the child device program (e.g., the same username and/or password used to put the child device program in the lock mode). Upon an attempt to unlock the child device program, the child device program may compare the entered username and/or password with a username and/or password as in the verification described above to determine whether the user is authorized to unlock the child device program. Until the child device program is unlocked, it may continue to run in the background of the child computing device 100c so as to detect driving behavior of a vehicle 202 carrying a child (or other subordinate) in possession of the child computing device 100c. That is, the child computing device 100c may continue to execute the child device program even though the child device program might not be providing a graphical user interface (e.g., a screen associated with the child device program). For example, the child computing device 100c may continue to maintain a thread executing instructions of the child device program although such execution might not be readily apparent to the user. Because the child device program may be configured to run in the background, it may allow parents (or other superiors) to monitor their children (or subordinates) without interfering with their children's use of the child computing device 100c. For example, a child may use the child computing device 100c to make a phone call, prepare a text message, play games, check email, surf the web, etc. while the child device program runs in the background to determine when a vehicle's trip starts and ends, to collect drive data, to receive and send notifications related to driving behavior (e.g., that driving conditions are met), etc.

Although FIG. 4A illustrates that the child device program is launched in step 405, in some cases, the launching may be performed in step 401 when the program is installed or step 403 when the child computing device 100c is registered. Still, other events (e.g., turning on the child computing device 100c, charging the computing device 100c, etc.) may automatically trigger the launching of the child device program on the child computing device 100c. Further, the child device program may be manually launched as well, for example, when a user selects a shortcut from a list of applications (or programs).

In step 407, the child computing device 100c may be synchronized with one or more parent computing devices 100p. For example, where the parent computing device 100p is used to establish guidelines for when a parent wishes to receive notifications, such guidelines may be synchronized with the appropriate child computing device 100c so it sends the notifications according to those guidelines. Different parents may set different parameters, and therefore, the child computing device 100c may be synchronized with multiple parent computing devices 100p. In response to the synchronization at step 407, the user (e.g., child or other subordinate) may be alerted that synchronization has occurred. For example, a child computing device 100c may be synchronized to receive a geo-fence 301 set up on a parent computing device 100p. In response to this synchronization, the child computing device 100c may vibrate, play an audible alert, flash a light, or display a message to notify the child of the geo-fence 301 that they must stay within. In some examples, such messages to notify the child of a driving condition may be communicated to the operating system (e.g., through an application programming interface between the child device program and the operating system), so the message appears in a list of other messages, such as missed phone calls, incoming text messages, incoming emails, software updates, etc.

Aspects of step 409 may help to deter children (or other subordinates) from attempting to circumvent being monitored by notifying parents (or other superiors) that a child may have stopped the child device program from collecting drive data and/or sending notifications. In step 409, the child device program running on the child computing device 100c may determine whether it is being terminated/shutdown or put into a sleep mode, so that drive data (e.g., vehicle telematics data) might not be collected and/or so that driving behavior might not be reported. At step 409, the child device program may determine whether a termination process for terminating (or shutting-down) a running instance of the child device program is about to begin. For example, the child device program may determine whether its thread is to be closed. In particular, at step 409 the child device program may determine whether it is shutting down because of a user selection (i.e., because the program is being "killed" by a user). The child device program may determine whether a user has manipulated the child computing device 100c (either through the child device program or the operating system) to force a shutdown of the child device program. For example, if the user (e.g., a child or other subordinate) instructs the child device program to close itself, the child device program may determine that it is being shut down because of a user selection. Also, for example, if the user navigates to a settings screen and instructs the operating system of the child computing device 100c to close the child device program, the child device program may determine that it is being shut down because of a user selection. Still, as another example, if the user selects to turn off the child computing device 100c, the child computing device 100c may determine that it is being shut down because of a user selection. In some embodiments, the child device program may log or otherwise record the course of action taken (e.g., closed from within, closed by the operating system, or closed when the device is turned off) to force the child device program to shut down. If the child device program determines that it is being shut down because of a user selection, the child device program may proceed to step 411.

In some embodiments, the child device program may perform step 411 before the shutdown is completed. In step 411, the child device program may generate and transmit a notification indicating that the child computing device 100c is shutting down (or has shutdown) and that the shutdown was caused by a user selection. Effectively, this notification may serve to inform a corresponding parent or superior (who wishes to monitor a child or subordinate) that they will not be receiving notifications related to the driving behavior of a vehicle 202 carrying their child or subordinate. In other words, this notification may inform others that the child computing device 100c will not be reporting information that allows a vehicle 202 carrying a child to be monitored.

The notification may generally indicate that the shutdown was caused by a user selection, or may be more specific and indicate a cause of action taken to cause the shutdown, such as indicating that the child program device was closed from within, closed by the operating system, or closed when the child computing device 100c was turned off. To minimize the size of the data structure used for such causes of action, each cause of action may be assigned a code (e.g., a number) and the notification may be generated to include the appropriate code. The data structure used for the notification may also include a field for source information identifying the child computing device 100c that is transmitting the notification. The notification may take various forms such as an IPv4 or IPv6 packet, an email, a short message service (SMS) message (e.g., a text message), multimedia messaging service (MMS) message, a voice message, etc.

In some embodiments, the notification indicating that a user has caused the shutdown may also include a power level (e.g., percentage of charge) of a battery of the child computing device 100c. For example, if the power level of the battery is at 10% when a user performs an action that closes the child device program, information indicating the 10% level may be included in the notification. Including this information may provide some insight into why the user closed the child device program. In some cases, where the child computing device 100c is running low on battery power, a user may choose to turn it off or close programs draining its power in order to conserve battery power. As such, a user may choose to turn off the child device program to conserve battery power, and not necessarily to avoid being monitored. By including the battery level in the notification, a parent (or other superior) receiving the notification may be able to decide whether their child (or other subordinate) is circumventing the monitoring or whether they have closed the child device program to conserve battery power. This feature of including the battery level in the notification may assist in reducing false alarms, undue concern for parents, and/or overreactions by parents.

Further, the notification may be addressed to one or more parent computing devices 100p (e.g., which may belong to parents of the child using the child computing device 100c sending the notification), so that when it is transmitted it may be routed through the network 201 until it reaches the parent computing devices 100p. Where multiple parent computing devices 100p are to receive the notification, a single notification may be generated and addressed to each of the parent computing devices 100p so that only a single notification is transmitted before shutdown. Alternatively, multiple notifications, each with a different address to the different parent computing devices 100p, may be generated and transmitted in step 411. Moreover, in some embodiments, the notification may be addressed to an application server 205, which may determine which parent computing device(s) 100p the notification should be forwarded to and then forward the notification to those parent computing device(s) 100p. Alternatively, instead of forwarding the notification, the application server 205 may receive the notification and generate another notification (including additional information that is not received from the child computing device 100c) that is sent to the appropriate parent computing device(s) 100p. In this manner, where the notification is addressed to the application server 205, the child computing device 100c may be relieved from having to determine which parent computing devices 100p to send the notification to. Still, in some embodiments, the notification may be addressed to both a parent computing device 100 and an application server 205 or the application server 205 may intercept the notification on its way to the parent computing device 100p so that both a parent computing device 100p and application server 205 may obtain the notification. Alternatively, multiple versions of the same notification may be generated and one version may be sent to an application server 205 while another version may be addressed to corresponding parent computing devices 100p.

In step 413, the child device program running on the child computing device 100c may also determine whether it is being terminated/shutdown or put into a sleep mode. During step 413, like step 411, the child device program may determine whether a termination process for terminating (or shutting-down) a running instance of the child device program is about to begin (e.g., whether its thread is to be closed). However, at step 413, the child device program may determine whether it is shutting down or entering a sleep mode due to a condition of the battery (e.g., low battery) of the child computing device 100c. The child device program may determine that it is shutting down due to a condition of the battery by determining that a power level (e.g., percentage of charge) of the battery is below a threshold level (which may, e.g., correspond to the threshold the child computing device 100c uses to turn off). The child device program may obtain the power level by directing the child computing device 100c to read the voltage and/or current supplied by the battery. Alternatively, or additionally, the child device program may obtain the power level by reading the power level maintained by the operating system of the child computing device 100c through an application program interface established between the child device program and the operating system.

In some embodiments, the child device program may be set to shut down or enter a sleep mode when the power level of the battery of the child computing device 100c drops below a predetermined threshold. This predetermined threshold may be a user preference that can be set through the child device program (for example, during the registration at step 403). Moreover, this predetermined threshold may be higher than a threshold used for controlling when the child computing device 100c is to be turned off (e.g., the predetermined threshold may be when the battery reaches 30% capacity). As mentioned above, the child computing device 100c may continue to run in the background, and therefore, may result in a continuous drain on the battery. Thus, in some cases, the child device program may be set to shut down or put into a sleep mode when the battery drops below the predetermined threshold so that the child device program does not further drain the battery of the child computing device 100c thereby allowing the battery to last longer. In embodiments implementing this predetermined threshold, when the child device program determines that the power level of the battery drops below the predetermined threshold and automatically triggers itself to shutdown, it may also determine that its reason for shutting down is due to a battery condition (YES at step 413).

If the child device program determines that it is being shut down because of a battery condition, the child device program may proceed to step 415. In some embodiments, the child device program may perform step 415 before the shutdown is completed. In step 415, the child device program may generate and transmit a notification indicating that the child computing device 100c is shutting down (or has shut-down) and that the shutdown was caused by a battery condition. This notification may generally indicate that the shutdown was caused by a battery condition (e.g., low battery or battery failure), or may be more specific and indicate a power level of the battery. For example, the notification generated and transmitted in step 415 may indicate that the battery is completely dead (e.g., has a 0% charge) or that the notification was sent because the battery dropped below a threshold of 25% of the maximum capacity of the battery. The data structure used for this notification may include a code identifying the reason for the shutdown. The data structure used for this notification may also include a field for source information identifying the child computing device 100c that is transmitting the notification. In addition, the data structure may include a field for a time stamp representing a time at which the child computing device 100c closes and/or a time stamp representing a time at which the notification is sent.

Further, the notification of step 415, like the notification of step 411, may take various forms, such as an IPv4 or IPv6 packet, an email, a short message service (SMS) message (e.g., a text message), multimedia messaging service (MMS) message, a voice message, etc. Additionally, the notification of step 415 may be addressed in any of the ways described with respect to the notification of step 411. Also, the notification of step 415 may effectively serve to inform a corresponding parent or superior (who wishes to monitor a child or subordinate) that they will not be receiving notifications related to the driving behavior of a vehicle 202 carrying their child or subordinate. In other words, this notification may inform others that the child computing device 100c will stop providing information that allows a vehicle 202 to be monitored.

The following provides example pseudo-code for illustrating how steps 411 and/or 415 may be implemented. In other words, this pseudo-code may represent portions of the computer-executable instructions of the child device program that, when executed by a processor, may perform functions of steps 411 and/or 415.

```
while (applicationWillTerminate) {
    //call backend web service to inform administrators, parents, and/or superiors
    notifyBackend(ReasonForTermination)
    //Backend takes appropriate actions
}
```

After a notification is sent in either step 411 or step 415, the process may return to step 405 as shown in FIG. 4A to re-launch the child device program. For example, even if a user chooses to close the child device program, the child computing device 100c may be configured to automatically re-launch the child device program. For example, the operating system of the child computing device 100c may intermittently or periodically attempt to re-launch the child device program. Also, for example, if the child device program is shut down because the child computing device 100c is turned off (whether because the user chose to turn it off or whether the battery died or dropped below a level causing the device to turn-off), the child device program may be re-launched upon turning the child computing device back on. Further, if, for example, the child device program is shut-down (or put into a sleep mode) because the battery power of the child computing device 100c drops below a predetermined threshold, the child device program may be re-launched (or awaken from the sleep mode) if the child computing device 100 is charged back to a point above the predetermined threshold. Also, in some examples, the child device program may be re-launched if the child computing device 100 is charging (e.g., connected to a power source), regardless of whether it has been charged back above the predetermined threshold. Although these examples describe a process for automatically re-launching the child device program, the child device program may be manually re-launched (at various times) as well.

The following provides example pseudo-code for illustrating how the child device program may be automatically re-launched. In other words, this pseudo-code may represent portions of computer-executable instructions that, when executed by a processor, may perform functions to re-launch or restart the child device program.

```
//Set background mode with desired location
If locationManager (current location == desired location) {
    //take actions
    triggerLocalNotification (wake up);
    startLocationCapture (invoke standard GPS API);
}
```

In FIG. 4A, step 413 is depicted as occurring after step 409. However, these steps may be switched, and the determination in step 409 may occur after the determination of step 413. Alternatively, steps 409 and 413 may be performed simultaneously. In some examples, the child computing device 100c may execute a separate thread (than the thread(s) used to perform the other steps of the child device program) for monitoring whether the child device program is going to shut down. Indeed, in some examples, the child computing device 100c may execute multiple threads. For example, it may execute one thread for determining whether the child device program is closing due to a user selection and one thread for determining whether the child device program is closing due to a battery condition. Moreover, steps 409 and 413 may be performed continuously so that an event causing shutdown may be detected at any point in time.

Still referring to the example method of FIG. 4A, if a shutdown is not detected in steps 409 or 413, step 417 may be performed to detect the start of a trip of a vehicle 202 carrying a child associated with the child computing device 100c. Step 417 may include determining that the child computing device 100c is within a vehicle 202. At step 417, the child device program may detect whether the child (or subordinate) is in a moving vehicle 202 (and possibly may be a driver of the moving vehicle 202) on the basis of movement of the child computing device 100c. That is, the child device program may assume that the child computing device 100c is being carried by the child (or subordinate) so movement of the child computing device 100c is representative of movement of the child (or subordinate). Following this assumption, if the child computing device 100c is detected to move at a speed above a certain threshold, the child device program may determine that the child computing device 100c and thus the child are within a vehicle.

Various algorithms may be used to automatically detect the start of a vehicle's trip at step 417. FIG. 5 illustrates an example algorithm for determining whether the child computing device 100c, and therefore the child, is within a vehicle 202 and the vehicle 202 is starting a trip. The process of FIG. 5 may begin with a step 501 in which the child device program obtains a current speed of the child computing device 100c. The current speed may be obtained by receiving data indicating an acceleration of the child computing device 100c from an accelerometer of the child computing device and calculating the current speed from this data.

Alternatively, or additionally, the current speed may be obtained by receiving coordinates from a GPS receiver of the child computing device 100c and calculating the current speed from these coordinates. Further, in some embodiments, the current speed may be obtained from a vehicle computing device 100v of the vehicle 202, which may interface with the speedometer of the vehicle 202 to detect the current speed.

Next, in step 503, the child device program may determine whether the current speed obtained in step 501 is greater than (or greater than or equal to) a predetermined threshold. For example, the child device program may determine whether the obtained current speed is greater than eight (8) miles per hour. The predetermined threshold may be different for different child computing devices 100c, and may be a setting that can be changed. For example, the predetermined threshold may be set to a speed within a range from 5 mph to 25 mph or within a range from 6 mph to 20 mph. In some embodiments, the predetermined threshold may be set to, for example, fifteen (15) miles per hour, so that the start of the trip is detected when the current speed exceeds 15 mph (Yes at step 503). In some embodiments, a predetermined threshold of 15 mph may be preferred because a user of the child computing device 100c may be unlikely to travel at 15 mph unless they are in a moving vehicle 202. Therefore, the child device program may avoid incorrectly determining that the child is beginning a trip in a vehicle 202 when, e.g., the child is running, riding a bicycle, or drops or throws the child computing device 100c. On the one hand, the 15 mph threshold may prevent mistakenly determining the start of a vehicle's trip, while on the other hand, it may allow for early detection of the start of a trip (e.g., while the vehicle is pulling out of a driveway or driving through a neighborhood).

If the current speed is less than or equal to the predetermined threshold (No at step 503), the child device program waits for a set amount of time (e.g., 1 second, 2 seconds...n seconds) at step 505 before returning to step 501 to obtain a new current speed. Thus, step 505 reflects a delay between obtaining current speeds. This delay may prevent excessive processing. Various delays may be used in various embodiments.

If the current speed is greater than the predetermined threshold (Yes at step 503), the child device program may perform step 507. At step 507, the child device program may mark a trip as started, which may include storing an indication in memory that a trip has started. For example, step 507 may include setting a Boolean parameter for whether the trip has started to "True." In step 507, the child device program may cause the child computing device 100c to store such an indication in a memory (e.g., RAM 105) of the child computing device 100c. In some embodiments, step 507 may also include storing a time at which the trip is marked as started. For this time, the child device program may use a clock of the child computing device 100c or another clock.

The following provides example pseudo-code for illustrating how one or more steps of FIG. 5 may be implemented. In other words, this pseudo-code may represent portions of the computer-executable instructions of the child device program.

```
Bool tripStarted;
If(speed > 8 miles/hr) {
    If(!tripStarted) {
        tripStarted = True;
        tripStartTime = currentTime;
```

```
        }
}
```

Returning to FIG. 4A, in some embodiments, if the start of a trip is not detected at step 417 (No at step 417), the child device program may return to step 409. However, if the start of a trip is detected at step 417 (Yes at step 417), the child device program may proceed to step 419. In step 419, the child device program may inquire whether the child (or subordinate) associated with the child computing device 100c is the driver of the vehicle 202. For example, the child device program may prompt the child (or subordinate) to indicate whether he/she is the driver of the vehicle 202.

In step 421, the child device program may begin collecting drive data (e.g., vehicle telematics data) representing a driving behavior of the vehicle 202. For example, the drive data may reflect whether the vehicle 202 is being driven well (e.g., smoothly accelerating and decelerating) or safely or is being driven poorly or recklessly. In some embodiments, the drive data may be collected using the accelerometer, GPS, gyroscope, or other sensors of the child computing device 100c. For example, the child device program may collect acceleration data and/or location data (e.g., coordinates). Portions of the drive data may also include information collected from the vehicle computing device 100v and/or application servers 205 or other servers. The drive data may be collected continuously or intermittently (e.g., periodically) throughout the duration of the trip.

In step 423, the child device program may determine whether a geo-fence 301 has been set up for the child (or subordinate). In other words, the child device program may determine whether a geo-fence 301 is applicable to the child computing device 100c. For example, if a parent (or superior) has established a geo-fence 301 (e.g., using a parent computing device 100p or the child computing device 100c) for the child computing device 100c, the child device program may determine that a geo-fence 301 is applicable in step 423 (Yes at step 423). If it is determined that a geo-fence is applicable (Yes at step 423), the child device program may perform step 425. In step 425, the child device program may determine whether the child computing device 100c is within or outside of an applicable geo-fence 301. If there are multiple geo-fences 301 applicable to the child computing device 100c (e.g., because the child's parents each set up a different geo-fence 301), the child device program may determine whether the child computing device 100c is within or outside of each of the geo-fences 301.

Figure 6:
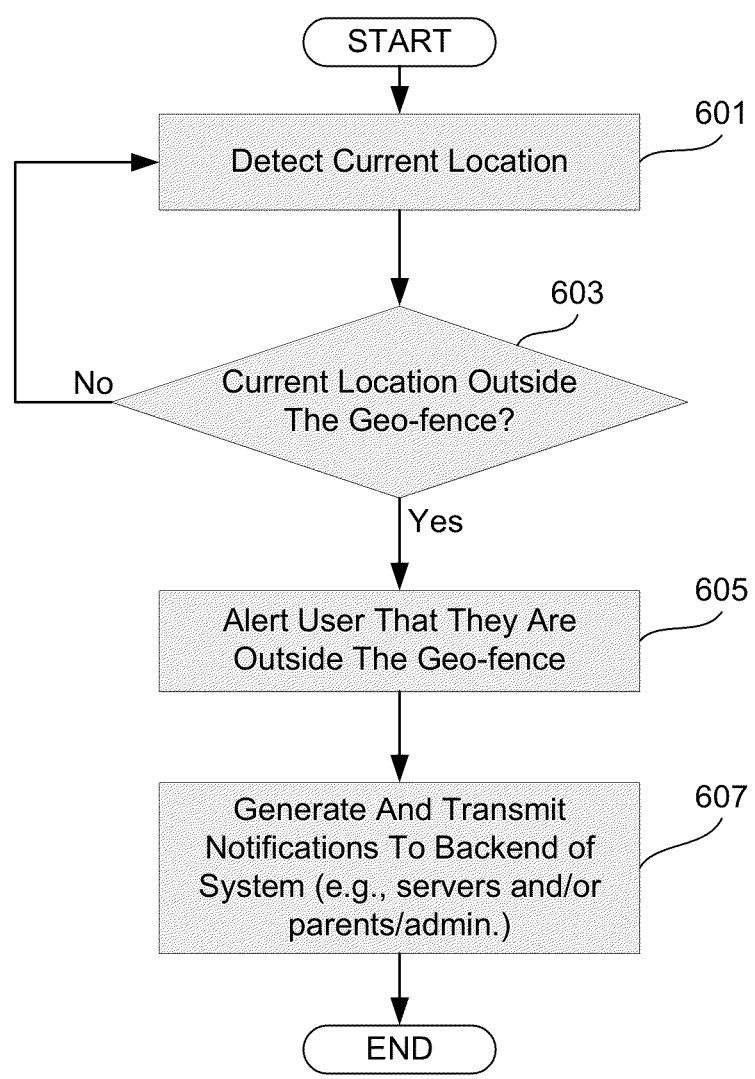
FIG. 6 illustrates a flow diagram of an example process in accordance with aspects of the present disclosure.

Various algorithms may be used to perform the determination(s) at step 425. FIG. 6 illustrates an example algorithm for determining whether the child computing device 100c, and therefore the child, is within or outside of a geo-fence 301 set up for a child (or subordinate). Prior to the start of FIG. 6, a parent (or superior) may set up a geo-fence 301 as disclosed herein. The process of FIG. 6 may begin with a step 601 in which the child device program determines the current location of the child computing device 100. The current location of the child computing device 100c may be determined based on GPS coordinates obtained by a GPS receiver of the child computing device 100c or other position information received from one or more cellular network elements 204. Alternatively, the current location may be obtained from GPS coordinates of a GPS receiver of the vehicle 202 via a connection with the vehicle computing device 100v.

After step 601, the child device program may determine whether the current location is outside of an applicable geo-fence 301 at step 603. This determination may be made by comparing the coordinates obtained in step 601 with coordinates defining the perimeter of the geo-fence 301. If the current location of the child computing device 100c is not outside of the geo-fence 301 (No at step 603), the child device program may return to step 601 to again obtain the current location of the child computing device 100c in case the location has changed. In some cases, there may be a delay before returning to step 601.

If the current location of the child computing device 100c is outside of the geo-fence 301 (Yes at step 603), the child device program may proceed to step 605. In step 605, the child device program may determine whether to alert the user (e.g., child or other subordinate) of the child computing device 100c that he/she is outside the geo-fence and to alert the user if it is determined to do so. Alerting the user of the violation of the geo-fence 301 in step 605 may be performed in various manners. For example, alerting the user may include playing an audible alert (e.g., a beep or other sound) informing the user that he/she is outside the geo-fence 301. The alert may also be in the form of an audible message or written message that pops-up on a screen coupled to the child computing device 100c (e.g., screen of the child computing device 100c or vehicle computing device 100v). Alternatively, or additionally, the alert may be a flashing light or cause a vibration of the child computing device 100c. Further, the alert may be sent in the form of a text message, email, or phone call that is automatically generated by the application server 205.

In step 607, the child device program may determine whether to generate and transmit a notification that the child computing device 100c is outside a geo-fence 301 to a corresponding parent computing device 100p and/or application server 205 in real time (e.g., during a trip). For example, parents may set parameters indicating that they want to be immediately notified when the vehicle 202 carrying their child is outside the geo-fence that they set up. The child device program may determine which parent computing devices 100p to notify and may transmit notifications addressed to those parent computing devices 100p. Alternatively, the child device program may transmit the notification that the child is outside the geo-fence 301 to the application server 205, which may determine which parents to be notified and handle sending notifications to those parents. The notifications sent to the parent computing devices 100p may cause the parent computing devices 100p to alert the parent in any of the manners that an alert may be output as described above in step 605. For example, in response to receiving the notification at the parent computing device 100p, the parent device program may alert the parent by generating a pop-up message on the parent computing device 100p or outputting a sound. Also, the notifications transmitted to the parent computing devices 100p may take the form of a text message, email, or phone call, which may be automatically generated by the child computing device 100c or application server 205.

In some embodiments, the child computing device 100c might only send the notification that the child is outside the geo-fence 301 to the parent computing device 100p when the child computing device 100c determines that the child is the driver. Thus, a parent might only be notified if their child is driving outside the geo-fence, and not, for example, if their child is a passenger in a vehicle 202 (e.g., bus) outside the geo-fence or walking outside. The child computing device 100c may determine that the child is the driver based on a response to the prompt in step 419. Alternatively, or additionally, the child computing device 100c may detect the position of the child within the vehicle 202 using sensors (e.g., image sensors, such as a camera), and determine whether the child is the driver based on the detected position. In some embodiments, the vehicle computing device 100v may detect the child's position and/or determine the driver (e.g., by capturing fingerprints of the person holding the steering wheel or starting the ignition, an image of the driver, a retinal scan of the driver, etc.), and share this information with the child computing device 100c. For example, if the vehicle device 100v determines an identity of the driver and informs the child computing device 100c of the driver's identity, the child computing device 100c may determine that the identity does not match the child and conclude that the child is not the driver. Also, it may be assumed that the child is the driver based on an identity of the vehicle 202. For example, the child may be associated with a particular vehicle 202 (e.g., a vehicle 202 owned by the child or primarily driven by the child), so that the child is assumed to be the driver if the child computing device 100c determines that the particular vehicle 202 is the vehicle 202 moving.

The following provides example pseudo-code for illustrating how one or more steps of FIG. 6 may be implemented. In other words, the following pseudo-code may represent portions of the computer-executable instructions of the child device program.

```
If(tripOngoing && !geofenceBreach) {
    If(currentLocation distanceFromHomeLocation > 5 miles) {
        //Play alarm sound for 10 seconds
        //Send notification to corresponding parent computing device
    }
}
```

Figure 7:
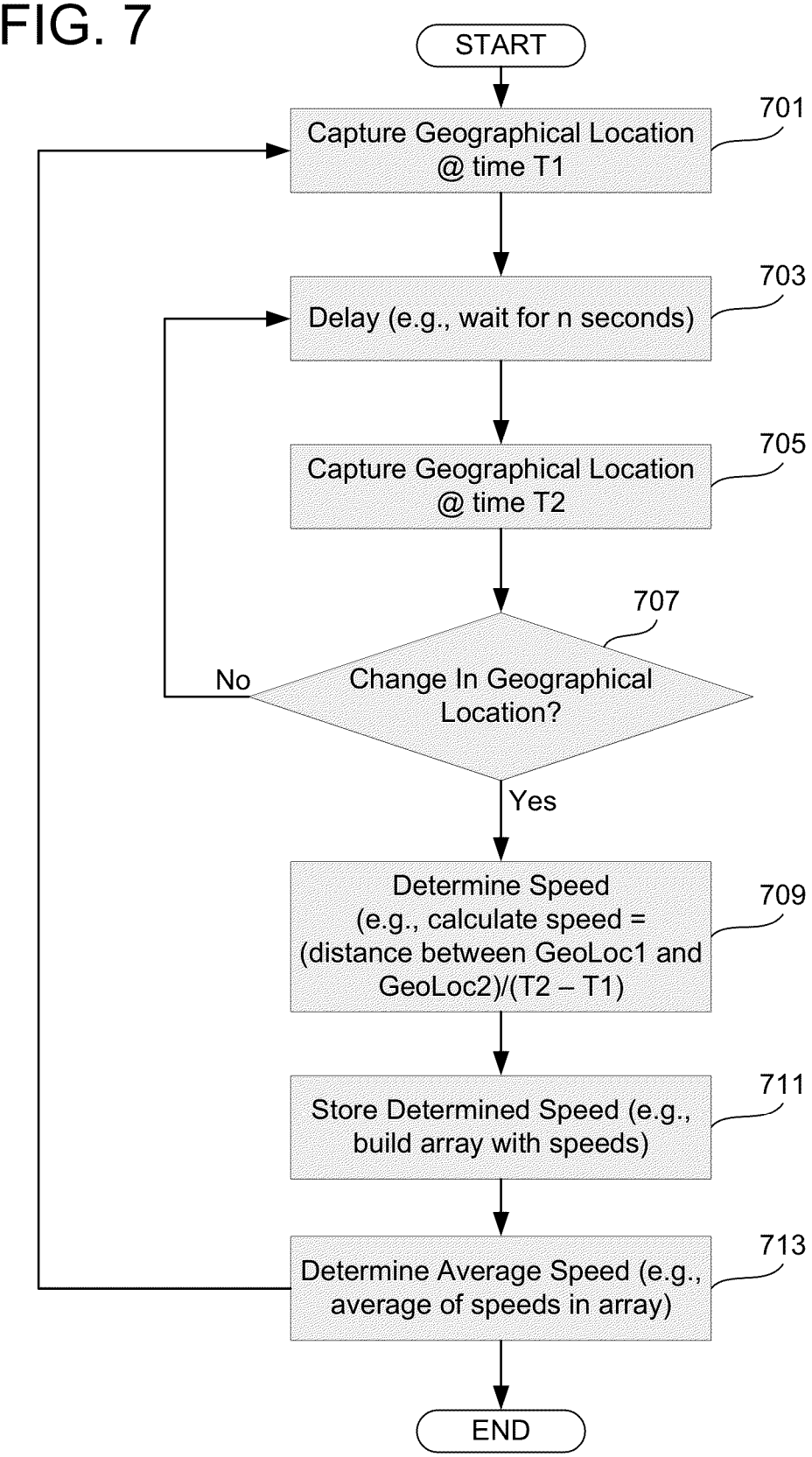
FIG. 7 illustrates a flow diagram of an example process in accordance with aspects of the present disclosure.

Returning to FIG. 4A, the average speed of the vehicle 202 carrying the child may be determined at step 427. That is, at step 427, the average speed of the vehicle 202 during the trip may be determined. The average speed may be calculated by the child device program executed on the child computing device 100c. Various algorithms may be used to perform the determination at step 427. FIG. 7 illustrates an example algorithm for determining the average speed.

In step 701, the child device program may capture a geographical location at a first time T1. For example, the geographical location may be captured based on data from the GPS of the child computing device 100c or data from the GPS of the vehicle computing device. Step 701 may be performed in any manner similar to those described above with respect to step 601. Regardless of how it is determined, the geographical location determined in step 701 may be associated with the first time T1 at which it was determined. Both the geographical location determined at the first time T1 and the first time T1 itself may be stored as values of respective variables. Then, the child device program may wait for a predetermined amount of time (e.g., 1 second, 2 seconds...n seconds) at step 703. After waiting for some time, the child device program may capture the geographical location again at step 705. The geographical location captured at step 705 may be associated with a second time T2 at which it was captured. Both the geographical location determined at the second time T2 and the second time T2 itself may be stored as values of respective variables, which may be separate from the variables used to store the geographical location at the first time T1 and the first time T1.

In step 707, the child device program may determine whether there is a change in location. That is, the child device program may determine whether the geographical location captured at the second time T2 has changed since it was captured at the first time T1. This determination may include comparing the values of variables assigned to the geographical location at the first time T1 and the geographical location at the second time T2. In some embodiments, there may be a tolerance for this determination. In other words, the determination may be that there is no change if the change is within some tolerance threshold (e.g., 10 feet). If there is no change in the location (No at step 707), the process may return to step 703 and wait before performing step 705 again. In some embodiments, when the process returns to step 703 the values of the geographical location at the first time T1 and/or the first time T1 may be replaced with the geographical location at the second time T2 and/or the second time T2, respectively.

If there is a change in the location (Yes at step 707), the child device program may perform step 709. At step 709, child device program may determine a speed of the child computing device 100c (and therefore the vehicle 202). The speed may be determined by dividing the distance between the geographical locations captured at the first time T1 and the second time T2 by the difference between the first time T1 and the second time T2. In some embodiments, other algorithms may be used to calculate speed.

After determining the speed in step 709, the child device program may store the speed at step 711. In some embodiments, at step 711, the child device program may build an array to store the speed or enter the speed into a previously built array. Such an array may store a plurality of speeds determined throughout a trip of the vehicle 202. For each trip a vehicle 202 makes, a different array may be created.

Using the speeds stored in step 711, the child device program may determine (e.g., calculate) the average speed of the vehicle 202 during the trip at step 713. For example, child device program may calculate the average speed of the vehicle 202 using the speeds stored in an array. The following provides example pseudo-code for illustrating how one or more steps of FIG. 7 may be implemented to determine the average speed of a vehicle 202. In other words, this pseudo-code may represent portions of the computer-executable instructions of the child device program.

```
Speed[] = speedArray;
For(i = 0, i < speed.count; i++){
    totalSpeed += speed[i];
}
avgSpeed = totalSpeed/totalSpeedingCounts;
```

As shown in FIG. 7, after the average speed is calculated in step 713, the process of FIG. 7 may be repeated to continue to calculate the average speed throughout the duration of the trip of the vehicle 202. Although FIG. 7 shows the process starting back at step 701, in some embodiments, the process may return to step 703 and the values of the geographical location at the first time T1 and/or the first time T1 may be replaced with the geographical location at the second time T2 and/or the second time T2, respectively. Further, after performing an instance of step 713, the process may also proceed to step 429.

As shown in FIG. 4A, after the average speed is calculated, the child device program may determine whether any set conditions are met at step 429. The conditions may be stored locally on the child computing device 100c or retrieved from an application server 205. Determining whether conditions are met may include determining whether violations of restrictions have occurred. For example, the child device program may determine whether a speed exceeds a speed restriction or an average speed exceeds an average speed restriction. Such restrictions may be set (using the parent computing device 100p) by the parent of the child or by an administrator using an administrative computing device 100a.

Various restrictions may be set, and therefore, violations of various restrictions may be checked at step 429. Step 429 may include checking for a violation of a speed restriction which may be a single value (e.g., 65 mph), which may correspond to the speed limit of a road the vehicle 202 is traveling on, and/or which may be a function of the speed limit of the road the vehicle 202 is traveling on (e.g., 5 mph over the speed limit). The child computing device 100c may access an application server 205 and/or other server to obtain certain information such as speed limit information. In addition to checking for a speeding event (where a vehicle 202 violates a speed related restriction), the child device program may also determine whether a hard-braking event has occurred, a turn was made too fast, and/or over-acceleration has occurred. These determinations may be made by comparing drive data (e.g., data from an accelerometer) against conditions set up by a parent (or other superior). Further, in some embodiments, the child computing device 100c may work in tandem with the vehicle computing device 100v to determine whether conditions have been met. For example, the vehicle computing device 100v may supply drive data to the child computing device 100c which may compare the drive data with conditions. In a particular example, the vehicle computing device 100v may detect, using sensors on a vehicle 202, that the vehicle 202 has been involved in an accident, and may inform the child computing device 100c of the accident, which may then determine whether to notify a parent or other superior.

Additionally, or alternatively, checking conditions may include checking that a driver is exhibiting good or safe driving behavior. Conditions may be set up to represent goals that a driver should achieve. For example, a parent may set a goal for a user to maintain an average speed that is within a set acceptable range, and thus, the child device program may determine whether the child is obtaining the goal. Other milestones may also be set as conditions for the child device program to check.

If one or more conditions are met at step 429, the child computing device 100c may transmit a notification to a corresponding parent computing device 100p at step 431. For example, if a child's vehicle 202 is speeding above a threshold set by a parent, the parent may be notified that the set speed has been exceeded. The notification may be sent as soon as the event meeting the condition takes place (e.g., in real time) or may be sent at a next time that notifications are scheduled to be sent (e.g., notifications may be scheduled to be sent intermittently, such as every two minutes, every five minutes, etc., or at the end of a trip). The notification generated and sent in step 431 may be generated and sent in any of the manners described herein for sending notifications. However, in step 431, the notification may include a field for information indicating or describing the condition that was met which triggered the notification. In some cases, the notification may be more general, and instead, notify the parent that a condition was met without explicitly indicating which condition was met. In some examples, when multiple conditions are met simultaneously, close in time to each other, or during the same trip, the notifications that these conditions have been met may be consolidated into one message. Alternatively, a separate notification may be transmitted for each condition that is met.

Additionally, or alternatively, when a condition is met at step 429, the child computing device 100c may output an alert to the child (and others in the vicinity of the child computing device 100c) informing the child that the condition was met. The alert may take various forms, such as an alarm or other sound, an audible message, a written message, a flashing light, a vibration, etc. In some cases, the child computing device 100c may work in tandem with the vehicle computing device 100v to alert the child or subordinate in the vehicle 202 that a condition was met. For example, the child computing device 100c may trigger a seat of the driver and/or passenger to vibrate to alert the person in the seat that the condition was met. In other examples, the child computing device 100c may trigger an audio system of the vehicle 202 to output a sound, may trigger a display of the vehicle 202 to display a warning, may trigger an ignition of the vehicle 202 to turn off the engine, and/or may trigger the vehicle 202 to take over control or take away control so that the vehicle 202 comes to a safe stop. Further, in some embodiments, the alert outputted in step 431 may be specific for a particular condition that was met. For example, one type of alert (e.g., one sound) may be used to indicate that a speeding event (e.g., a driver exceeded a speed threshold) occurred, while another type of alert (e.g., another sound) may be used to indicate that a hard-braking event (e.g., stopping short) occurred.

Turning to FIG. 4B, the child device program may determine whether any conditions have changed at step 434. The determination of step 434 may include determining whether any parameters for changing conditions have been received. For example, the child device program may detect whether it has received a new parameter for changing the size or boundaries of the geo-fence 301. In some cases, e.g., where the child exhibits good or safe driving behavior, a parent may choose to expand the geo-fence 301 during the trip so that the child may continue to drive over greater areas. In contrast, in some cases, e.g., where the child exhibits poor driving behavior, a parent may choose to constrict the geo-fence 301 as the child is driving. In other examples, changes in parameters may include changes in a speed threshold, hard-braking threshold, and/or turning threshold which may be used to trigger notifications to the parents.

If the child device program determines that a parameter is received (Yes at step 434), the child device program may implement the new parameters at step 435. Additionally, or alternatively, the child device program may alert the child or subordinate of the changes. The alert may be general in that it simply indicates that a change has occurred without describing the change, or may be more specific and may indicate the new parameters that have been received. For example, if a parent has lowered a speed threshold (e.g., from a max limit of 65 mph to 55 mph), the alert may be an audible message (e.g., played through speakers of the child computing device 100c or the vehicle 202) stating the new speed threshold. A parent may want to change parameters based on, for example, changes in weather and/or traffic or whether the child is demonstrating good or bad driving behavior. As a result of step 435, while the trip is taking place, the parent may control how often the parent and/or the child is notified or alerted. The child device program may detect when parameters are received (e.g., from parents) by the child computing device 100c and may implement the changes in real-time (e.g., immediately after receipt) so the changes can take effect during the trip.

In some embodiments, one or more of steps 423 through 435, including the steps of FIGS. 6 and 7, may be performed by an application server 205. For example, the child computing device 100c may transmit location information indicating its location to the application server 205, which in turn may determine whether a geo-fence 301 is applicable and if so whether the child computing device 100c is within the applicable geo-fence 301. Or, for example, the child computing device 100c may determine whether a geo-fence 301 is applicable, and may transmit its location information to an application server 205 that determines whether the location information is within the geo-fence 301. Accordingly, some of the processing power used to perform steps 423 through 435 may be off loaded from the child computing device 100c to an application server 205.

Figure 8:
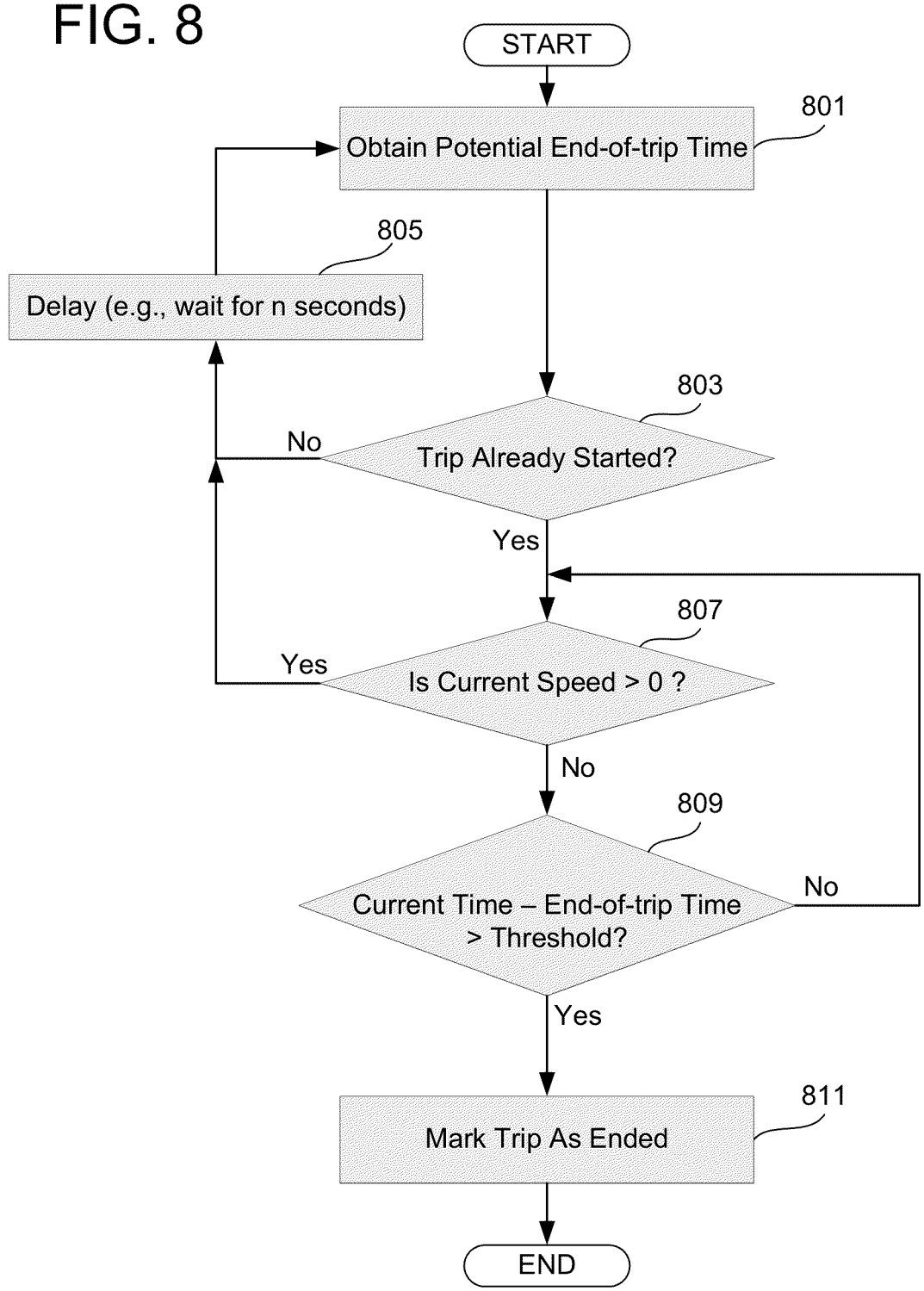
FIG. 8 illustrates a flow diagram of an example process in accordance with aspects of the present disclosure.

Still referring to FIG. 4B, the child device program may determine whether the trip has ended at step 437. An end of trip may occur when a vehicle 202 has reached its destination, puts the vehicle in park, and/or turns off the vehicle 202. For example, a trip from a home to a school may begin when the vehicle 202 leaves the home and end when the vehicle arrives at the school. In some cases, for example, if the user does not turn off the car at the school and drives back to the home, the end of the trip (which may be a round trip) may be the home. In some embodiments, the child device program may determine that the trip has ended based on information (e.g., that the vehicle 202 is in park, has been turned off, and/or a destination of a route entered into a GPS has been reached) received from the vehicle computing device 100v. Alternatively, or additionally, the child device program may determine that the trip has ended based on information collected by the child computing device 100 (e.g., accelerometer or GPS of the child computing device 100c). For example, a child or subordinate may enter a trip route into the child computing device 100c, and the end of the trip may be determined when the child computing device 100c detects that it has reached the destination of the route. Various algorithms may be used to automatically determine an end of a trip at step 437. FIG. 8 illustrates an example algorithm for determining whether the trip has ended.

In step 801, the child device program may obtain a potential end of trip time when the speed of the vehicle 202 is detected to be zero (0). In other words, at step 801, the child device program may detect when the speed of the vehicle 202 is 0 mph and set the time of this detection as a potential end of trip time. Then, in step 803, the child device program may check that the trip is already started. This check may include checking the value of a variable (e.g., Boolean) that is used to mark the trip as started (e.g., as may be done in step 507). If the trip is not started, the child device program may proceed to step 805 to reset (e.g., clear the value) the variable storing the potential end of trip time. In step 805, the child device program may also implement a delay to cause the process to wait for a predefined amount of time (e.g., 5 seconds, 10 seconds...2 minutes, etc.) before returning to step 801. If the trip is already marked as started (Yes at 803), the child device program may determine whether the current speed is greater than zero (0) mph at step 807. If the current speed is greater than 0 mph (Yes at step 807), the child device program may perform step 805. However, if the current speed is equal to 0 mph (No at step 807), the child device program may perform step 809. In step 809, the child device program may determine whether the difference between the current time and the potential end of trip time set in step 801 is greater than a predetermined end-of-trip threshold (e.g., 30 seconds, 1 minute, 2 minutes, 5 minutes, etc.). If the difference does not exceed the end-of-trip threshold (No at step 809), the child device program may return to step 807. If the difference does exceed the end-of-trip threshold (Yes at step 809), the child device program may proceed to step 811. In step 811, the child device program may mark the trip as having ended. Step 811 may include setting a value of a variable to indicate that the trip is ended. The variable may be the same variable used to mark the trip as started or may be a different variable.

Returning to FIG. 4B, if the trip has not ended (No at step 437), the child device program may return to step 421 to continue to collect drive data. However, if the trip has ended (Yes at step 437), the child device program may proceed to perform step 439. In step 439, the child device program may inquire whether the child (or subordinate) associated with the child computing device 100c was the driver of the vehicle 202 for the trip that just ended. For example, the child device program may prompt the child (or subordinate) to indicate whether he/she was the driver of the vehicle 202. This step may be performed in addition to, or instead of, step 419 described above. In embodiments where step 419 is performed to determine if the child is the driver, step 439 may include confirming that the child was the driver.

In step 441, the child program device may determine the drive results. Step 441 may include determining a duration of the trip, a total number of miles traveled during the trip, a total number of hard-braking events, a total number of speeding events, a total number of hard-turn events, a max speed, an average speed, etc. Such determinations may be made using the drive data collected during the trip. For example, the max speed may be determined from the speeds in the array built is step 711. In some embodiments, the child program device may determine a drive score for the trip at step 441.

Also, in some embodiments, step 441 may include creating a folder for storing details of the trip. A different folder may be created for each trip. The folder may be associated with a trip ID, which may be a unique identifier for identifying the trip from among other trips made by the child. Further, three text files may be created and placed in the folder. The three text files may include a first file for GPS data, a second file for accelerometer data, and a third file for trip summary data.

In step 443, the child device program may cause drive results to be displayed. That is, the child device program may generate reports showing the drive results and/or graphics to depict the reports. The child device program may display the results on a screen of the child computing device 100c or a screen of the vehicle 202 by communicating the results to the vehicle computing device 100v.

Further, the child device program may also transmit the drive results at step 445. The drive results or a portion thereof may be transmitted to the corresponding parent computing devices 100p and/or application servers 205 for later viewing by others. In some embodiments, step 445 may include compressing one or more of the three text files created in step 441 and uploading them to the application server 205 (which may be an FTP server).

In some embodiments, the application servers 205 may make the drive results available for viewing by others. For example, the application servers 205 may post the drive results to a web page that a corresponding parent (or superior), other authorized person, or the general public may access.

Figure 9:
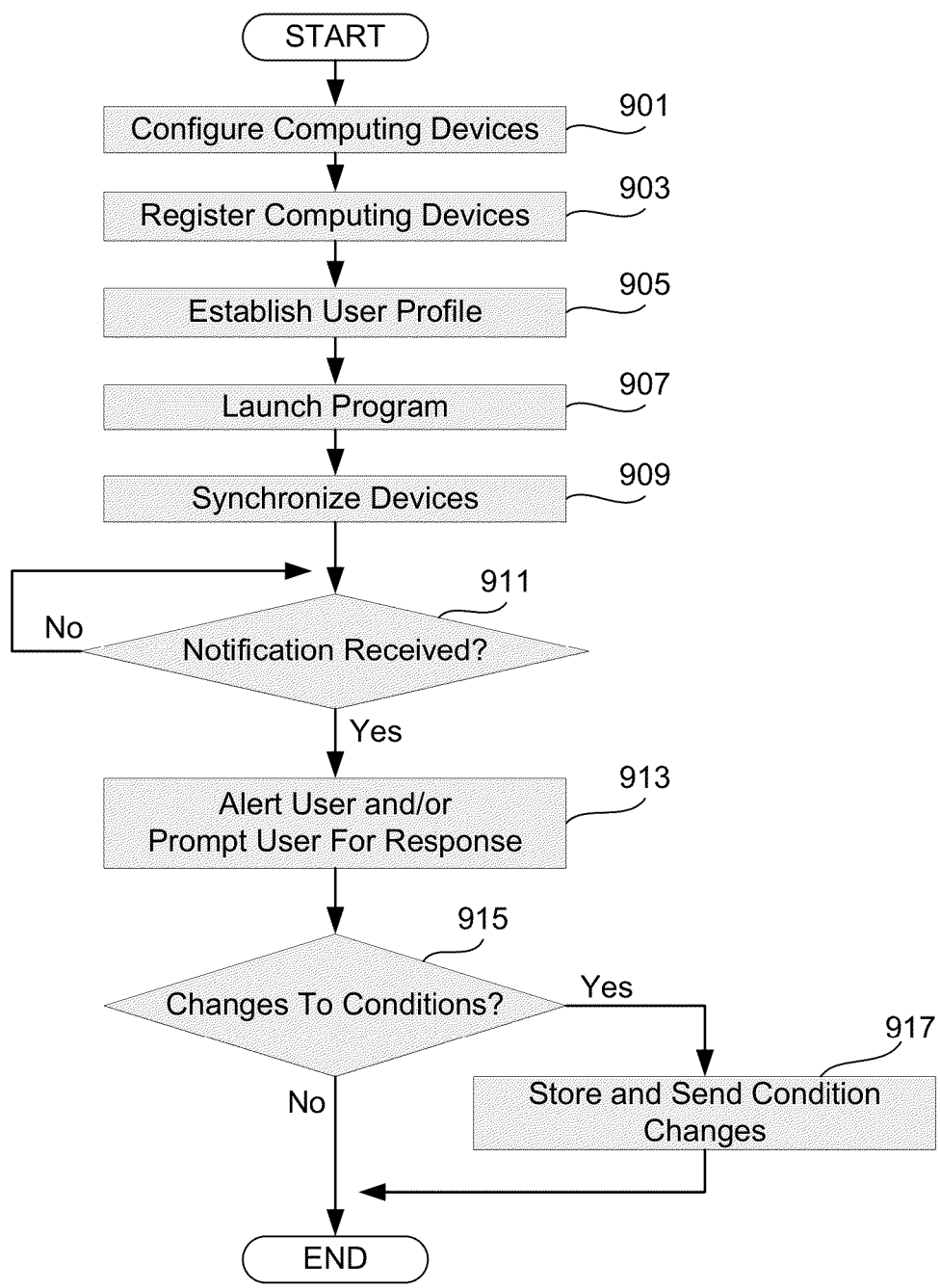
FIG. 9 illustrates a flow diagram of an example process in accordance with aspects of the present disclosure.

FIG. 9 illustrates a flow diagram for an example method in accordance with aspects of the present disclosure. More specifically, FIG. 9 illustrates a plurality of steps of a method for exchanging communications to facilitate monitoring of driving behavior. The steps of FIG. 9 may be performed by various devices disclosed herein, such as an administrative computing device 100a, a child computing device 100c, a vehicle computing device 100v, a parent computing device 100p, and/or an application server 205, which collectively form the vehicle telematics management system. In particular, one or more of the steps of FIG. 9 may be performed by executing a parent device program on a parent computing device 100p of the vehicle telematics management system. As a result of the method of FIG. 9, parents and/or other superiors may effectively monitor driving behavior of vehicles 202 carrying their children and/or other subordinates.

The method of FIG. 9 may begin with a step 901 of configuring the computing devices of the vehicle telematics management system. In particular, step 901 may include configuring the parent computing device 100p to interface with the vehicle telematics management system so that notifications related to driving behavior may be received from the system and parameters for setting conditions to track may be transmitted to the system, and in particular, to the child computing devices 100c. Further, configuring the parent computing device 100p may include installing an appropriate vehicle telematics management program, such as the parent device program, thereon. Different parent computing devices may install different versions of the parent device program depending on their platforms. For example, a parent computing device 100p running the iOS™ operating system may install a version for that platform, while a parent computing device 100p running the ANDROID™ operating system may install a different version. Also, in some cases, step 901 may include a step of downloading the parent device program onto a parent computing device 100p from an administrative computing device 100a, application server 205, or another server or online marketplace (e.g., APP STORE, GOOGLE PLAY, etc.).

In step 903, the parent (or other user) may register the parent computing device 100p with an organization (e.g., an insurance company) providing, maintaining, and/or managing the vehicle telematics management system. Registering the parent computing device 100p may include creating a username and/or password and/or logging into an already established account with a username and/or password. In some embodiments, the account may correspond to an automotive insurance policy, which has previously been established and is associated with vehicle and user information (e.g., possible drivers). In any event, registration at step 903 may include associating an account with the parent computing device 100p and/or user of the parent computing device 100p. To perform registration, a user may provide various information, including information regarding a parent computing device 100p (e.g., device identifier, device make, device model, etc.), information regarding a parent or other superior (e.g., name, birthdate, address, insurance policy number, number of children, names of children, etc.), and/or information regarding a vehicle (e.g., make, model, year, vehicle identification number (VIN), etc.). This information may be entered using the child computing device 100c or the parent computing device 100p, or a customer may contact a representative of an organization managing the vehicle telematics management system and the representative may enter the information using the administrative computing device 100a. Additionally, registering the parent computing device 100p may include associating the parent computing device 100p with one or more child computing devices 100c or an account associated with a parent. As mentioned above, the child may have one account and the parent may have another account and these accounts may be associated with one another or the child and parent may be part of the same account. It should be understood that various manners may be used to associate the parent and parent computing device 100p with a child and child computing device 100c. By associating the parent computing device 100p with a child computing device 100c, the vehicle telematics management system may be configured so that notifications may be transmitted from the child computing device 100c to the appropriate parent computing device 100p so that parents (or superiors) may monitor their respective children (or subordinates). Further, associating the parent computing device 100p with a child computing device 100c may allow a parent to push parameters to specific child computing devices 100c, so that conditions may be set with the parameters and notifications may be returned to the parents when the conditions are met.

In step 905, a user profile for a parent or other superior using the parent computing device 100p may be created and the parent or other superior may enter user preferences. The user preferences may permit the parent device program running on the parent computing device 100p to provide a customized experience. Further, a parent may create settings and parameters that affect what drive data is collected, how the parent views drive data, when a parent receives notifications (e.g., when a geo-fence 301 is violated, speeding event occurs, etc.), and how a parent receives notifications that conditions are met (SMS or MMS message, email, voice message, pop-up message within parent device program, etc.). Additionally, the parent may also use the parent computing device 100p to set up the geo-fence 301 at step 905.

In step 907, the parent device program may be launched on the parent computing device 100p. Launching the parent device program may cause the vehicle telematics manager 101 and/or general processor 103 of the parent computing device 100p to begin executing instructions of the parent device program. The user (e.g., parent or superior) of the parent device program may select a shortcut or otherwise cause the operating system of the parent computing device 100p to launch the parent device program. In some embodiments, the parent or superior may set up a username and/or password that authorizes them to track their children (by tracking the child's child computing device 100c). This security feature may prevent others from using the parent computing device 100p to track a child that is not their child. After this username and/or password is provided to the parent computing device 100p, it may be sent to an application server 205 for safe storage in case it needs to be recovered by the parent later (e.g., in case the parent forgets the username and/or password). In some embodiments, in order to use the parent device program to begin tracking a child (or review notifications received due to tracking), the parent may have to provide a username and/or password. For example, before the parent device program provides the location of the child, it may verify the username and/or password set up by the parent. Such verification may include checking the username and/or password against a username and/or password stored in an associated account on the application server 205 or against a username and/or password stored locally on the parent computing device 100p.

Once the parent device program is launched in step 907, it may continue to run in the background of the parent computing device 100p so as to receive notifications related to the driving behavior of a vehicle 202 carrying a particular child (or other subordinate). That is, the parent computing device 100p may continue to execute the parent device program even though the parent device program might not be providing a graphical user interface (e.g., a screen associated with the parent device program). For example, the parent computing device 100p may continue to maintain a thread executing instructions of the parent device program although such execution might not be readily apparent to the user. Because the parent device program may be configured to run in the background, it may allow parents (or other superiors) to monitor their children (or subordinates) without interfering with the parents' use of their parent computing device 100p. For example, a parent may use their parent computing device 100p to make a phone call, and the parent device program may detect a notification from a corresponding child computing device 100c during the phone call. In some cases, the parent device program operating in the background may interrupt another action (e.g., participating in a phone call, composing a text message, composing an email, web browsing, etc.) being performed on the parent computing device 100p when the parent device program receives a notification.

Although FIG. 9 illustrates that the parent device program is launched in step 907, in some cases, the parent device program may be launched in step 901 when the program is installed, launched in step 903 to register the parent computing device 100p, or launched in step 905 to set up parameters and other user preferences. Still, other events (e.g., turning on the parent computing device 100p, charging the parent computing device 100p, etc.) may automatically trigger the launching of the parent device program on the parent computing device 100p. Further, the parent device program may be manually launched as well, for example, when a user selects a shortcut from a list of applications (or programs). Moreover, in some embodiments, once the parent device program is installed or initially launched, it may be configured to automatically re-launch (like the child device program may re-launch on the child computing device 100c) when the parent computing device 100p is turned on, charging, or charged above a certain threshold. In some embodiments, the parent device program may be in a sleep mode (in which battery drainage is less) unless the parent is using the parent device program to set parameters/conditions or a child is driving. For example, the parent device program may receive a notification that a child is starting a trip in a vehicle 202, which may cause the parent device program to awaken from the sleep mode.

In step 909, the parent computing device 100p may be synchronized with one or more child computing devices 100p and/or vehicle computing devices 100v. For example, where the parent computing device 100p is used to establish guidelines/parameters for when (e.g., under what conditions) a parent wishes to receive notifications, such guidelines may be synchronized with the appropriate child computing device 100c so the child computing device(s) 100c will send the notifications according to those guidelines. Synchronization at step 909 may include the parent device program pushing (e.g., transmitting without an initial request) guidelines or parameters to corresponding child computing devices 100c. A parent may desire to monitor multiple children or subordinates, and thus, the synchronizing at step 909 may include pushing guidelines/parameters to multiple child computing devices 100c and/or vehicle computing devices 100v. Also, different parameters may be set up for different children, so synchronizing at step 909 may include transmitting one set of parameters to one child computing device 100c and another set of parameters to another child computing device 100c. Further, synchronizing at step 909 may include transmitting the parameters to an application server 205, which may store the parameters for subsequent transmission to the child computing devices 100c and/or vehicle computing devices 100v (e.g., in cases where the child computing device 100c is not available or turned off). In response to the synchronization at step 909, the parent may be alerted when synchronization is complete (e.g., when a child computing device 100c has received the parameters).

The parent device program running in the background on a parent computing device 100p may determine whether a notification has been received at step 911. The notification may be received from the child computing device 100c, vehicle computing device 100v, and/or application server 205, and may indicate whether a condition set up by the parent has been met (e.g., a restriction has been violated). As shown in FIG. 9, the parent device program may return to step 911 until a notification is detected. As such, the parent device program may continue to monitor signals for notifications regarding a child's driving behavior.

In some cases, the parent device program might not be running on a parent computing device 100p (e.g., because the parent device program has been closed or is not responding) or the parent computing device 100p may be unavailable (e.g., cannot receive cell signals) when a notification is to be sent to the parent computing device 100p. In such cases, an application server 205 may receive the notification and store the notification for later transmission to the parent computing device 100p (e.g., when the parent computing device 100p is turned on, when the parent device program is launched on the parent computing device 100p, or when the parent computing device 100p is receiving cellular signals). In some embodiments, the application server 205 may be configured to send a text message or email or initiate a phone call to the parent computing device 100p depending on the type of notification that is to be sent to the parent computing device 100p. Some notifications may be deemed emergency or urgent (e.g., high priority) notifications, while other notifications might be deemed non-emergency or non-urgent (e.g., low priority) notifications. Emergency notifications may cause an application server 205 to take additional measures to notify the parent, while non-emergency notifications might only be communicated through a parent device program. For example, if the notification indicates that the child is very far outside a geo-fence 301, has been involved in an accident, or is otherwise in a situation deemed to be an emergency, the application server 205 might not just deliver the notification through the parent device program, but may additionally or instead initiate a phone call to the parent or others (e.g., an emergency contact, emergency respondents, etc.).

If a notification is detected at step 911, the parent device program may alert a user of the parent computing device 100p of the notification and/or prompt the user for a response to the notification at step 913. The alert may take the form of other alerts described herein, such as a pop-up message, sound, etc. If a prompt is provided, the prompt may include a message intake screen through which the parent may compose a written message or record an audio message to be sent back to the child device program that generated and transmitted the notification. Alternatively, or additionally, the prompt may include a shortcut to establish a phone call or compose a text message to the child computing device 100c that sent the notification. The prompt may also include a shortcut to establish a phone call with an emergency service number (e.g., police station number, 9-1-1, etc.). Further, the prompt may include an inquiry as to whether the parent would like to change any parameters (e.g., expand or constrict a geo-fence 301, increase or decrease a speed threshold, increase or decrease a hard-braking threshold, etc.). In some embodiments, the prompt may include an option for the parent to choose to turn off the engine of the vehicle 202, disable (e.g., disengage the transmission) of the vehicle, or otherwise regulate operation of the vehicle 202 (e.g., govern the speed of the vehicle 202). For example, if the parent does not approve of the child's driving behavior, the parent may select to disable the vehicle 202 which may result in the parent computing device 100p sending a signal to the vehicle 202 (through the child computing device 100c or vehicle computing device 100v) to cause the vehicle 202 to come to a stop. The signal may also cause the child computing device 100c or vehicle computing device 100v to warn the driver that the vehicle 202 has been disabled so the driver can safely come to a stop. For example, the child computing device 100c may warn the driver to pull over because the vehicle 202 will be turned off in two minutes.

In step 915, the parent device program may determine whether any conditions have been changed. In other words, the parent device program may determine whether the parent has chosen to make changes to any parameters used to set conditions for monitoring a vehicle 202 carrying their child. Changing a condition may include adding a new condition, deleting a previous condition, or changing a parameter of a condition. Notably, in some embodiments, changes may be made at any time, including while a child is driving or riding in a vehicle 202.

If the parent device program determines that a condition has been changed (Yes at step 915), the parent device program may proceed to step 917 to store and/or send notifications of the change. The new conditions (or parameters thereof) may be stored locally on the parent computing device 100p and/or transmitted to an application server 205 for storage in "the cloud." Also, the parent computing device 100p may send a notification to the child computing device(s) 100c to which the new condition applies thereby alerting the child of the new condition and setting the child computing device 100c to notify the parent computing device 100p when the condition is met. Where multiple conditions are changed in one session, the conditions may be consolidated into one notification for transmission to the child computing device 100c.

Although step 915 is shown as occurring after step 913 when a user is prompted, it should be understood that the parent device program may allow a parent to set or change conditions (e.g., parameters for defining conditions) at any time. For example, a parent may manually launch the parent device program or select an option therein which may display a screen on the parent computing device 100p for setting conditions. The parent device program may also allow a parent to review trip details (e.g., drive scores, driving events, etc.) of vehicles 202 carrying their children at any time. For example, a parent may select an option of the parent device program to review a report for a current drive or a report from a history of previous drives.

FIGS. 10-15 illustrate various user interfaces generated by the vehicle telematics management system in accordance with various aspects of this disclosure. In particular, these user interfaces may be generated by a child computing device 100c. It should be understood that the user interfaces of FIGS. 10-15 are designed to illustrate various features and aspects of the user interfaces and the system, and do not limit the visual appearance or layout of the user interfaces.

Figure 10:
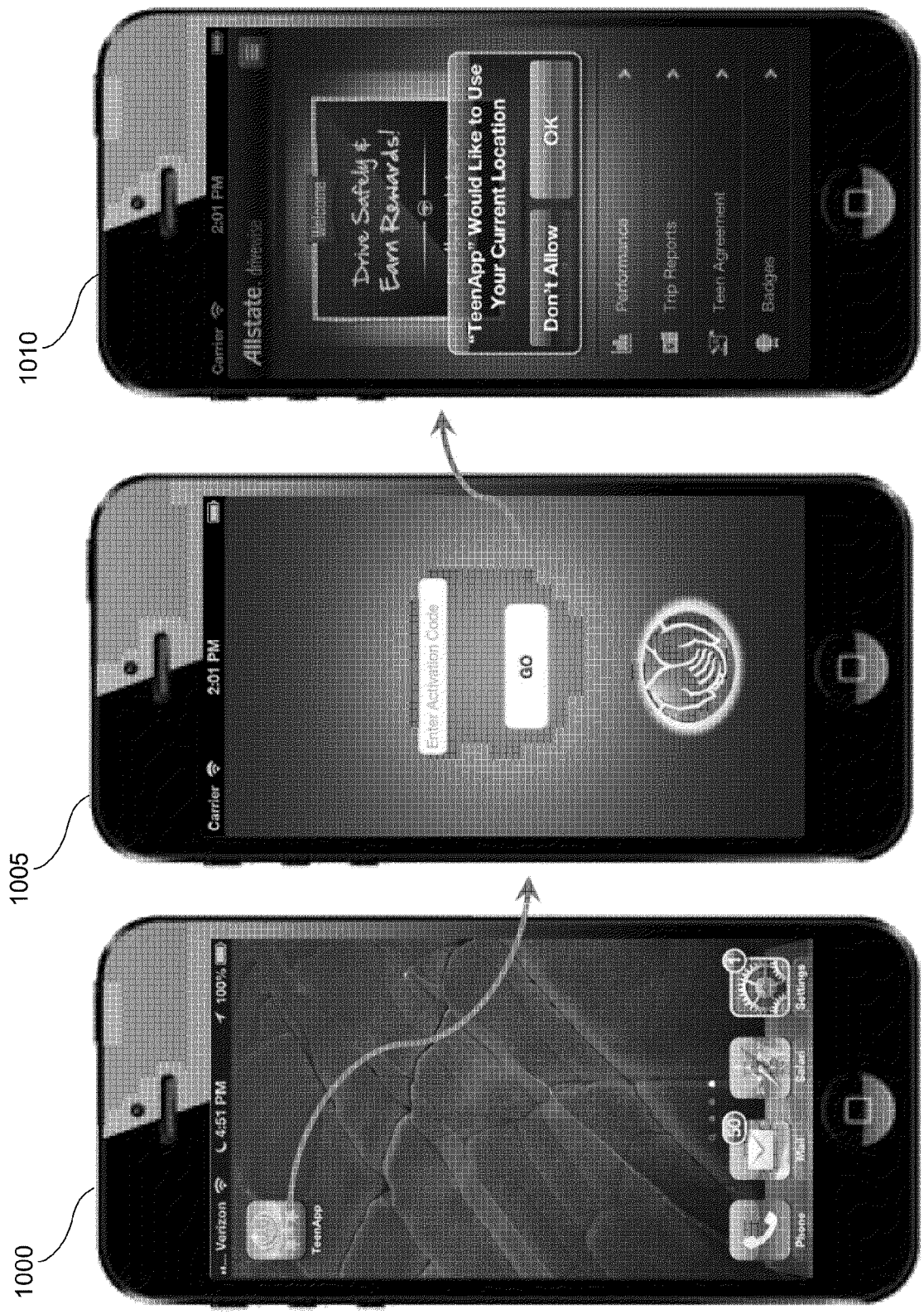

FIG. 10 illustrates a user interface 1000 displaying an example shortcut for an example child device program (called "TeenApp") on a screen of a child computing device 100c. As shown in FIG. 10, the child computing device 100c may be a smartphone. The shortcut may be presented on a home screen (or desktop screen) of an operating system executed by the child computing device 100c. When the shortcut is selected, the child device program may be launched. FIG. 10 illustrates an example user interface 1005 that may be initially displayed upon launching the child device program. As shown in FIG. 10, the user interface 1005 may include a field for accepting an activation code (or access code) or other user identification information.

FIG. 10 further illustrates another user interface 1010 that may appear on the screen of the child computing device 100c when the child device program is first launched. In the example of FIG. 10, the user interface 1010 includes a pop-up window requesting permission to use the current location of the child computing device 100c. Choosing "OK" in the pop-up window of the user interface 1010 may trigger the child device program to activate a GPS receiver of the child computing device 100c (or another means for acquiring the location of the child computing device 100c). In some embodiments, once the child device program (e.g., "TeenApp") is given permission to use the current location, the child device program may always use the current location without having to request permission again. Thus, a parent may give the child device program permission to use the current location of the child computing device 100c, and a child using the child computing device 100c might not be able to change this setting so that the child cannot avoid being tracked by the parent. In light of user interface 1010, it should be understood that other user interfaces may be displayed to request other permissions and/or to receive acceptance of license agreements.

Figure 11:
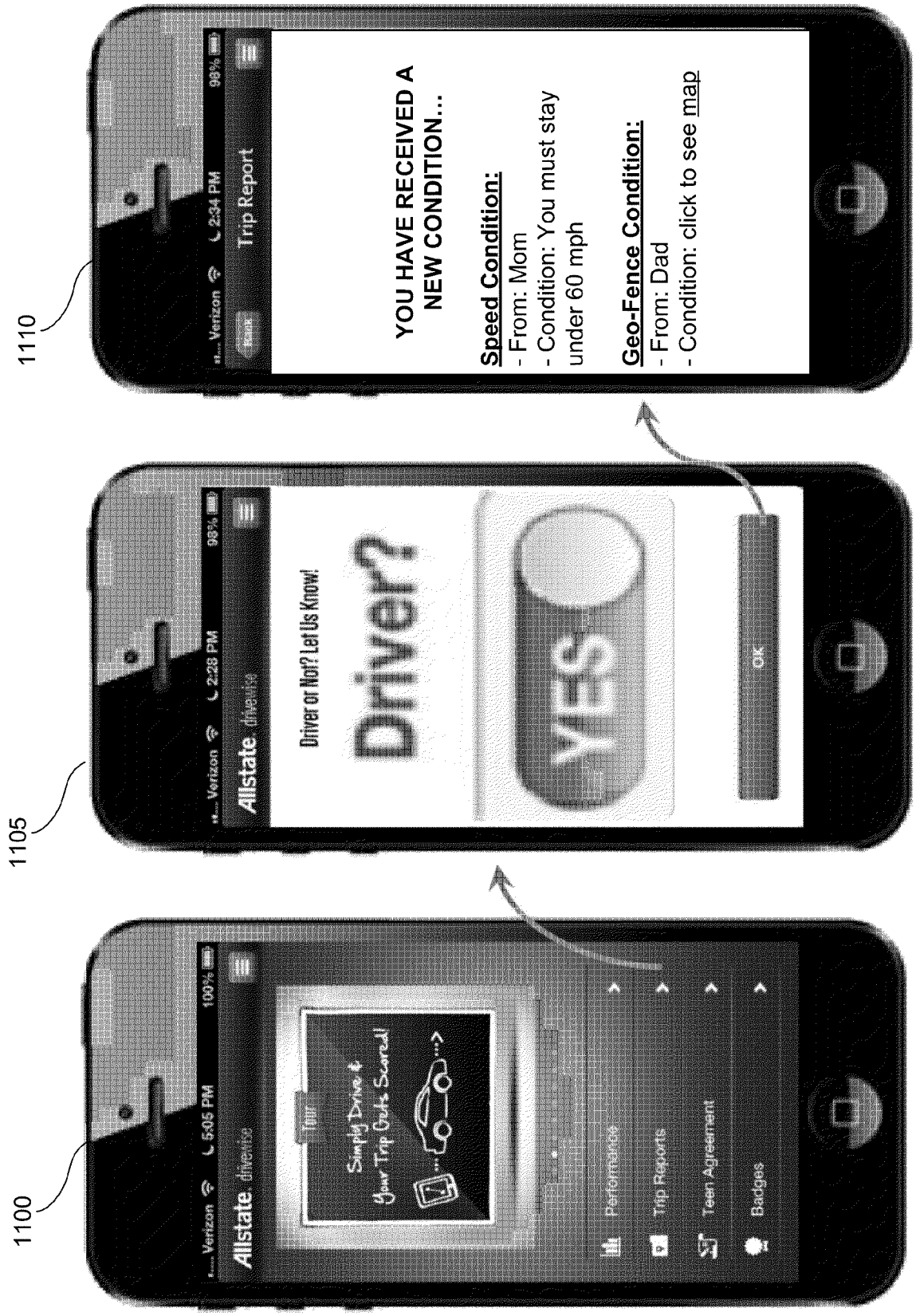
Figure 22:
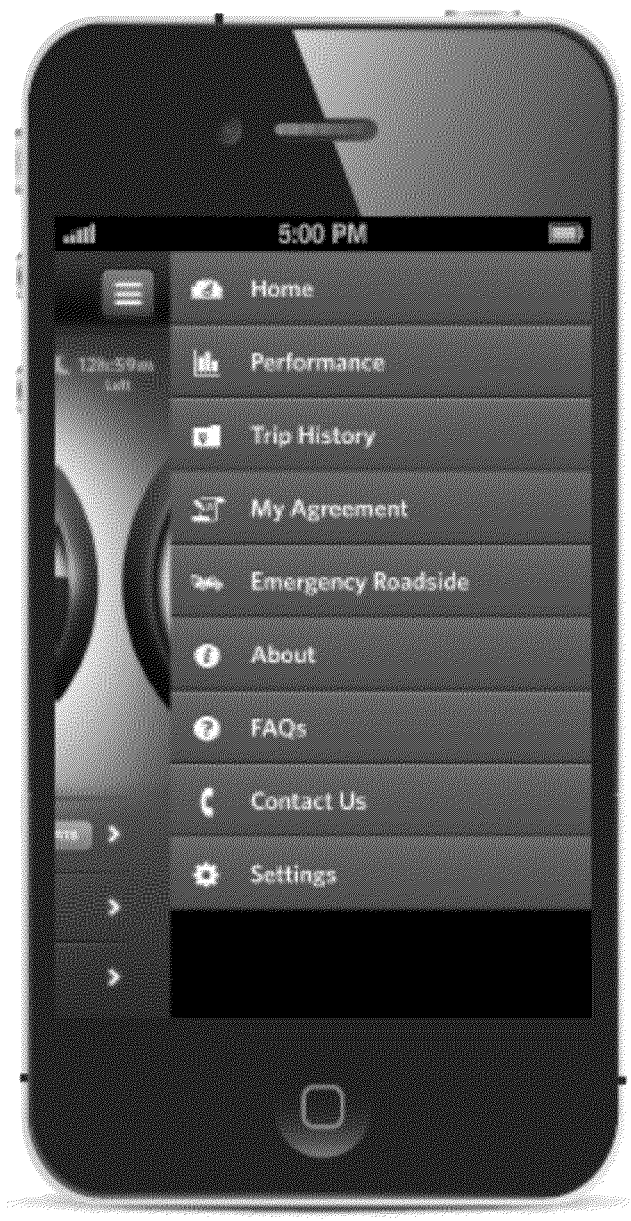
FIGS. 22-28 illustrate diagrams of example interfaces presented by computing devices configured according to aspects of the present disclosure.

FIG. 11 illustrates additional user interfaces in accordance with further aspects of the disclosure. The user interface 1100 illustrates an example home screen of the child device program. As shown from the user interface 1100, a user may select a number of options from the home screen. In the example user interface 1100 of FIG. 11, a user may choose to see the performance of a current drive, trip reports of past trips, an agreement (which may include information about the conditions that are applicable to the child, such as speeding thresholds, hard-braking thresholds, geo-fence information, goals, etc.), and badges (which may include badges, points, and other rewards the child has achieved or may achieve). It should be understood that user interface 1100 is an example interface. FIG. 22 illustrates another example interface that could be used instead of user interface 1100.

Figure 23:
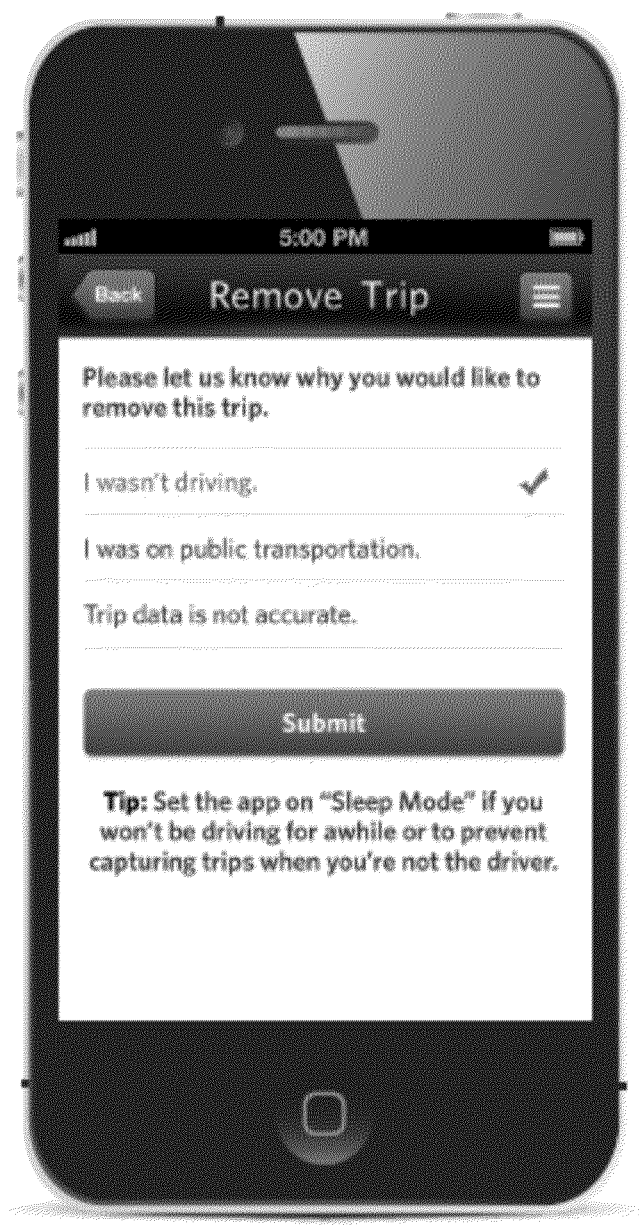

As described herein, the child device program may automatically detect when a trip has started. For example, the child device program may detect that the child computing device 100c is moving at a speed greater than a predetermined threshold (e.g., 15 mph), and therefore, may automatically determine that the child is in a moving vehicle 202. In other words, when the child computing device 100c first exceeds a predetermined speed, the child device program may determine that a trip has started. When such a determination is made, the child device program may generate a user interface 1105 as shown in FIG. 11 to inquire whether the child is the driver or not. For example, the user interface 1105 may include a prompt, as described with respect to step 419, that allows a user (e.g., the child associated with the child computing device 100c) to indicate whether he/she is the driver of the vehicle 202. As described herein, whether the child is the driver or not may be a factor in determining whether or not a corresponding parent is notified of certain conditions (e.g., violations of restrictions). If the child does not respond to the inquiry (e.g., answer the prompt), the child device program may set the child to be the driver by default. Alternatively, the default may be to set the child as a passenger (e.g., not as the driver), so as not to avoid incorrectly alarming parents. Whether the child is set as the driver by default may be a user customizable setting within the child device program. It should be understood that user interface 1105 is an example interface. FIG. 23 illustrates another example interface that could be used instead of user interface 1105.

FIG. 11 also shows an example user interface 1110 generated by the child device program when a notification of a new condition is received. Notably, the user interface 1110 may be displayed while the child is driving a vehicle 202. The example user interface 1110 illustrates that a notification of two conditions may be received. The first condition relates to a speed condition that may have been established by the child's mom. As shown in FIG. 11, the speed condition may indicate that the child is not to drive at a speed exceeding 60 mph. The second condition relates to a geo-fence 301 that may have been set up by the child's dad. As shown in FIG. 11, the user interface 1110 may include a link to a map 300 showing a geo-fence 301 that applies to the child. In some embodiments, notifications might not be displayed on the child computing device 100c so as not to distract the child while they are driving. Instead, or additionally, the notifications may be audibly communicated to the child or displayed on a display of the vehicle 202 (by forwarding the notifications to the vehicle computing device 100v), which may be more easily visible by the driver.

FIG. 12 illustrates an example user interface 1200 that may be generated and displayed after a drive is ended. For example, after the child device program automatically determines that a trip is ended (e.g., because the vehicle 202 has not moved for a certain period of time), the child device program may display the user interface 1200 on the screen of a child computing device 100c. As shown in FIG. 12, the user interface 1200 may include a link to details about the trip.

FIG. 12 also illustrates that the child device program may generate a user interface 1205 to inquire whether the child was the driver of the trip after the trip has ended. For example, the user interface 1205 may include a prompt, as described with respect to step 439, that allows a user (e.g., the child associated with the child computing device 100c) to indicate whether he/she is the driver of the vehicle 202. Again, whether the child is the driver or not may be a factor in determining whether or not a corresponding parent is notified of certain conditions (e.g., violations of restrictions). This information may also factor into whether a report of the trip is sent to a parent after the trip is completed. If the child does not respond to the inquiry (e.g., answer the prompt), the child device program may set the child to be the driver by default. Alternatively, the default may set the child as a passenger (e.g., not as the driver), so as to cut down on the number of reports sent to the parents (e.g., only send reports to parents when it is fairly confident that the reports represent driving behavior of their child). Whether the child is set as the driver by default may be a user customizable setting that is stored, e.g., within the child device program. It should be understood that user interface 1205 is an example interface. FIG. 23 illustrates another example interface that could be used instead of user interface 1205.

Figure 24:
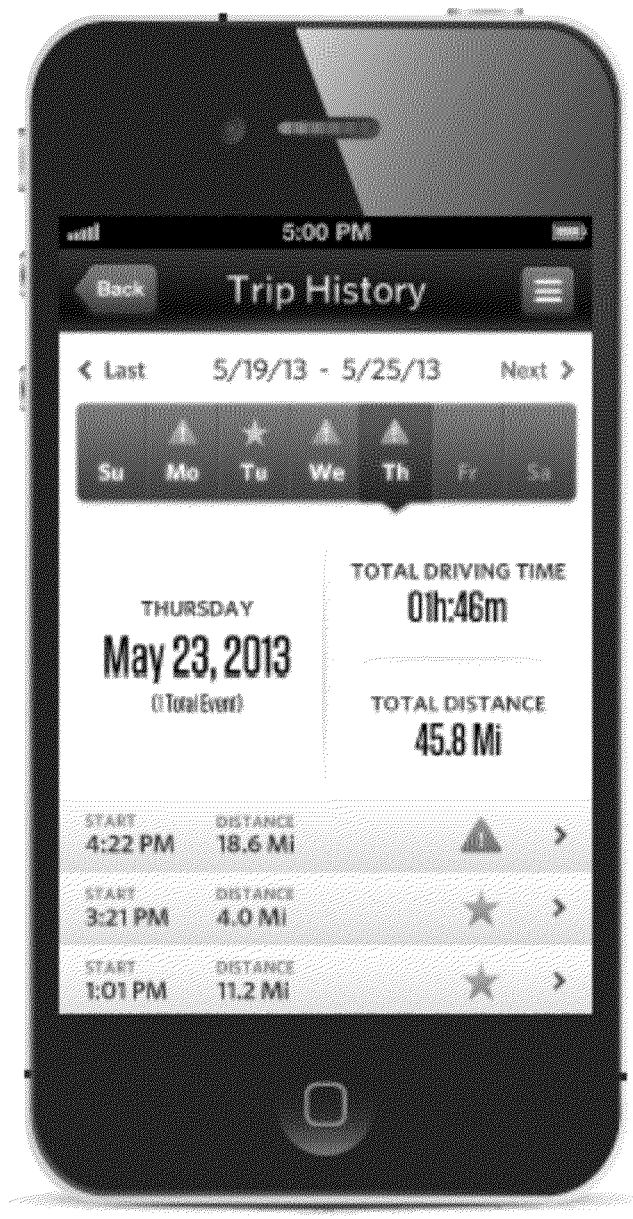

FIG. 12 further illustrates a user interface 1210 that provides a trip report indicating trip details. As shown in FIG. 12, the user interface 1210 may indicate time and date of a trip, a total distance of a trip, a total duration of a trip, and a graph depicting a performance of the trip. For example, the graph may illustrate where on the spectrum of driving performances (e.g., driving performances of all users of the vehicle telematics management system) a particular trip falls. It should be understood that user interface 1210 is an example interface. FIG. 24 illustrates another example interface that could be used instead of user interface 1210.

Figure 13:
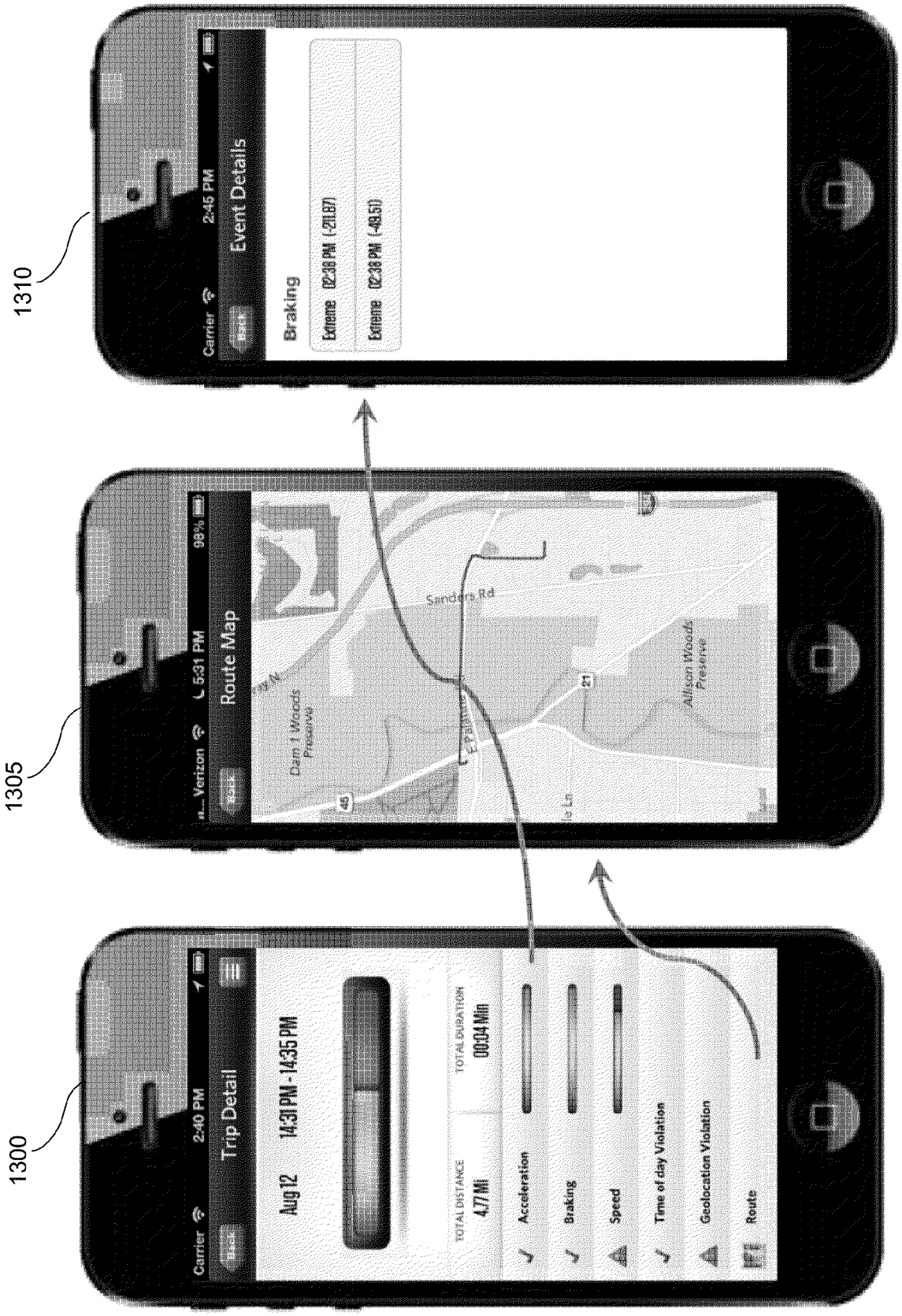

FIG. 13 illustrates another example of a user interface 1300 that provides a trip report. As shown, the trip report in user interface 1300 includes performance graphs for several driving characteristics (e.g., acceleration, braking, speed, etc.). The trip report in user interface 1300 also indicates what conditions were met (e.g., violations occurred) during the trip. Further, the user interface 1300 may include a link to a map showing the route of the trip. When the user selects such a link, the user interface 1305 may be generated and displayed. The user interface 1305 may illustrate the path that the vehicle carrying the child took from the start of the trip to the end of the trip. In some embodiments, the path may show where certain conditions were met. For example, the path may show points where the child was speeding or where a hard-braking event took place. Also, in some embodiments, the path may be interactive so that such points are only shown when a portion of the path is selected (e.g., by touching a portion of the path with a finger or other stylus).

Figure 25:
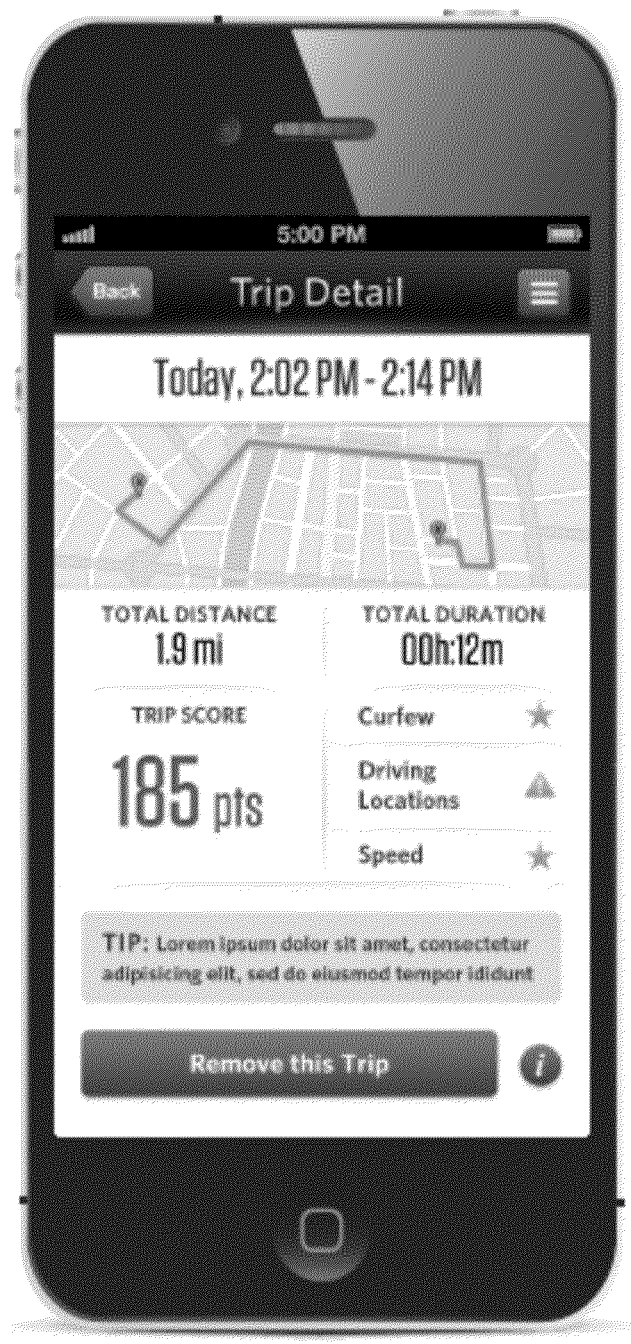
Figure 26:
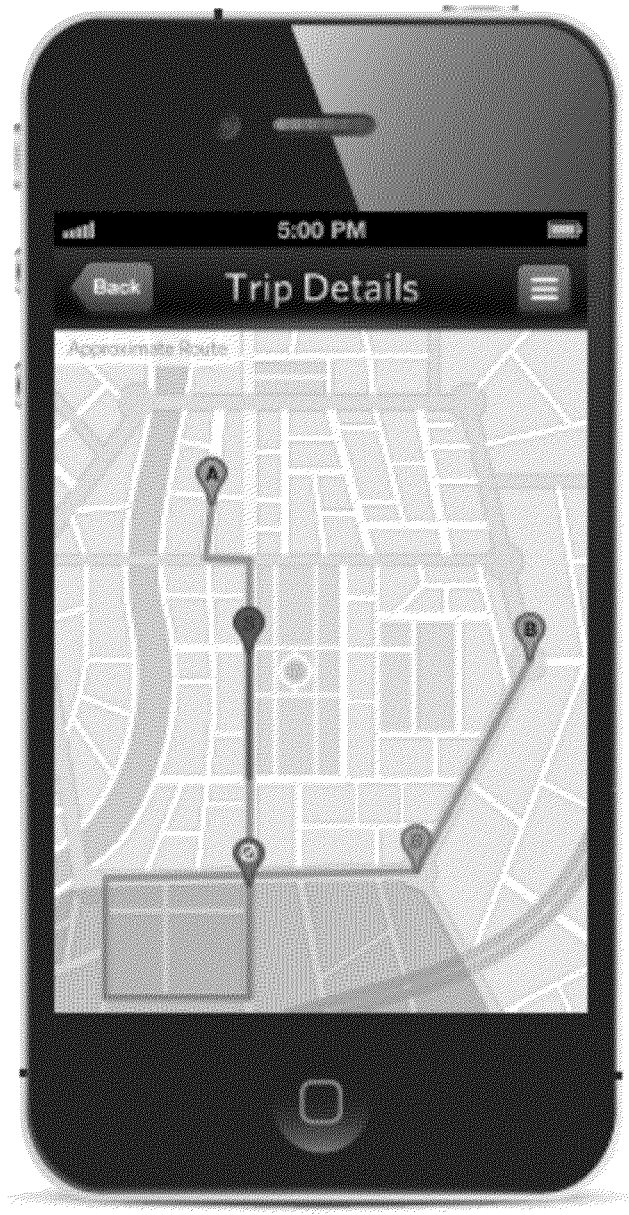
Figure 34:
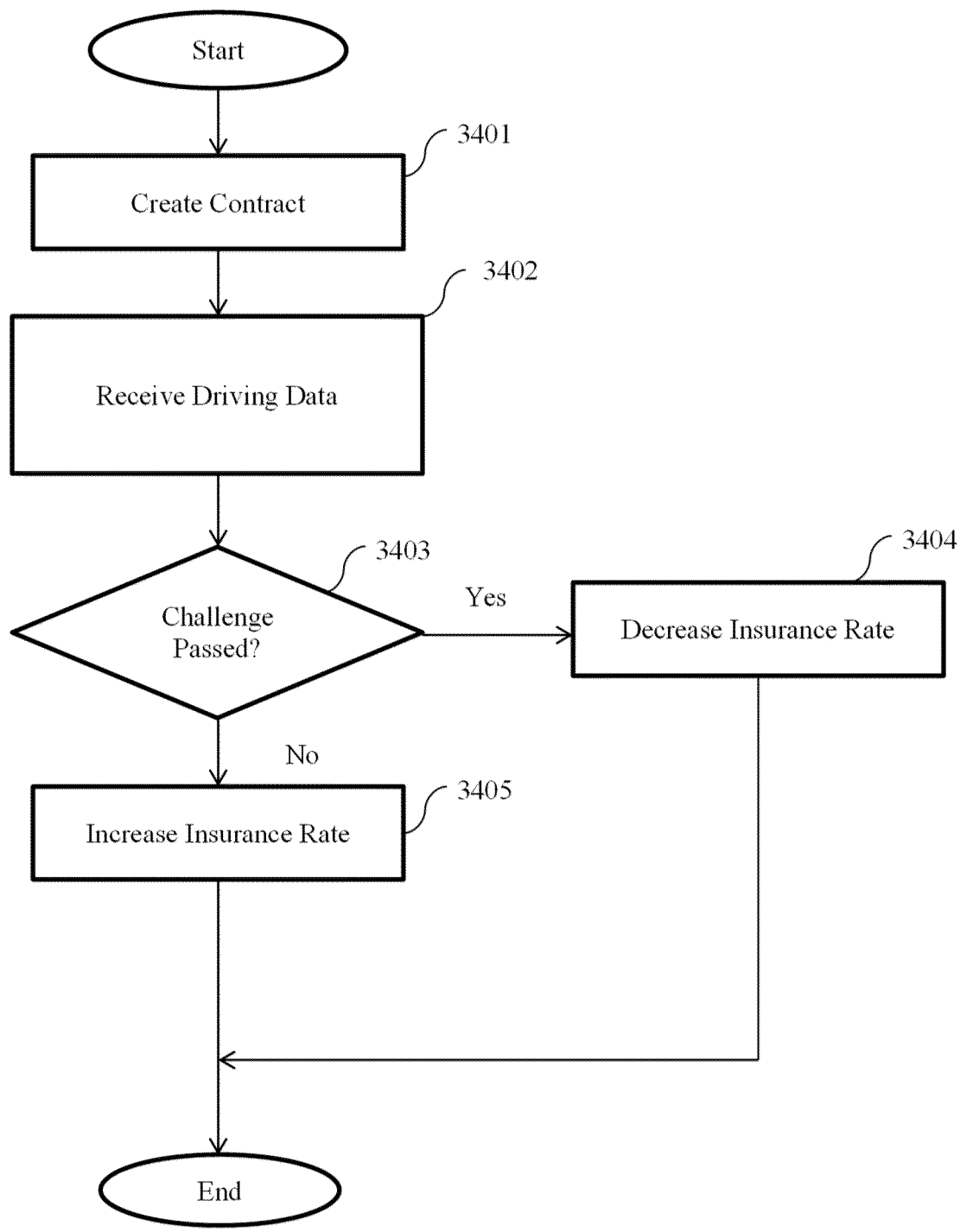
FIG. 34 illustrates a flow diagram of an example process in accordance with aspects of the present disclosure.

As illustrated in FIG. 13, in some embodiments, the trip report in user interface 1300 may also include a link to event details for particular driving events. For example, a user may select a link on the user interface 1300 to see event details related to braking events as shown on user interface 1310. In particular, user interface 1310 illustrates two times at which an extreme braking event (e.g., braking harder than a braking threshold) may have occurred. It should be understood that user interfaces 1300 and 1305 are examples. FIGS. 25 and 34 illustrate other example interfaces that could be used instead of user interfaces 1300 and 1305, respectively.

Figure 14:
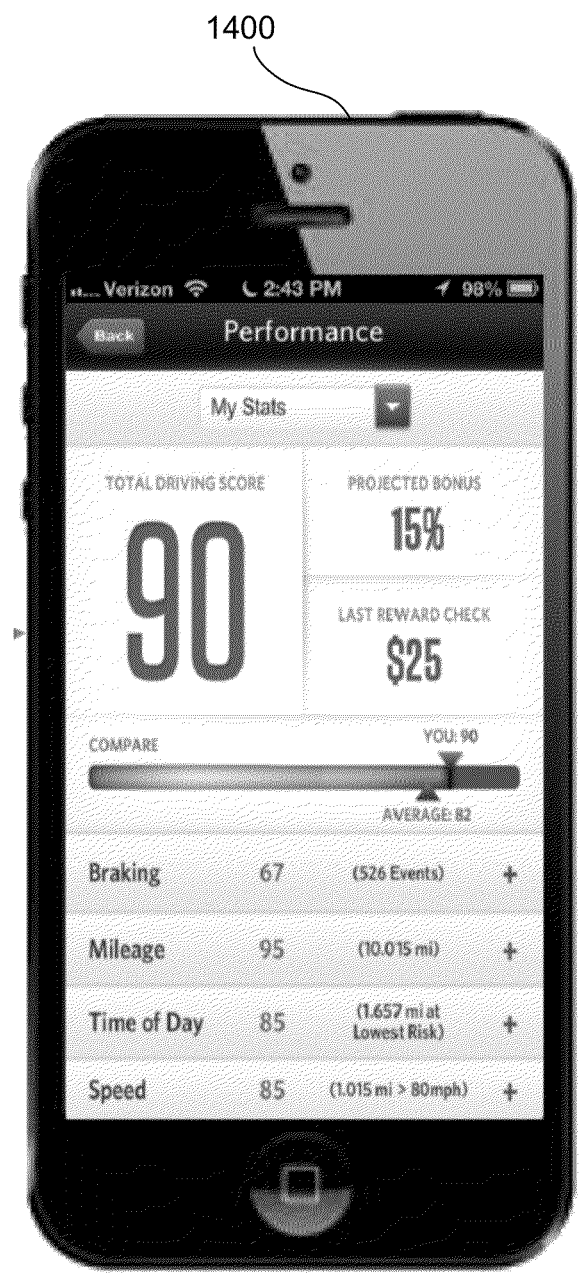
Figure 27:
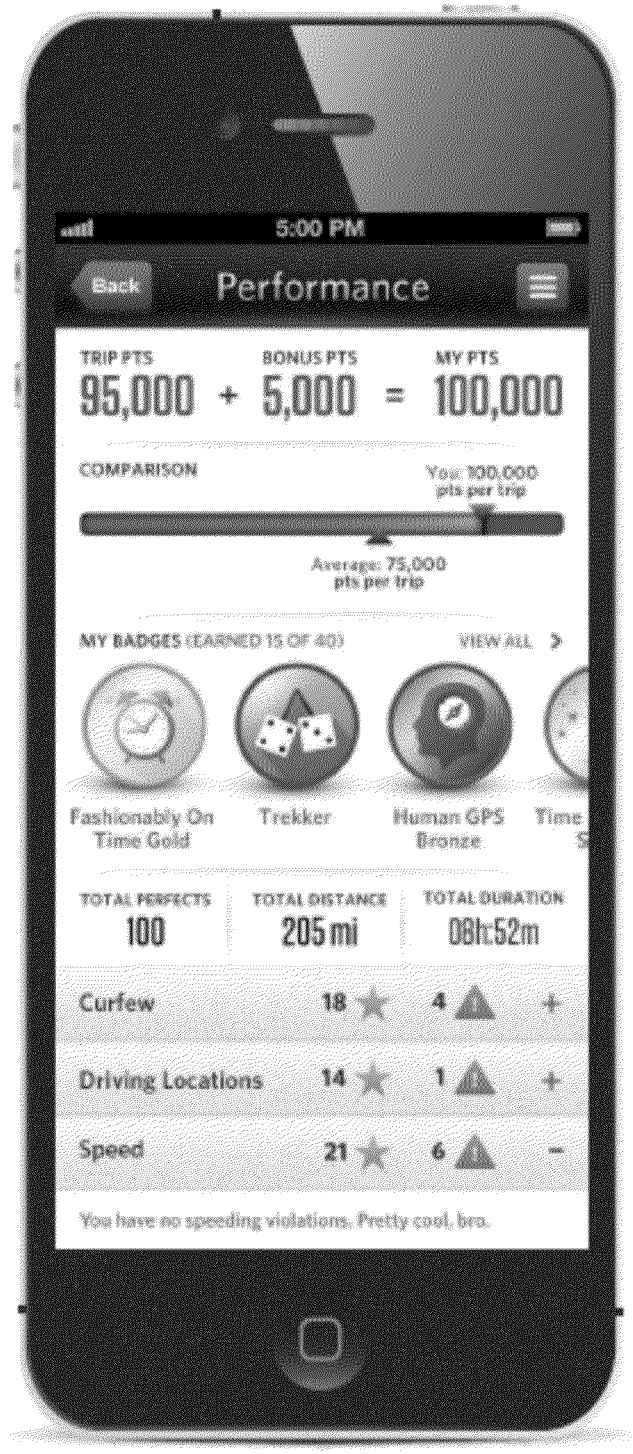

FIG. 14 illustrates another user interface 1400 displaying a performance of the driver for a particular trip. As shown in FIG. 14, the user interface 1400 may indicate a driving score (e.g., 90 out of a possible 100), a projected bonus, and an amount of a monetary reward (e.g., $25). The user interface 1400 of FIG. 14 illustrates some of the vehicle telematics data that may have been obtained during the trip as well. Specifically, the user interface 1400 may indicate a total number of braking events, a total mileage traveled during the trip, a time of day score (reflecting a level of risk associated with the time at which the trip took place), and speed data (e.g., a maximum speed, a distance traveled above a certain speed, etc.). It should be understood that user interface 1400 is an example interface. FIG. 27 illustrates another example interface that could be used instead of user interface 1400.

Figure 15:
Figure 28:
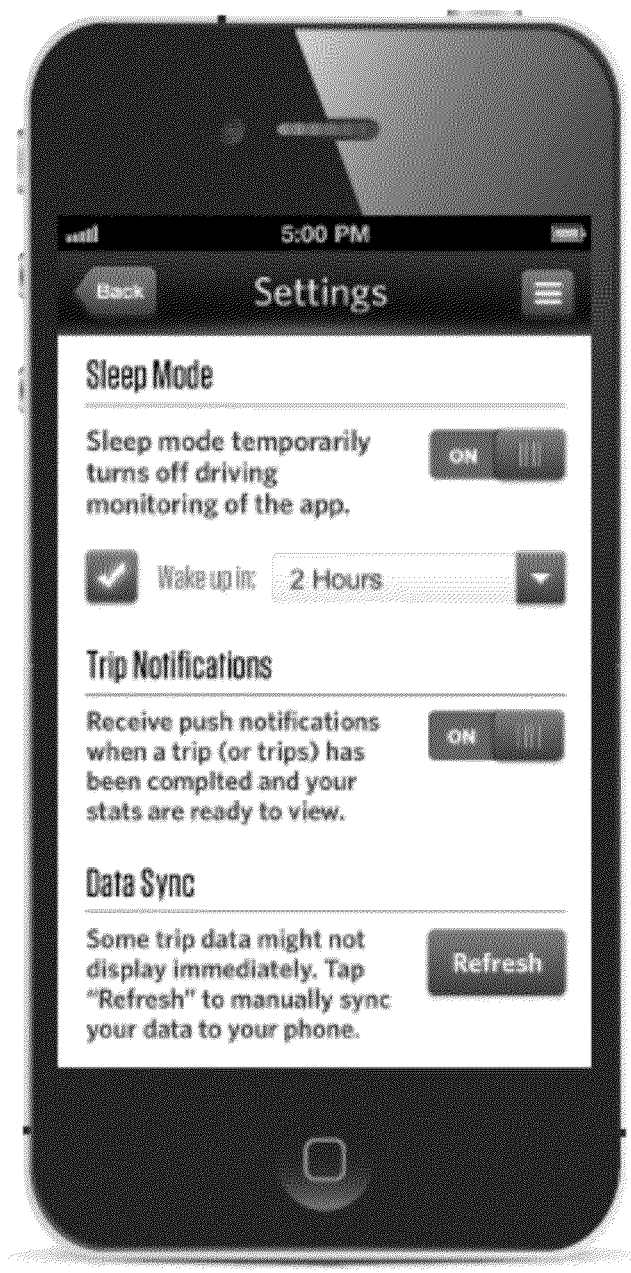

FIG. 15 illustrates an example user interface 1500 for customizing the child device program. That is, the user interface 1500 of FIG. 15 may be generated by the child device program to allow the user to input settings for the child device program. As shown in FIG. 15, the user may set a period in which the child device program does not run in the background. For example, the user may wish to shut down the child device program while the child is on vacation. Additionally, through the user interface 1500, a user may set a battery level at which the child device program is shutdown (e.g., paused or put in a sleep mode during which the child device program might not collect vehicle telematics data and/or might not communicate notifications to parents and/or the application servers 205). The user interface 1500 also illustrates a setting for forcing the child device program to shut down or enter the sleep mode. In some embodiments, one or more of the settings might only be changed by authorized persons, such a parent of the child using the child computing device 100*c* executing the child device program. It should be understood that user interface 1500 is an example interface. FIG. 28 illustrates another example interface that could be used instead of user interface 1500.

In light of the user interfaces of FIGS. 10-15, it should be understood that other user interfaces may be generated and displayed on the child computing device. Additionally, it should also be understood that related user interfaces may be generated and displayed on a parent computing device 100*p* executing a parent device program.

Figure 16:
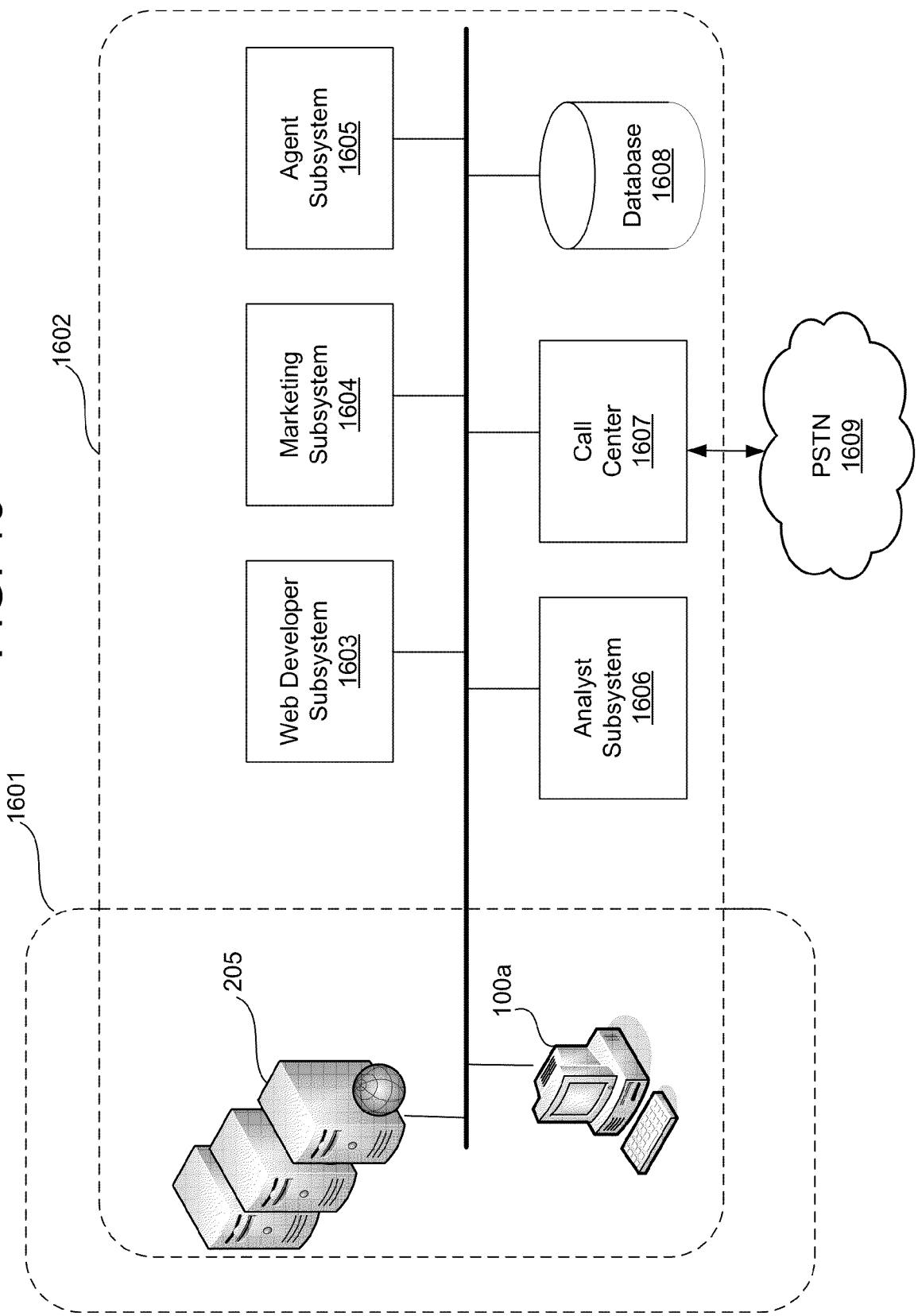
FIG. 16 illustrates the integration of example systems described in the present disclosure.

FIG. 16 illustrates the integration of the vehicle telematics management system 1601 and an account management system 1602. As shown in FIG. 16, portions of the vehicle telematics system, such as the administrative computing device 100*a* and application servers 205, may be accessed by one or more subsystems of the account management system 1602. FIG. 16 only illustrates the application servers 205 and the administrative computing device 100*a* of the vehicle telematics management system 1601; however, it should be understood, particularly in light of FIG. 2, that additional computing devices may be included in the vehicle telematics management system 1601. Further, with regards to the account management system 1602, FIG. 16 illustrates several subsystems and business units of the account management system 1602; however, more or fewer may exist. Specifically, FIG. 16 shows the account management system including a web developer subsystem 1603, a marketing subsystem 1604, an agent subsystem 1605, an analyst subsystem 1606, a call center 1607, and a database 1608.

The web developer subsystem 1603 may include computing devices and other equipment used by web developers to build and update a website. In an example embodiment, the website may be the website of an insurance company, such as an automobile insurance company. The website may include one or more webpages including various objects (e.g., HTML elements) accessible via the Internet. The website may also include private webpages that are only accessible using computing devices on an organization's intranet. The web developer subsystem may be responsible for installing objects to collect web analytics (e.g., cookies) of visitors to the website. As such, analysts and marketing personnel may be provided with analytics data indicating how customers and potential customers interact with the website.

The marketing subsystem 1604 may include computing devices and other equipment used by marketing personnel. The marketing personnel may access the website to advertise promotions, contests, products, and services. The marketing personnel may use information from the safe driving agreement described herein to target advertisements to customers. The marketing subsystem may be used to promote the child device program and/or parent device program. The marketing subsystem may also be used to direct customers to enroll in value-added services, such as the teen safety service.

The agent subsystem 1605 may include computing devices and other equipment used by agents, such as insurance agents. Agents may be assigned to customers and/or regions to serve as a contact for customers and/or potential customers. The agent subsystem may be used to encourage and instruct customers to install child device programs and/or parent device programs and to enroll in value-added services.

The analyst subsystem 1606 may include computing devices and other equipment used by analysts to assess risks. The analysts may evaluate the safe driving agreements to determine risk levels associated with customers. Analysts may also compare safe driving agreements with past driving history to determine correlations that may be used in offering insurance rates to future customers.

The call center 1607 may include computing devices and other equipment (e.g., telephones) used by customer service representatives and other personnel to take phone calls from customers and potential customers. As shown in FIG. 16, the call center may interface with the public switched telephone network (PSTN) 1609 to take such phone calls. The customer service representatives may use computing devices to access user accounts of customers to assist them in enrolling in services, such as the teen safety service. The customer service representatives may also provide assistance in editing/updating account information.

The database 1608 may include memory used to store account information. In some examples, the account information may include insurance policy information, such as the name of a policy holder, names of others on the policy (e.g., children of the policy holder), vehicles on the policy, password and usernames, insurance claim information, driving records, email addresses, phone numbers, etc. Although only one database is shown in FIG. 16, many databases may be used. The databases may supplement the memory of the application servers 205. Also, any information stored in the application servers 205 may additionally, or alternatively, be stored in the database 1608.

Figure 17:
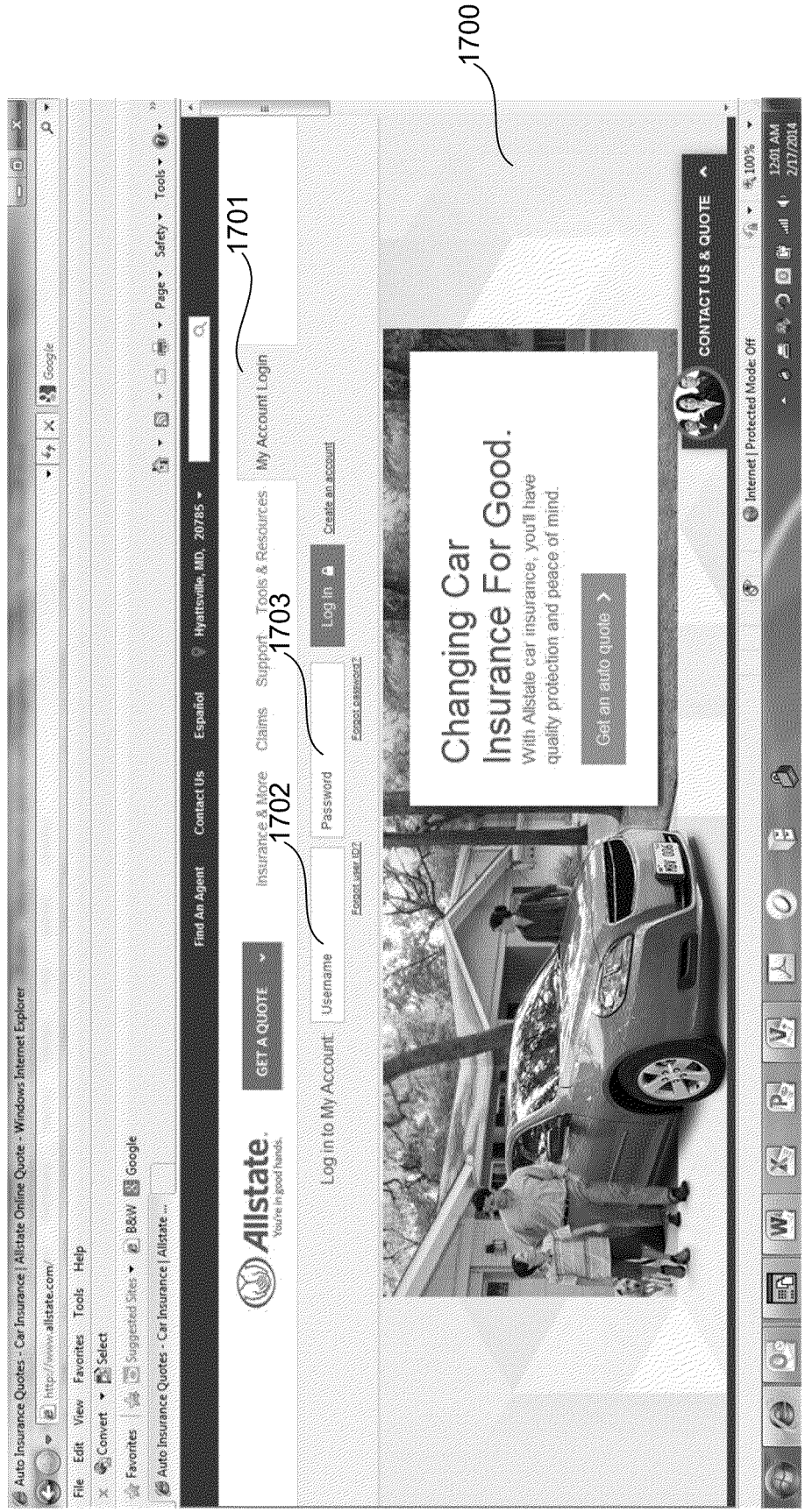
FIG. 17 illustrates an example webpage provided by a web portal in accordance with the present disclosure.

The account management system (e.g., the application server 205 thereof) may include a web portal to provide various interactive webpages in accordance with aspects of the disclosure. FIG. 17 illustrates a particular webpage 1700 of an organization's website provided by such a web portal. The webpage 1700 may be a home page of the website. As shown in FIG. 17, the webpage 1700 may include a link 1701 to log into an account (e.g., "My Account Login"). Selecting the link 1701 may cause a browser (e.g., a web browser, such as Microsoft Internet Explorer) to execute a script (e.g., JavaScript) to prompt the user for a username and/or password. In some cases, the prompt may appear on a separate webpage of the website or may appear on the same webpage 1700 as in FIG. 17. In the example webpage 1700 of FIG. 17, a username field 1702 and password field 1703 may appear. The user may then enter their specific username and password to access a specific webpage (or specific webpages) with their account information (also referred to herein as the "My Account Page").

Figure 18:
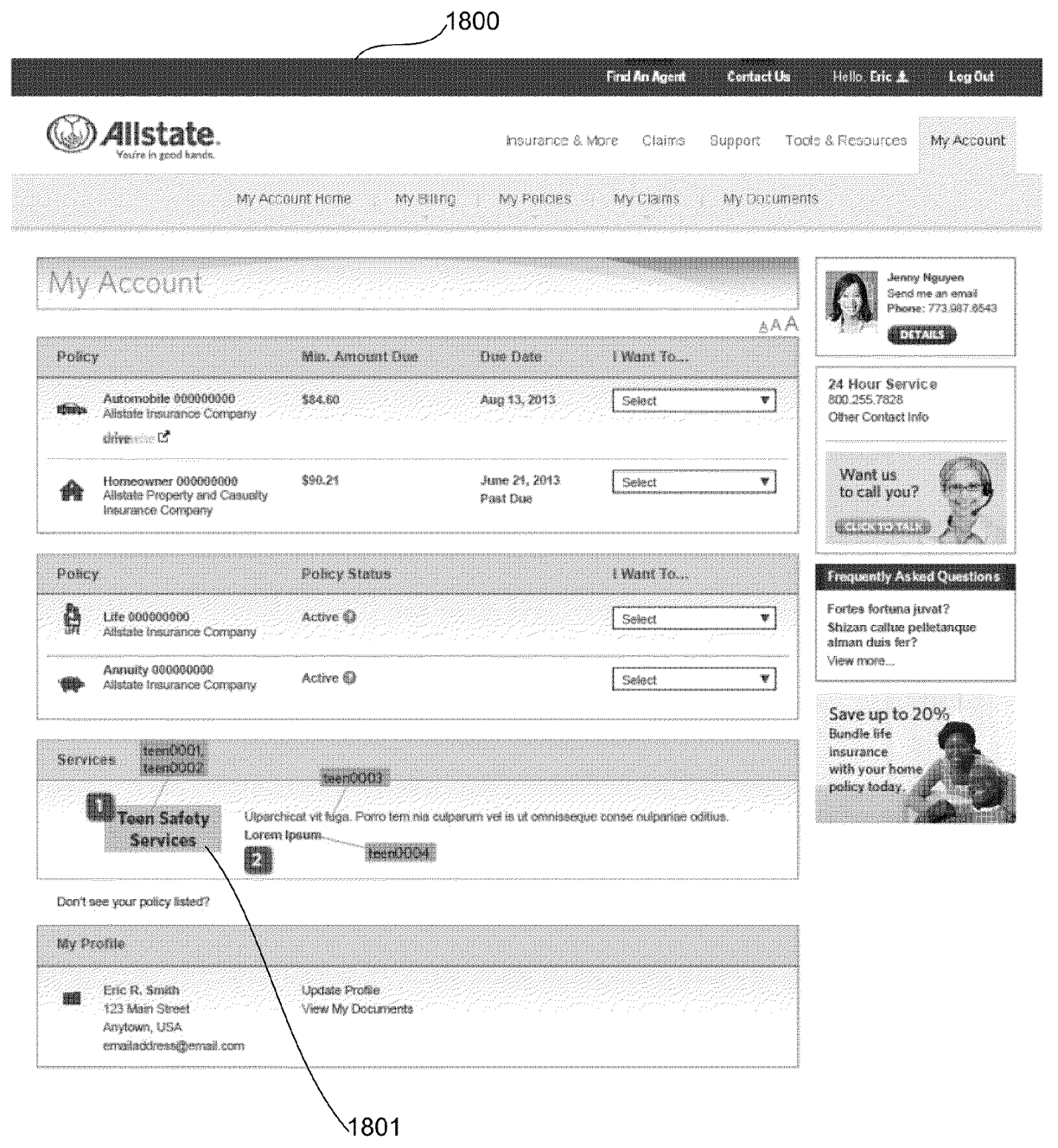

FIG. 18 illustrates an example My Account Page 1800 in accordance with aspects of the present disclosure. As shown in the My Account Page 1800 of FIG. 18, the user may view their policies (e.g., insurance policies), billing information (including past and current bills), and pending requests (e.g., pending insurance claims). Further, from the My Account Page 1800, a user may view and edit their profile, which may include personal information, such as the name, address, e-mail address, phone number, vehicle information, etc. of policy holders and their children. Further, the My Account Page 1800 may include one or more links to a webpage (or webpages) for providing particular services. As shown in FIG. 18, in some embodiments, the My Account Page 1800 may include a link 1801 to a webpage (or webpages) for providing aspects of the teen safety service described herein.

Figure 19:
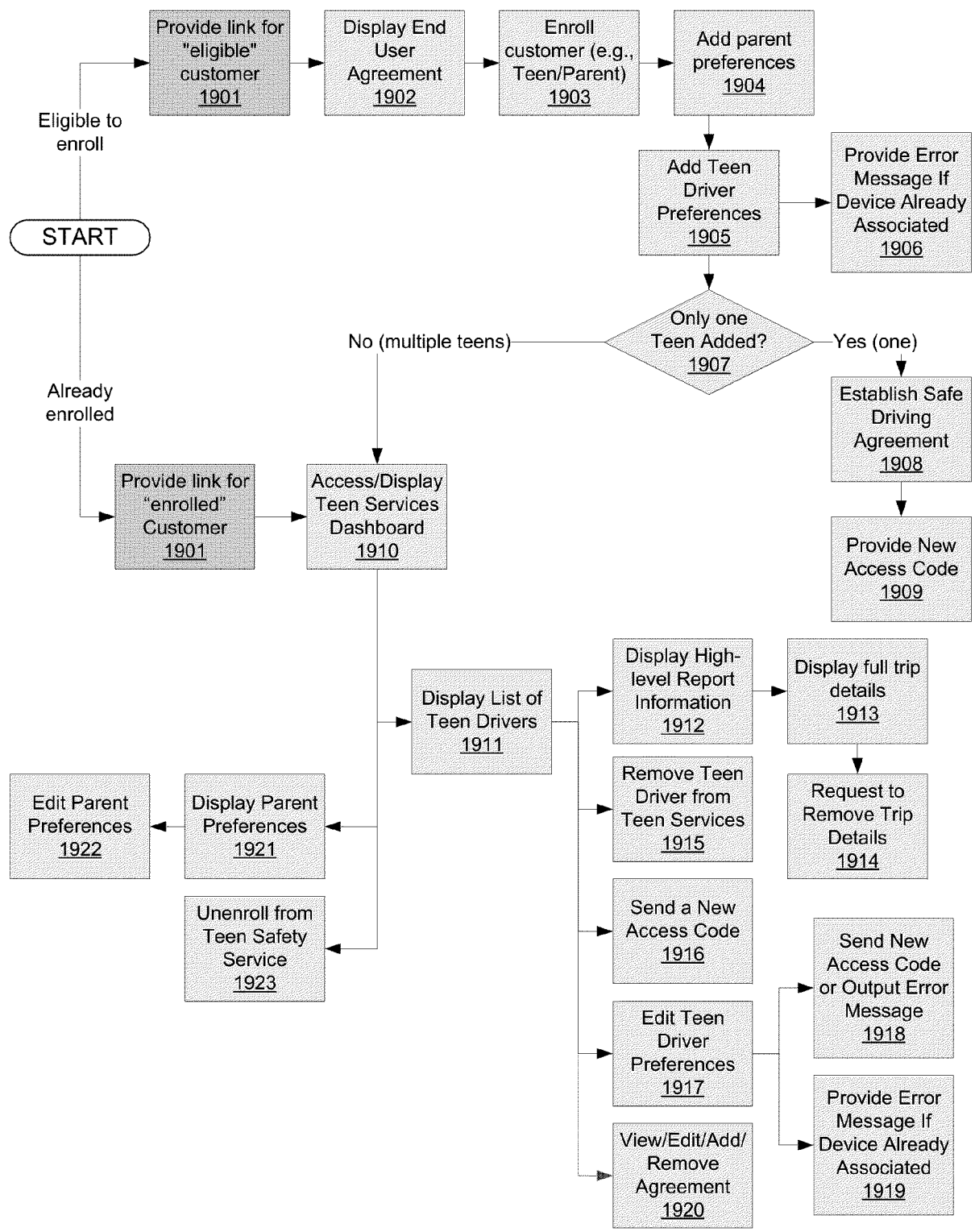
FIG. 19 illustrates a flow diagram of an example process in accordance with aspects of the present disclosure.

FIG. 19 illustrates a flow diagram for another example method in accordance with aspects of the present disclosure. In particular, FIG. 19 illustrates a plurality of steps of a method for interacting with one or more webpages designed to provide the teen safety service. Such interactions may include enrolling in the teen safety service, adding, removing, and/or editing preferences for one or more children (e.g., teens), viewing a teen dashboard, and establishing and/or editing a safe driving agreement. The steps of FIG. 19 may be performed by various computing devices disclosed herein. The various computing devices may include, for example, a parent computing device 100p (e.g., a desktop computer, laptop, tablet, smartphone, etc.), executing a browser to access webpage(s) providing the teen safety service. Additionally, or alternatively, the various computing devices may include a computing device, such as an application server 205, that provides the webpage(s) providing the teen safety service. In other words, the code (e.g., HTML, JavaScripts, etc.) for carrying out the steps of FIG. 19 may be executed on various computing devices, such as a parent computing device 100p and/or an application server 205.

The method of FIG. 19 may begin when a customer (e.g., a parent) logs into their account to access their My Account Page 1800. At the time of logging in, an application server 205 may determine whether to provide the link 1801 on the My Account Page 1800 so that the customer may access webpages providing the teen safety service. In some cases, for example, where a customer does not have a child (or, in particular, does not have a teenager of driving age), the link 1801 might not appear on the My Account Page 1800. The determination of whether to provide the link 1801 may be made based on information previously obtained regarding the customer (e.g., information obtained when setting up an insurance policy) and/or information on laws, such as eligible driving ages, in the state where the customer resides. In some cases, the link 1801 may appear, but might not be active if the customer is not eligible for the teen safety service. Further, eligibility for the teen safety service may depend on a status of the customer (e.g., whether they are a regular customer paying a regular insurance premium or a preferred customer paying a higher insurance premium).

The method of FIG. 19 may begin with a step 1901 in which the link 1801 is provided on the customer's My Account Page 1800. If the customer selects the link 1801, but is not already enrolled, the application server 205 may provide a webpage displaying information regarding the teen safety service (e.g., a brief description of features of the service) along with an end user agreement at step 1902. If the user agrees to the end user agreement, an application server 205 may enroll the customer (e.g., parent) and/or a teen into the teen safety service at step 1903. Such enrollment may include storing information representing the customer's acceptance of the end user agreement. This information may be stored in association with other customer account information, such as a customer profile.

In step 1904, the parent may interact with a webpage to add preferences. Such preferences may include preferences indicating how and when the parent would like to be contacted. For example, the parent may indicate whether they would like to receive notifications via email, text messages (e.g., SMS or MMS messages), and/or other forms of communication. As disclosed herein, the notifications may be sent to a parent as their teen drives or rides in a vehicle and/or after their teen completes a trip (either as a driver or passenger). Depending on how the parent would like to be notified, the parent may be required to enter different contact information. For example, if the parent would like to receive notifications via email, the parent may be required to provide an email address. Or, for example, if the parent would like to receive notifications via a text message, the parent may be required to provide their telephone number (e.g., cell/mobile phone number). In addition, if the parent chooses to receive notifications via a text message, a text message opt-in procedure may be performed. In the text message opt-in procedure, a query text message, e.g., asking the parent if they would like to opt-in, may be automatically sent to the parent's mobile/cell phone (e.g., parent computing device 100p). The account management system may interface with a cellular service provider to cause this query text message to be sent to the parent. Upon receipt of the query text message, the parent may use their mobile phone to send a return text message indicating that they confirm receipt and/or agree to opt-in to receive notifications via text messages going forward. This text message opt-in procedure may help to ensure that notifications will be successfully sent to the correct phone. After the return text message is received by the account management system (e.g., an application server 205), the webpage for collecting parent preferences may be updated to reflect that the parent has opted-in to receive text message notifications. In some embodiments, if the parent chooses to receive text messages but does not send a return text message, the webpage may be updated to reflect that the opt-in procedure is incomplete. In particular, the webpage may be updated to reflect the status of the procedure (e.g., awaiting a return text message).

In step 1905, the parent may add preferences for a child (e.g., teen driver preferences). For example, the parent may create a profile for their teen driver including information about their teen driver (e.g., the teen's name, date of birth, license number, etc.). The parent may also provide contact information for their teen driver, such as an email address and/or phone number (e.g., mobile phone number), and other information regarding the child computing device 100c used by the teen to collect drive data, such as a serial number of the device, a platform of the device (e.g., iOS, Android, etc.), and the like. Further, the parent (or teen) may designate preferences indicating when and how notifications should be sent to the teen (e.g., to the child computing device 100c). For example, the parent or teen may indicate that the teen should receive notifications via email, text messages (e.g., SMS or MMS messages), and/or other forms of communication. If the user selects to send notifications to the teen via text messages, the text message opt-in procedure may be performed for the child computing device 100c of that teen. Specifically, a query text message may be sent to the teen's mobile phone, and the teen may be required to send a return text message to confirm and/or agree to opt-in to receive notifications via text messages going forward.

Upon completion of step 1905, the information of the teen may be associated with a unique child computing device 100c (e.g., the teen's cell phone). If the cell phone of the teen is already registered, e.g., to another person (e.g., another child), the webpage may display an error message at step 1906. Accordingly, the account management system may ensure that each teen is properly tracked by ensuring that it has a unique child computing device 100c for each teen.

Step 1905 may be repeated for each teen the parent would like to monitor. That is, the parent may add preferences for multiple children at step 1905. In step 1907, it may be determined whether the parent has added preferences for multiple children or just a single child. If the parent has only added preferences for one child, step 1908 may be performed to establish an agreement, such as the safe driving agreement, for that child. Step 1908 may include providing an interactive webpage (or multiple interactive webpages) for the parent and/or teen to use to create the safe driving agreement. The interactive webpage may include a customizable template for the parent and/or teen to create a custom safe driving agreement. The interactive webpage may suggest that parents and teens create the safe driving agreement together, so that the terms of the agreement are understood and agreed upon by both parties. The parent and/or teen may enter information into fields of the template to create a unique agreement. For various reasons, different parents may want to place different restrictions on their children.

Figure 20:
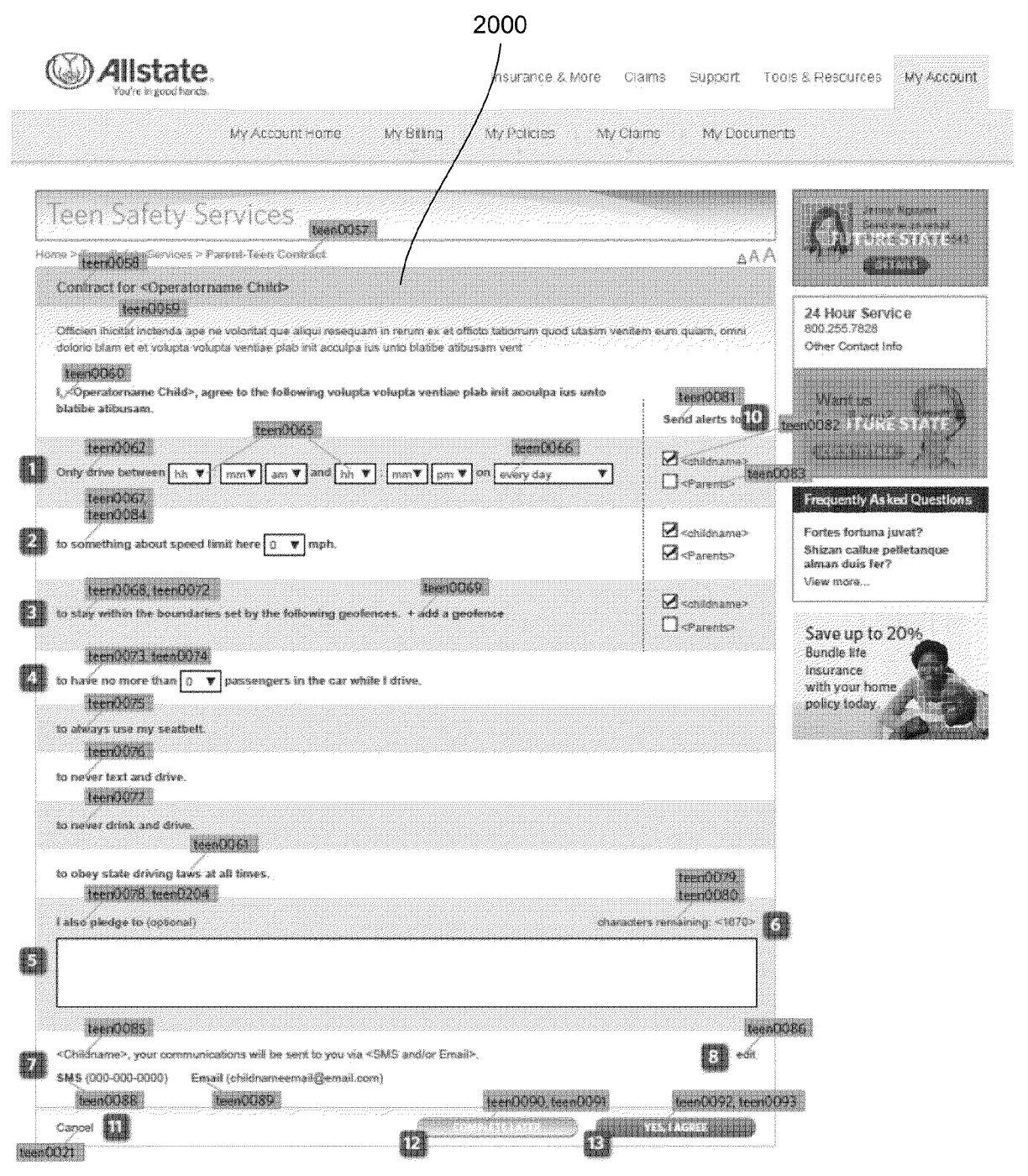

FIG. 20 illustrates an example webpage including a template 2000 for generating a contract, such as the safe driving agreement, in accordance with aspects of the present disclosure. As shown in FIG. 20, the template 2000 may include a number of fields for collecting information from a user (e.g., parent and/or teen). The fields may include various HTML elements, such as text boxes, radio buttons, check boxes, drop-down menus, etc. In some embodiments, the template 2000 may be divided into sections to collect various parameters for establishing various terms of the safe driving agreement.

In an introduction section, the teen driver may enter his/her name to reflect that they have read and understood the terms of the agreement. By requesting the teen to enter his/her name, the safe driving agreement may instill in the teen a feeling of commitment to the terms of the agreement.

In another section of the template 2000, teens and/or parents may specify the times and dates that the teen is allowed to drive under the safe driving agreement. For example, the parent may only allow the teen to drive between 7am and 6pm on weekdays and 7am and 9pm on weekends. In some embodiments, the available times may be restricted by applicable curfew laws. For example, if a curfew law in the town, county, state, etc. where the teen resides requires teens to be off the roads between 8pm and 5am, then the template 2000 may prevent the safe driving contract from specifying a time earlier than 5pm or a time later than 8pm. In other words, if the teen or parent attempts to set the night curfew of the agreement to 9pm when the state curfew is 8pm, the template 2000 may provide a warning. The warning may indicate that the terms of the agreement are not commensurate with the law. As such, the process of establishing the safe driving agreement may help to educate teens and parents of applicable laws, such as curfews.

In yet another section, teens and/or parents may specify a maximum speed that they are permitted to drive. The set speed may be in relation to the speed limit of the road. For example, the safe driving contract may include a field for specifying how many miles under or over the speed limit the parent will allow their teen to drive. If the parent selects, e.g., five (5) miles per hour (mph) over the speed limit, then the parent may receive a notification if the teen drives more than 5 mph over the speed limit.

In still another section, teens and/or parents may enter parameters so that the safe driving agreement sets forth a geo-fence. The template 2000 may include a link to another interactive webpage displaying a map that allows the users to draw a geo-fence (e.g., draw a circle, select points of a polygon, etc.) on the map. The map displayed may be based on the residence of the parent and/or teen or IP address associated with the browser being used to view the interactive webpage. For example, the web portal may access an address in the profile of an insurance policy holder to determine which map to present when a user attempts to establish a geo-fence through the safe driving agreement. Further, multiple geo-fences may be set up for a single child/teen, and each geo-fence may be given a name so that the parent may be informed which geo-fence is violated if a violation were to occur. For example, the safe driving agreement may include one geo-fence called school that aims to designate an area that a teen is permitted to drive when driving to school, and another geo-fence called basketball practice that aims to designate an area that the teen is permitted to drive when driving to basketball practice. It should be understood that numerous geo-fences may be set up for various expected trips.

Still another section of the template 2000 may be designed to capture information regarding the number of passengers a parent is willing to permit their teen to have in the vehicle while operating the vehicle. For example, the parent might not want the teen to drive with too many other people in the vehicle because the parent may be concerned that the teen might be persuaded to make bad driving decisions and/or may become distracted. Thus, the safe driving agreement may set the maximum number of passengers to, e.g., one (1), so that the teen will agree to drive with at most one passenger. In some cases, the safe driving agreement may include names of specific passengers that the teen is permitted or not permitted to have as passengers.

The template 2000 may include another section with example clauses for inclusion into the safe driving agreement. The teen and/or parent may choose which clauses to add to the safe driving agreement. Example clauses for the teen and/or parent to select from include a pledge to always wear a seatbelt, never send a text message or play with a phone while driving, and never drink and drive (e.g., drive while intoxicated).

In addition, the template 2000 may include a text box for parents and/or teens to draft their own clauses. For example, the teen may draft his/her own pledge to perform certain safe driving behaviors, like keeping a vehicle properly maintained and in good condition.

While some particular aspects of the template have been described herein, it should be understood that fewer or more aspects may be implemented with the safe driving agreement. Further, although not shown in FIG. 20, the safe driving agreement may specify goals, such as driving for a week without violating a curfew. The template 2000 may be modified to specify rewards for meeting goals as well as penalties for not reaching the goals or penalties for violating the agreement. The rewards and/or penalties may be based on cash or virtual points.

Returning to the method of FIG. 19, after the safe driving agreement is established and stored at step 1908, a new access code (or activation code) may be provided at step 1909. The access code may be provided through the web portal or sent as a text message or email to the child computing device 100c associated with the teen for which the safe driving agreement was created. The access code may be used by the teen or parent to activate a program, such as the child device program, on a child computing device 100c (e.g., the teen's smartphone).

If the parent has entered preferences for multiple teens (NO at step 1907) or is accessing the web portal after already enrolling in the teen safety service, step 1910 may be performed. In step 1910, a teen services dashboard may be accessed. The teen services dashboard may function as a base page for other webpages related to the teen safety service. From the teen services dashboard, the parent may choose to display a list of teen drivers at step 1911. Parents may have multiple teen drivers, and thus, may be tracking the driving behavior of multiple teens. The list of teen drivers displayed in step 1911 may include one or more names of the teenage drivers the parent is tracking. From the teen services dashboard, the parent may choose to display high-level report information at step 1912. The parent may also then choose a particular trip to display all details regarding that trip at step 1913. The parent may further request to remove the trip details at step 1914.

Further, at step 1915, the parent may request to remove a teen driver from the teen safety service. By removing the teen driver from the teen safety service, the parent may end (or terminate) the process for monitoring a particular teen driver. Such selection may be made, for example, when a parent becomes confident in their child's ability to drive and trusts their child to make wise driving decisions.

In step 1916, the parent may choose to send a new access code. This step may be performed when a child/teen gets a new mobile phone or needs to reinstall the child device program. Also, at step 1917, the parent may edit teen driver preferences and/or add preferences for a new teen driver. Step 1917 may be similar to step 1905 discussed above. If a new teen driver is added, a new access code may be sent in step 1918. However, if teen driver preferences are edited and a teen driver is not added, step 1918 might not be performed to send a new access code. In some embodiments, whether a new access code is sent at step 1918 may be depend on the type of edits made to the teen driver preferences. If, at step 1917, the parent attempts to associate the teen with an incorrect mobile device, such as a device assigned to another teen, an error message may be provided at step 1919. Step 1919 may be similar to step 1906 discussed above.

Additionally, at step 1920, the parent may view, edit, remove, or add a safe driving agreement for any of the teens that the parent is monitoring. If the parent is monitoring the driving behavior of multiple teens, the parent may have multiple safe driving agreements. Each agreement may be tailored to the particular teen the parent is monitoring.

In some cases, after accessing the teen services dashboard at step 1910, the teen services dashboard may display the contact preferences of the parent at step 1921. In step 1922, the parent may then choose to edit their preferences, such as how and when they are sent notifications. Step 1922 may allow the parent to change the preferences they set up in step 1904 discussed above.

Also, from the teen services dashboard, the parent may choose to un-enroll from the teen safety service at step 1923. For example, if the parent no longer wishes to monitor their children or no longer has teenage children, the parent may wish to un-enroll from the teen safety service.

After enrolling in the teen safety service and establishing a safe driving agreement as described with respect to FIG. 19, a teen may activate his/her mobile phone (e.g., child computing device 100c) to execute a child device program to allow drive data to be collected. The teen may download and install the child device program to their mobile phone. Once installed, the teen may select the child device program from among a list of applications in order to cause the mobile phone to execute the child device program. The first time the teen executes the child device program, the teen may be prompted for the activation code (or access code) provided in step 1909 upon establishing the safe driving agreement. An example of this prompt is shown in the interface 1005 of FIG. 10. After entering the appropriate activation code, the teen's mobile phone may begin to collect drive data.

Further, entering the activation code may allow the teen to access a menu page similar to the user interface 1100 of FIG. 11. From this menu page, the teen may select a link (e.g., "Teen Agreement" in user interface 1100) to view the safe driving agreement that the teen and/or parent established via the web portal. The teen's mobile device (e.g., child computing device 100c) may be able to provide the corresponding safe driving agreement based on the activation code or other information identifying the teen. For example, upon activation, the child device program may retrieve the correct safe driving agreement by providing a member device ID (e.g., telephone number of the teen's mobile phone or other unique ID corresponding to the child and/or child's phone) to the account management system which in turn may respond by providing the corresponding safe driving agreement (or parameters set forth therein). In some embodiments, the safe driving agreement may be retrieved by passing the member device ID as a JSON parameter to middleware using the HTTPS GET method or HTTPS POST method, and the middleware may interface with a server (e.g., application server 205) to supply the appropriate safe driving agreement in response.

In addition, from the menu page, the teen may select another link (e.g., "Badges" in user interface 1100) to view badges that the teen achieves based on his/her driving performance. The child device program may retrieve the corresponding badges in a similar manner used to retrieve the corresponding safe driving agreement (e.g., by providing a member device ID to the account management system). The account management system may keep a record of the number of badges and which badges a teen has earned. As the teen operates the vehicle 202, drive data may be sent to the application servers 205. Such drive data may be sent during a trip or after a trip is completed. In any event, the application servers 205 and/or other computing devices of the account management system may evaluate the teen's driving performance based on the drive data and may award badges as appropriate. Different teens may be awarded different badges (e.g., depending on their age, gender, interests, etc.). For example, an 18 year old boy may get a first badge (e.g., blue-colored badge), while an 18 year old girl may get a second badge (e.g., a pink-colored badge) for a similar driving performance. Also, different teens may be held to different standards depending on various factors, such as where they live or drive (geographic information), how old they are, demographic information, what vehicle they are driving, etc.

If the account management system determines that a badge is to be awarded based on drive data, the account management system may transmit a notification to the child computing device 100c (e.g., teen's mobile phone) to inform the teen of their achievement. Notifications that badges have been earned may be sent during a trip or after a trip so as not to distract the teen while driving. If a notification is sent during a trip, the child device program may output the notification as an audible message so that the teen may be informed of the badge without having to take his/her eyes off the road.

Various types of badges may be awarded for various performances. For example, a "Newbie" badge may be awarded the first time a trip is recorded. Another badge (e.g., "Feather Foot" badge) may be awarded to a teen, if the teen operates a vehicle for a certain distance without exceeding the speed limit or a parent-imposed speed restriction. Yet another badge (e.g., "Smooth Operator" badge) may be awarded to a teen, if the teen operates a vehicle for a certain number of trips without a hard-breaking event. Different badges may have associated points that may go into a virtual bank for the teen. The teen can then use the points to redeem prizes.

In addition to, or instead of, receiving badges and/or points, users may receive prizes for their driving performance. For example, the account management system may send a notification after a teen completes a trip (or while the teen is driving) indicating that the teen has earned a gift card (e.g., an iTunes gift card). In some embodiments, the account management system may determine whether the drive data complies with the terms of the safe driving agreement to determine whether the teen should receive a reward or be penalized and to determine the degree of the reward or penalty. If the teen complies with the terms of the agreement they may receive a reward or a bonus reward (e.g., a multiple of the typical reward given for the same driving performance). In contrast, if the teen fails to comply with the terms of the agreement, the account management system may choose a challenge and notify the teen of the challenge. For example, if the teen breaches the speed restrictions of the agreement, the account management system may challenge the teen to drive a week without another speed violation. The challenges may be tiered and teens may choose which level (e.g., low, medium, high) of the challenge they wish to accept. Successful completion of the challenge may help the teen avoid loss of points or prizes.

The rewards can be provided in a non-linear manner, such a logarithmic manner. The rewards may also be provided in a progressive manner, where a first reward (e.g., first badge) must be received before a second reward (e.g., second badge). In some cases, the rewards offered may be based on previous reward selections by the driver or others with similar characteristics or interests as the driver.

Further, the teen may also receive badges, points, and/or prizes for performing other tasks unrelated (or indirectly related) to driving. For example, a teen may earn a "Social Butterfly" badge for sharing the drive data from his/her trip. An aspect of the present disclosure provides an interface for allowing the teen to readily share details of their trip (e.g., how well they drove) and/or the rewards (e.g., badges, prizes, etc.) he/she received with social media networks, such as FACEBOOK and TWITTER. The child device program may include various options for teens to choose to share their trip details. If an option is selected, information indicating the selection may be transmitted to the account management system, which may interact with the appropriate social media network to post the trip details through the social media network. For example, the account management system may post the trip details on the teen's FACEBOOK page.

As discussed above, teens may choose a link from a menu to review the badges and/or other prizes they have received. Also, in some embodiments, when a teen completes a trip, an application server 205 may push a notification to the teen's mobile phone (e.g., a child computing device 100c), send a text message to the teen, and/or send an email to the teen for the purpose of informing the teen of his/her reward (if any). These, however, might not be the only ways teens may find out about their accomplishments. The web portal discussed herein may also provide a webpage that the teen may visit to review their awards. Such a webpage may also be used to redeem rewards (e.g., exchange points for prizes).

In some embodiments, at the completion of a trip, the child device program may indicate that a trip is complete and/or that the teen has received a message (which may relate to a reward, driving advice, or changes to the safe driving agreement). Such indication may be generated in response to receipt of a notification from the application server 205 after evaluation of the raw drive data. The indication may be in the form of a number (corresponding to the number of messages or number of trips completed) or an icon (indicating the presence of at least one message) appearing on at least a portion of the shortcut to the child device program shown on the desktop (or home screen) of the child computing device 100c. For example, if the teen has completed four trips, the number "4" may appear on an upper-right corner of the shortcut to the child device program thereby inviting the teen to review his/her trip. In another example, if the teen has received three notifications from the application server 205, the number "3" may appear over a corner of the shortcut to the child device program thereby inviting the teen to check their messages by opening the child device program.

The programs and systems described herein may implement a number of other features as well. For example, the account management system might limit rewards so that only teenage drivers (e.g., drivers between 15 and 19 years old) are eligible to receive them. Another feature may include the enforcement of a requirement that a minimum distance is traveled and/or a minimum duration is exceeded before the drive data is deemed to represent a trip. Yet another feature may include the ability of the child device program to prevent a user from opening the child device program or another application on their mobile phone while a trip is ongoing. Such feature may prevent the teen from becoming distracted while driving. In some embodiments, if the teen attempts to open the child device program (or another application) or to use their phone (e.g., to send a text message or make a phone call) while driving, the child device program may display an interface on the screen of the teen's mobile phone indicating that a trip is in progress and warning the teen to focus on the road. In addition, or alternatively, a notification that the teen attempted to open the child device program (or another application) or to use their phone while driving may be reported to an application server 205 and/or parent computing device 100p. Still another feature, referred to as the snooze feature, may allow a user to cause the child device program to enter a snooze mode in which it does not collect drive data for a set period of time. This feature may be useful so that the teen can prevent his/her mobile phone from capturing drive data when someone else is driving. A teen may instruct the child device program to go into snooze mode for a certain period of time so that the child device program does not automatically detect the start of a trip during such time.

Figure 21:
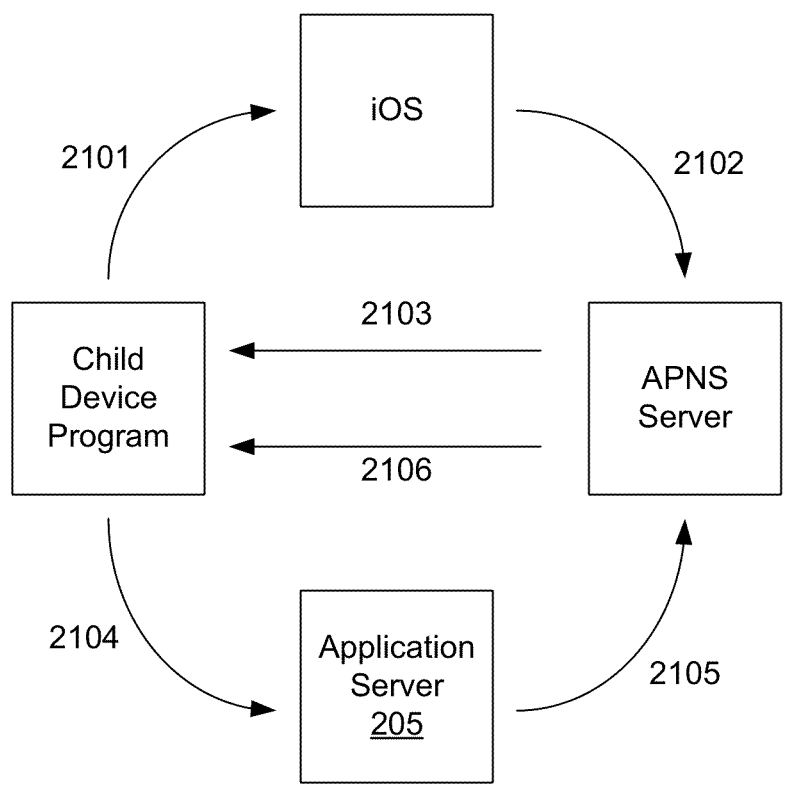
FIG. 21 illustrates another diagram in accordance with aspects of the present disclosure.

As disclosed herein, the application servers 205 may be configured to send various push notifications. FIG. 21 illustrates how such push notifications may be sent where the child computing device 100c includes the iOS operating system. As shown in FIG. 21, at step 2101, the child device program may register with the iOS operating system to receive push notifications. Then, at step 2102, the iOS operating system may transmit a request to the Apple Push Notification Service (APNS) server for a device token. At step 2103, the APNS server may transmit a device token to the child device program, which may then store the device token. The child device program may also transmit the device token to a specific server, such as the application server 205, at step 2104. At this point, the application server 205 may be configured to send push notifications to the child device program as it desires. For example, if the application server 205 determines that the child (e.g., teenager) has earned a new badge, the application server 205 may transmit a push notification, indicating that the new badge has been earned, to the APNS at step 2105. Then, at step 2106, the APNS may transmit the push notification to the child device program thereby informing the child (e.g., teenager) about the new badge.

Further, additional aspects of the present disclosure may relate to driving challenges. The present disclosure provides systems, methods, devices, and software that may create/generate driving challenges based on various factors. Also, the present disclosure provides systems, methods, devices, and software that may, among other functions, deliver driving challenges to drivers before, during, or after a trip/drive, determine whether a driving challenge is accepted or declined, determine whether a driving challenge is passed or failed, and determine rewards for attempting or completing a driving challenge.

Figure 29A:
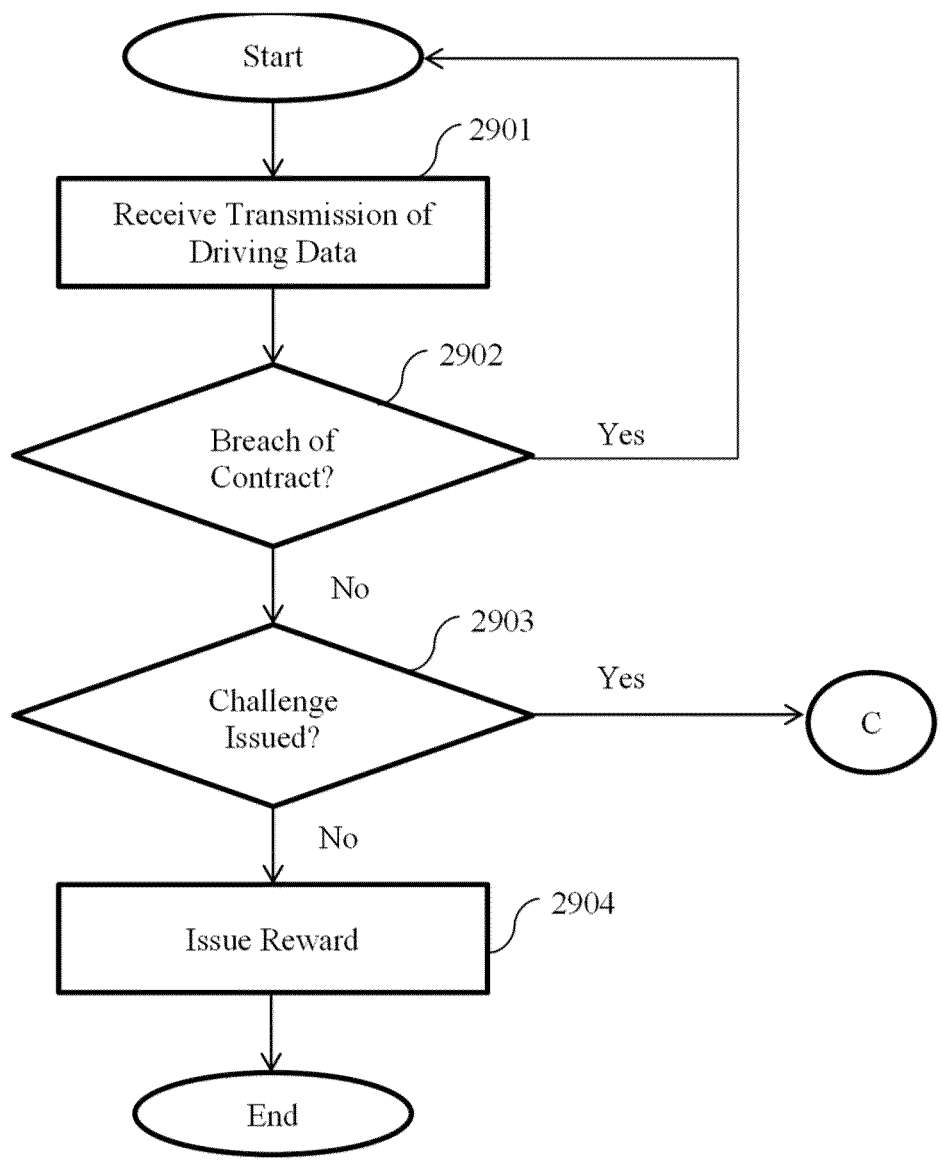
FIGS. 29A and 29B illustrate a flow diagram of an example process in accordance with aspects of the present disclosure.

FIG. 29A illustrates an example embodiment for using the transmitted driving data that may be received at step 445 as seen in FIG. 4B. In the method of FIG. 29A, once the data has been received at step 2901, it can be used to determine if there is a breach of the contract by the teen driver at step 2902. The contract may be a contract that has previously been agreed upon between the teen driver and parent and stored at location 405 as shown in FIGS. 4. The contract between the driver and the parent may allow the teen to enroll in the rewards program. The parents may set limits to the aforementioned contract variables, such as speed, curfew, driving mileage, geo-fence, and other things, and the teen may agree to follow them by signing the contract. Part of the contract may allow the teen to enroll in a rewards program. The teen may be able to collect rewards based on his/her driving performance in accordance with the contract. The parent may also be able to modify the variables of the contract as they see fit, and the contract changes may be transmitted to the teen.

In step 2902, the system may compare the driving data received to the terms of the contract and determine if the teen driver has breached the contract. If a breach is determined, meaning the teen driver has violated one or more terms of the contract, the driver may not have the opportunity to receive a reward or may be subject to a penalty. If the there is no breach, then the method may continue on to determine if there was a challenge issued at step 2903. If a challenge was issued, the method may move to a next step (follow C to FIG. 29B). If not, the teen driver may be able to collect a reward for driving well at step 2904.

In one embodiment, the rewards may be provided by a points system or a badge system that allows the driver to accumulate points or badges that can be later redeemed for prizes. For example, the teen may receive points or badges based on how long the trip is or how many trips were made in any given period of time (e.g., in a day) and whether the driver breached the contract during that period. Or, there may be a threshold for a certain number of breaches that a driver should remain below to receive the rewards. Or, the type and severity of the breach may be taken into account to determine the amount of points rewarded. The badges may hold a certain value that can be exchanged for some sort of prize. Or, if points are used, they may be redeemable for prizes. Prizes may include things, such as gift cards, movie passes, clothing, music downloads, etc.

Figure 29B:
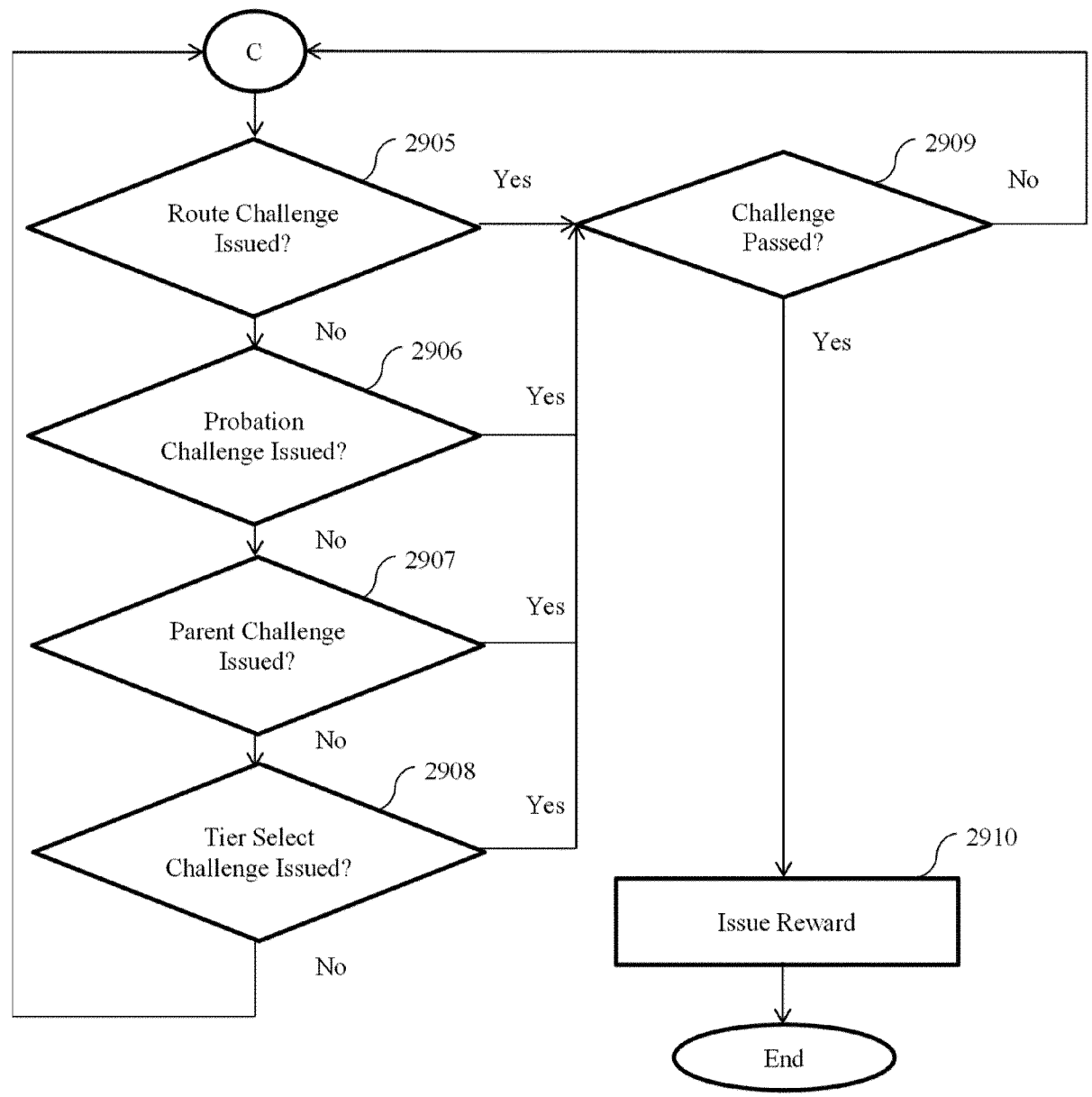

If a challenge is issued, then steps 2905-2908 may be executed to determine which type of challenge has been issued as seen in FIG. 29B. For example, a probation challenge (see step 2905) is one that may be issued as a result of continuous or repeated bad driving that could be based on a determination of a continuous breach of the contract or a determination of an unsafe driving behavior based on the data collected (e.g., bad braking). A challenge could be issued to challenge a driver to maintain a braking score under 4 for a next x amount of trips (where "x" is 1, 2, 3, etc.). The driver may receive a reward if the challenge is passed, or might not lose any points if the challenge is passed. In step 2906, the method may include determining whether to issue a route challenge. The route challenge may also be presented to a driver at step 2906. The route challenge could be created from trip information collected from the driver prior to their trip. For example, if the driver has submitted data indicating that they will be taking a long distance trip to their aunt's house, a challenge may be offered for the trip on the route that the driver plans to travel. In step 2907, the method may include determining whether to issue a parent challenge. The parent challenge may also be presented to a driver at step 2907. The parent challenge could be a challenge that a parent has issued to their teen driver. For example, if the parent has received one or more (e.g., numerous) alerts of speed violations, they could issue their own challenge to help correct a troubled area of the teens driving (e.g., a speed challenge where the driver would have to drive below the speed limit for the next x amount of miles or trips designated by the parent to pass the challenge). In some embodiments, the parent may have the option to choose from challenges already developed (e.g., challenges developed by an insurance company) to issue to the teen driver. In such embodiments, the parent may select a certain level challenge in a troubled area of the teen's driving. In step 2908, the method may include determining whether to issue a teen tier select challenge. The teen tier select challenge may also be presented to a driver at step 2908. The teen tier select challenge could be a challenge that is issued as part of a series of challenges to be issued (e.g., as part of a game). The teen tier select challenges may include challenges at different levels, e.g., speed challenge 1, speed challenge 2, or speed challenge 3. The difference in the difficulty in the challenges may allow for more rewards to be accumulated by the teen driver. For example, a speed challenge 1 may take into account speed data of the next 3 trips, and if the driver passes speed challenge 1, he/she may receive 100 points, while speed challenge 2 may take into account speed data of the next 7 trips, and if the driver passes speed challenge 2, he/she may receive 500 points. As opposed to taking into account a number of trips, the challenge may consider miles, days, or time spent driving. At step 2909, the method may include determining if the challenge has been passed. If the challenge is passed, a reward may be issued at step 2910. On the other hand, if the challenge is not passed, the system may look to see if another challenge has been issued. In various embodiments, there could be only one or any sub-combinations of the aforementioned challenges. Also, in some embodiments the teen driver may participate in one or more the challenges at the same time.

Figure 30:
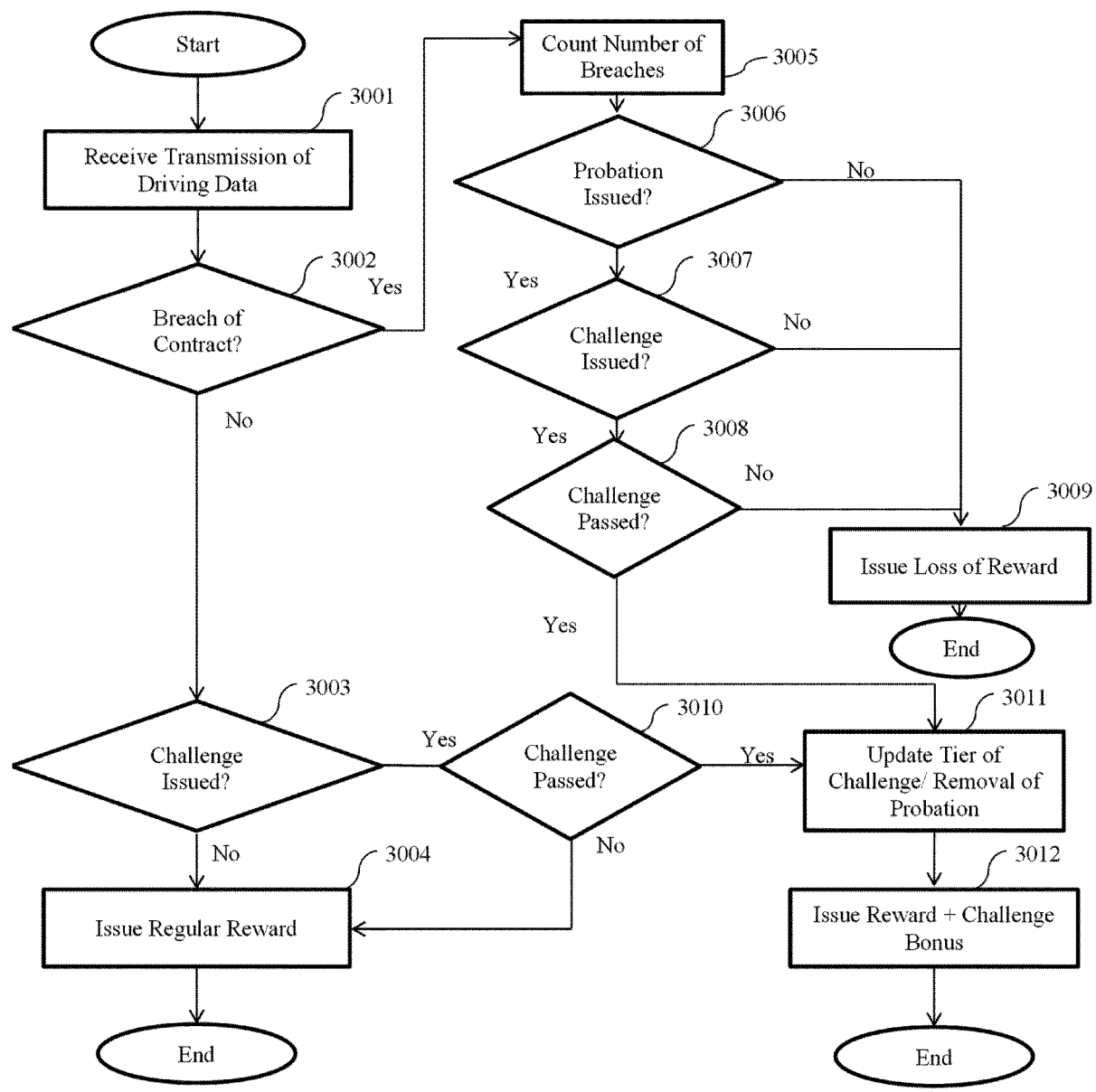
FIG. 30 illustrates a flow diagram of an example process in accordance with aspects of the present disclosure.

FIG. 30 illustrates a method of using the challenges and driving data to determine rewards. At step 3001, the driving data (such as driving data discussed with respect to step 421 in FIG. 4A) may be received. At step 3002, the method may compare the driving data to the contract data, and may determine if there is a breach of the contract by the driver. If there is no breach the method may continue on to step 3003 where the method may determine if there is a challenge to be issued. The type of challenge issued at step 3003 may be a tier challenge, a probation challenge, a route challenge, a parent challenge, a mileage challenge, a time challenge, any aforementioned challenge, etc. A mileage challenge may be a challenge where a driver has to complete a task or not fail a task for a certain amount of miles. For example, a mileage challenge may be one where the driver has to have good breaking for the next 100 miles. A time challenge may be a challenge where a driver has to complete a task or not fail a task for a certain amount of miles. For example, a time challenge may dictate that, for the next month, the driver must maintain a braking score or braking level under 4, where the braking score or braking level is calculated based on drive data collected during each trip a driver takes. If no challenge was issued at step 3003, the method may continue on to step 3004 where it is determined if a reward is to be issued to the driver. However, if at step 3003, the system determines that there is a challenge to be issued to the driver, the method may move to step 3010. Step 3010 may include determining if the driver passed the challenge, based on the received driving data. If it is determined that the driver did not pass the challenge, the method may continue to step 3004 where a reward may be issued to the driver. If it is determined, at step 3010, that the driver passed the challenge, the method may continue to step 3011. Step 3011 may include determining the tier of the challenge or if the challenge will remove the driver from probation, depending on the type of challenge that was originally issued to the driver. At step 3012, the system may determine whether the driver should receive a reward. In some embodiments, at step 3012, the system may determine that the driver will receive an enhancement for completing the challenge. The enhancement may be a challenge bonus where the driver may receive additional points, prizes, gifts, rewards, gift cards, movie passes, clothing, games, music downloads, etc. For example, if the driver is completing a speeding challenge worth 10 points, and receives a perfect score on the speeding challenge, then an additional reward of 5 points may be added the reward the driver receives. In various embodiments, at step 3012, the method may offer the driver a "double or nothing" challenge, where the driver has the option to forgo their reward and accept another challenge to receive compounded, bonus, additional, or any variation of more points, gifts, prizes, etc. if the driver passes the new additional challenge. For example, if the driver is offered 5 points, the driver may decline the 5 points in step 3012 in favor of taking on another challenge that offers a reward of 10 points.

If at step 3002, a breach of the contract based on the driving data is determined, the method may proceed to step 3005 where the breach of the contract by the driver may be logged or recorded by a breach counter. Next, the method may move from the step 3005 to step 3006. Step 3006 may be performed to determine if the number of breaches of the contract by the driver associated with the contract qualifies for probation. A driver may be put on probation (e.g., assigned a probation status) if their driving behavior is deemed to be particularly bad (e.g., as defined in the contract). While on probation, a driver might not be able to earn rewards and/or might not be able to receive challenges. Additionally, or alternatively, while on probation terms of the contract may set more limited restrictions. For example, a geo-fence may shrink or maximum speed the driver is allowed to drive may decrease. In some embodiments, a driver may remain on probation until a probation challenge is passed. Such a probation challenge may be a designated challenge given to any driver who is on probation in order to give drivers an opportunity to prove that their driving has improved so that they may get off probation and continue under the normal terms of the contract and/or continue receiving rewards.

In some embodiments, at step 3006, the system may determine if the number of the breaches of the contract by the driver exceeds the threshold of an acceptable predetermined number of breaches of the contract by the driver. If so, the method may move to step 3009. For example, the parent may set in the contract that three (3) speeding violations are acceptable. At step 3009, the method may include determining if the driver should have a reward deducted from the driver's reward bank. In various embodiments, at step 3009, the method may determine to not issue a reward to the driver. In some embodiments, a loss of a reward may result in a deduction of points, prizes, gifts, loss of clothing, moving passes, music downloads, etc. In various embodiments, a loss of reward may result in a deficit where the driver may have to make up the deficit, before the driver can earn an actual reward. In some embodiments, if it is determined that the number of breaches of the contract by the driver qualifies the driver to be placed on probation, then the method may proceed to step 3007. Step 3007 may include determining the severity of the driver's breach of the contract. If the system determines, at step 3007, that the severity of the driver's breach of the contract is too severe, the method may proceed to step 3009. For example, if the driver's breach of the contract was because the driver was driving 75 miles per hour, and the contract stipulates the driver to drive a maximum speed of 35 miles per an hour, the breach may be determined to be severe. In some embodiments, the contract may include the requirements/limitations for a severe breach of the contract. If the method determines, at step 3007, the driver's breach is not too severe, a challenge may be issued based on the driver's breach of the contract. For example, if the contract lists a maximum speed of 35 miles per hour and the driver goes 45 miles per hour, a speed challenge may be issued to driver to drive without exceeding 35 miles per hour for the next two trips. In various embodiments, at step 3007, the method may include issuing the challenge and placing the driver on probation until the challenge is completed, where the challenge is based on the driver's breach of the contract. If a challenge is issued to the driver at step 3007, then the method may proceed to step 3008. At step 3008, the system may determine if the driver passed the challenge based on the driving data. If, at step 3008, it is determined that the driver did not pass the challenge, the method may proceed to step 3009 where the driver may be penalized by loss of a reward. If, at step 3008, it is determined that the driver passed the challenge, the method may proceed to step 3011. At step 3011, the method may include determining the tier of the challenge or if the challenge will remove the driver from probation, depending on the type of challenge that was originally issued to the driver. At step 3011, the type of challenge may determine the level of reward available to the driver. At step 3012, the system may determine whether the driver may receive a reward and may record the reward in a reward bank associated with the driver. Recording the reward may include recording an identifier identifying the challenge that was completed in order to obtain the reward. As such, a driver may be reminded of how they obtained the reward, and therefore, may be incentivized to continue driving in a particular (e.g., safe) manner.

Figure 31:
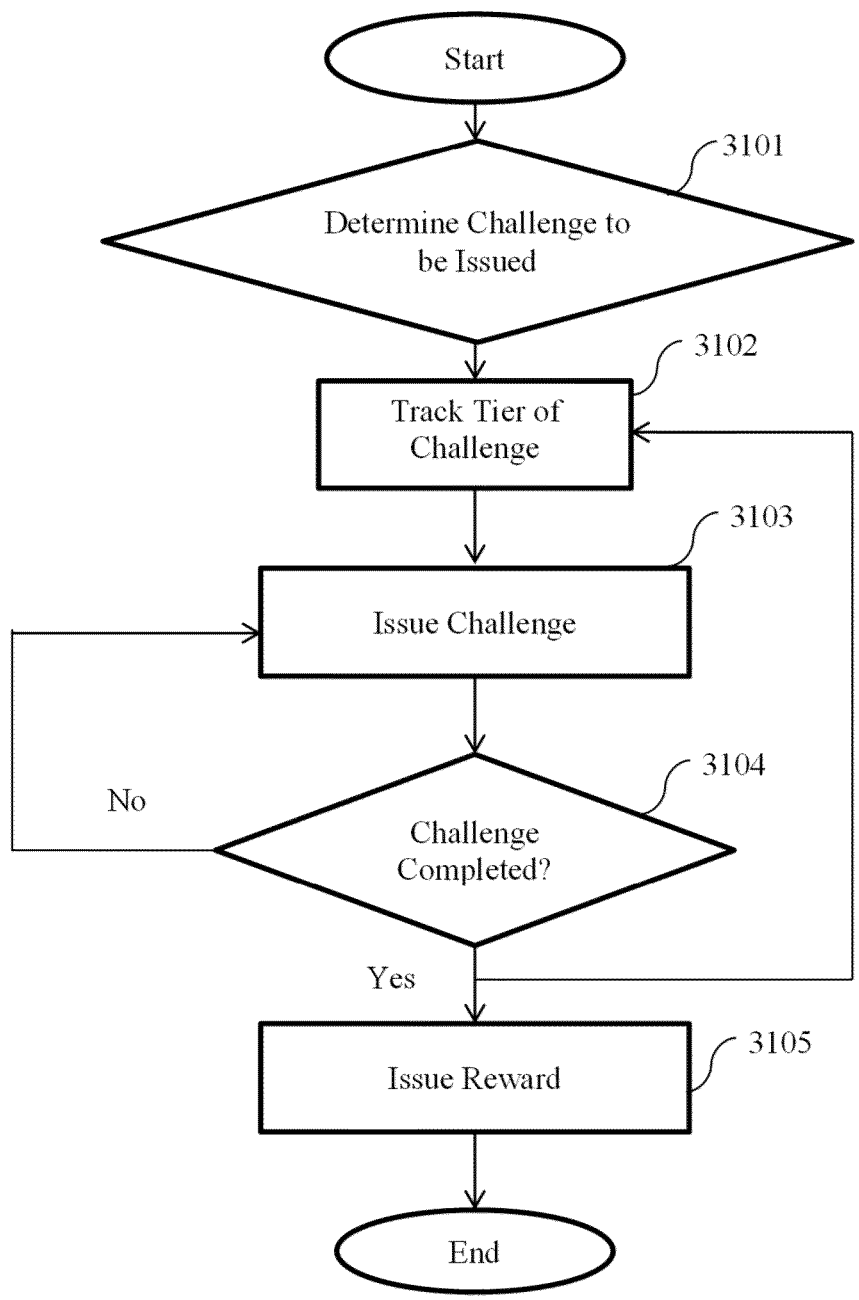
FIG. 31 illustrates a flow diagram of an example process in accordance with aspects of the present disclosure.

FIG. 31 illustrates an example embodiment for a method to track the tier of the challenges. The method may issue challenges based on a tier system. The tier challenge may comprise any aforementioned challenges. The driver may receive a challenge related to a certain predetermined level. In some embodiments, the predetermined level will be equated to a particular difficulty of the challenge. For example, a level 2 challenge may be more difficult than a level 1 challenge. In various embodiments, the tier system may be a based on a variety of different challenges. For example, to complete a level 1 challenge, the driver may need to complete a braking challenge 1, a speeding challenge 1, and a turning challenge 1 before the driver can move on to face a level 2 challenge which may comprise braking challenge 2, speeding challenge 2, and turning challenge 2. In some embodiments, the tier system may include a variety of challenges at various difficulty levels. In various embodiments, the driver may not move on to the next challenge or level of challenges until he/she completes the current level or group of challenges. In some embodiments, the challenges may be tiered in groups or individually (per a certain challenge area). For example, a driver may be able to focus on all speeding challenges before moving to a braking challenge. At step 3101, the method may include recognizing a request for a challenge has been issued. Once it is determined that a challenge is to be issued, the method may proceed to step 3102. At step 3102, the method may include checking the tier level of the challenge and determining the last challenge issued to and/or passed by the driver. The method, at step 3102, may include recording the last challenge issued until it receives an update from step 3101 that a new challenge has been issued or may recording a challenge that has been completed by the driver from receiving a notification from step 3104. Once the latest challenge status is recorded, at step 3102, the method may proceed to step 3103. At step 3103, the system may receive information from step 3102 and may issue the appropriate challenge to the driver. Once the appropriate challenge has been issued to the driver, the method may proceed to step 3104.

Step 3104 may include determining whether the driver passed the challenge. If the driver passes the challenge, the method may send information from step 3104 to the challenge tier tracker. The method may then include updating the challenge tier tracker to reflect that the driver passed the issued challenge. If it is determined, at step 3104, that the driver failed the challenge, information about the failure may be sent to the challenge tier tracker and the method may return to step 3103 to reissue the challenge to the driver. If it is determined, at step 3104, that the driver passes the challenge, the method may proceed to step 3105. At step 3105, the method may include determining to issue the driver a reward. However, in some embodiments, if the driver fails the challenge based on the received driving data, at step 3104, the method may proceed to step 3105 where the driver loses a reward or may be penalized. In various embodiments, a contract between a parent and a driver may determine the type of tier challenges that are issued or available.

In some embodiments, the contract between the parent and driver determines the types of challenges the driver needs to complete and/or attempt, the number of challenges, and the frequency of challenges. In some embodiments, the contract between the parent and the driver may determine a challenge path (i.e., listing out certain predetermined challenges for the driver to complete) for the duration of the contract, and the contract may detail milestones and goals for the driver to reach. In various embodiments, different rewards for different tiers of challenges the driver completes may be provided. Further, better rewards or a high number of reward points may be offered for the greater the level of the tier of challenges that the driver completes. In some embodiments, the method may include tier challenges with rewards that may link directly to certain prizes based on the challenge, challenge type, who selected the challenge, and where the driver is traveling. For example, a new set of tires may be provided for completing a braking challenge. In various embodiments, the method may allow for the driver to input their destination before driving, and the method may include issuing a challenge(s) based on the credentials of the trip e.g., time, distance, and possible routes. For example, one set of challenges may be issued for a first route from point A to point B, while another set of challenges may be issued for a second route from point A to point B. Also, for example, if the trip is a short trip, only one challenge may be issued, whereas multiple challenges may be issued for a long trip.

Figure 32:
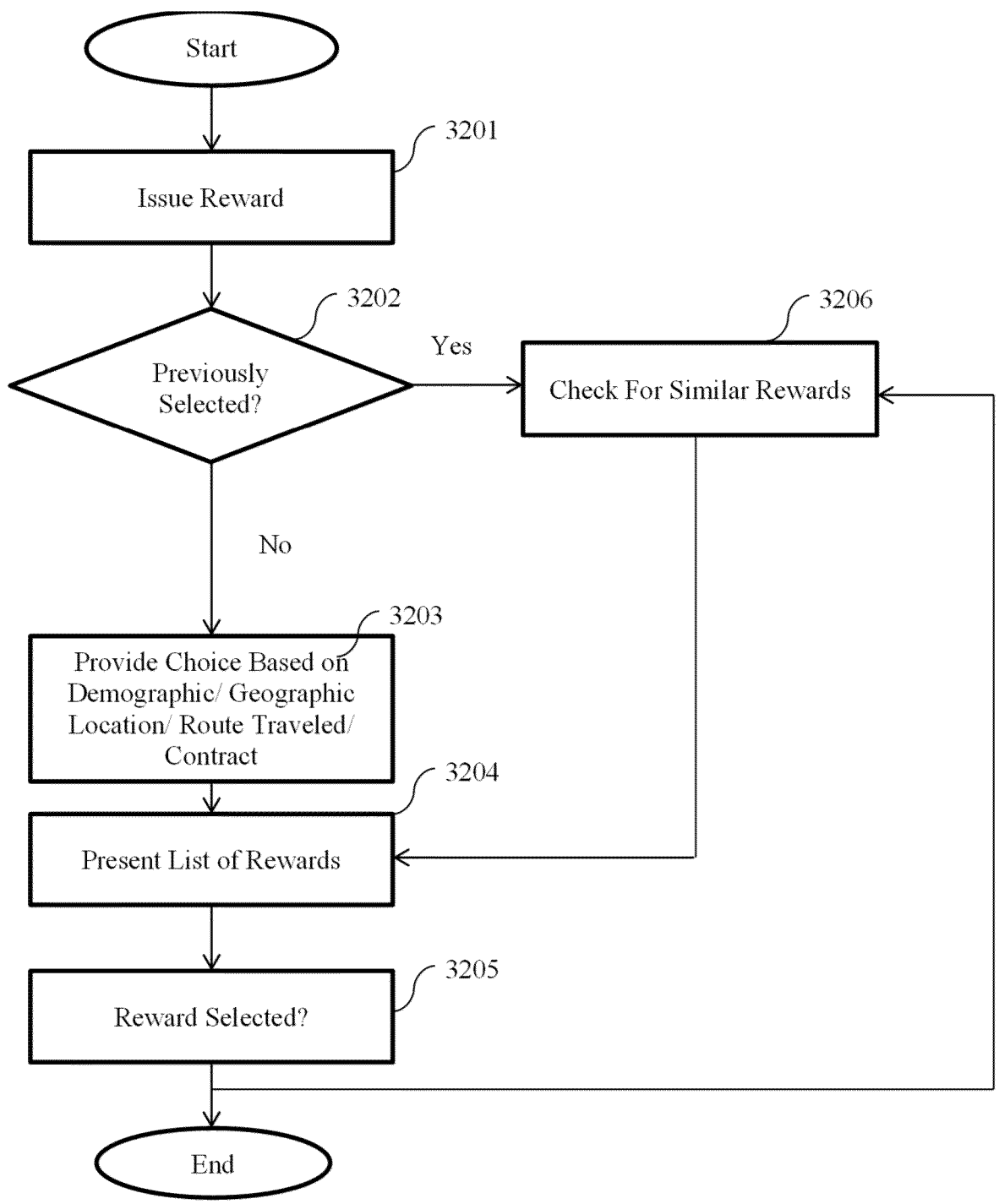
FIG. 32 illustrates a flow diagram of an example process in accordance with aspects of the present disclosure.

FIG. 32 illustrates an example embodiment of a method of how rewards may be determined and/or how potential rewards may be presented to the driver for the driver to choose from. Rewards may comprise things such as prizes, gifts, credits, points, and/or badges. Further, if the rewards are in the form of, for example, points, badges, or credits, such rewards may be exchanged to redeem other prizes that the driver may choose. The driver may also earn rewards by completing non-driving activities, such as interacting with a website, posting to select information to social media, and completing various tasks. For example, a company or other organization (e.g., an auto-insurance company) may award points for sharing the completion of driving challenges on social media, e.g., Facebook, Twitter, Instagram, and other social media tools. Alternatively, the driver may receive rewards for getting other friends to enroll and use the contract service or take on challenges. In some embodiments, a contract between a driver and parent may designate the rewards available to the driver based upon the parent or driver inputs (which parents and teenage drivers may negotiate). For example, in the contract the parent may determine which rewards are appropriate for the driver, or the parent may determine which rewards the driver gets based on which challenges are completed by the driver or if the driver doesn't breach the contract.

At step 3201, the method may include determining or receiving information that allows for rewards to be awarded to the driver and/or may be accumulated in a reward banking system. Eventually, the driver may exchange the points, credits, or badges for a redeemable prize or prizes. If the system determines a reward is to be awarded (e.g., because a reward has been earned by the driver) to the driver, the method may proceed to step 3202. At step 3202, the method may include determining if the driver has previously exchanged rewards for prizes before. At step 3202, the method may include determining whether the driver has previous selected a prize. If so, the method may move to step 3206. At step 3206, a list of similar prizes to the previous selected prize(s) may be produced. After the list is created, the method may proceed to step 3204. At step 3204, the list may be provided to the driver. At step 3202, it may be determined that the driver has not previously selected a prize, and thus the method may move to step 3203. At step 3203, the method may determine a group of prizes based on the driver's location, age, traveling routes, contract, and/or preference. For example, the method may determine from the contract, between a parent and driver, background information about the driver's interest to help generate prizes. In various embodiments, the method may determine a reward based on a challenge that was issued for a particular route. For example, if a driver completed a long distance route challenge, the system may offer a prize redeemable along the route traveled (e.g., if a driver is taking a trip along Route 66, a route challenge may be issued such that if the driver successfully completes the challenge, a reward for a free hamburger at any McDonald's™ located on Route 66 may be offered). In some embodiments, the contract may list the type of rewards that can be offered to the driver or types of rewards based on negotiations between the parent and teen driver. After the list of potential prizes is generated, at step 3203, the method may proceed to step 3204. At step 3204, the list of prizes may be provided to the driver. Once the driver has the list of prizes, at step 3204, the method may proceed to step 3205. At step 3205, the driver may select a prize. Once a prize is selected by the driver, the system may store information about the selected prize so it may be used to match similar prizes the next time the driver redeems a prize. In some embodiments, the driver may forgo selecting a prize to accumulate more points, rewards, credits, and/or badges before redeeming a prize.

Figure 33:
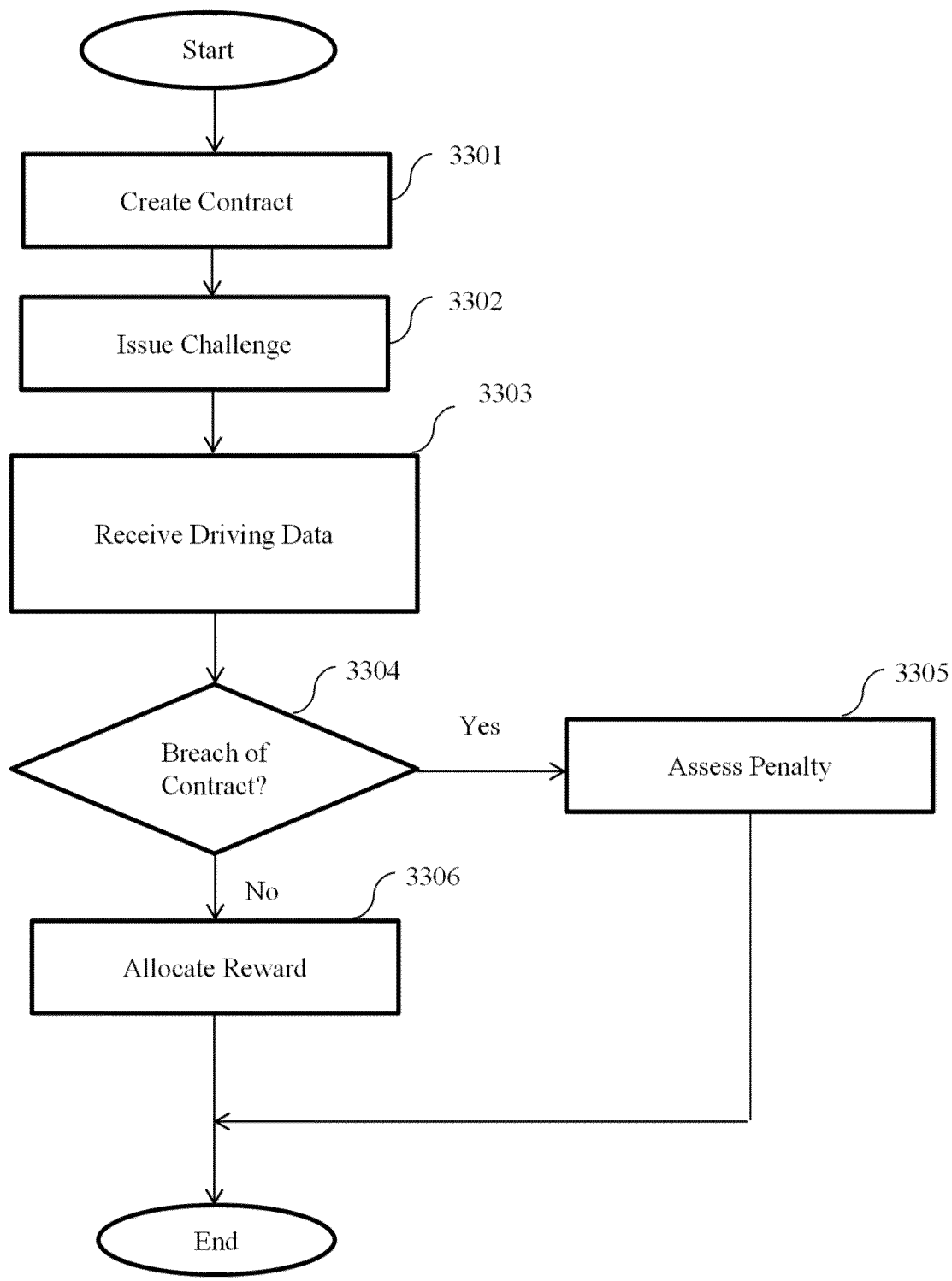
FIG. 33 illustrates a flow diagram of an example process in accordance with aspects of the present disclosure.

FIG. 33 illustrates an example embodiment for a method of determining if a driver (e.g., teenage driver) receives a reward based on an issued challenge, and then determining if a reward or penalty should be issued to the driver based on whether or not the driver violated the contract based on the system receiving driving data (such as driving data discussed with respect to step 421 in FIG. 4A). In various embodiments, the system may determine if the driver failed the challenge based on the driving data. At step 3301, the method may include creating a contract between the driver and the parent. In some embodiments, the contract may specify the types of challenges issued to the driver. Once a contract is created, at step 3301, the method may proceed to step 3302. At step 3302, the method may issue a challenge to the driver. The challenge may be issued based on a driver's preference(s), terms of the contract, or a parent's preference(s). In various embodiments, a parent may be able to select a challenge to be sent to the driver or the system may automatically select the challenge based on a parent preference(s). If a challenge has been issued to the driver, the method may proceed to step 3303. At step 3303, the method performs steps necessary for the driver to receive driving data (such as driving data discussed with respect to step 421 in FIG. 4A). Once the system has received the driving data at step 3303, the method may continue to step 3304. At step 3304, the method may include determining whether there is a breach of the contract. This determination may be performed by evaluating the driving data and determining whether the challenge issued in step 3302 has been passed or failed. Further, step 3304 may include determining whether failure of the challenge results in a breach of contract.

If a breach of contract is determined in step 3304, the method continues to step 3305 to assess any penalties that may be due. In various embodiments, prior to moving to step 3305, the system may cause a notification to be sent to a parent(s) to ask the parent(s) to confirm whether the breach is acceptable. For example, if the driver fails a challenge because he/she exits the geo-fence or has a speeding violation, the driver's parent may forgive the failure to prevent the driver from being penalized (e.g., effectively choosing not to enforce the contract). Such a feature may be particularly beneficial in a case where, for example, a parent forgot the teen driver was going to their aunt's house outside of the geo-fence, or the driver needs to use a different route that requires them to drive on the highway exceeding the set speed limit.

At step 3305, the method may determine a penalty to be imposed on the driver due to the driver's breach of the contract as a result of failing a challenge. The penalty may be but is not limited to: no reward, removal of rewards, or a removal of points. In some embodiments, the system may determine that the driver should be put on probation as a result of breaching the contract.

If it is determined that there is no breach of the contract due to a failure or passing of the challenge by the driver, the method may move to step 3306. At step 3306, a reward to be issued to the driver may be determined and allocated to a driver's rewards bank. The reward may be any number of types that have been previous mentioned but not limited to: gifts, prizes, points, badges, and any other type of reward for any type of reward system.

FIG. 34 illustrates an example embodiment of a method for determining the driver's insurance premium based on whether a challenge is passed or failed which is determined based on driving data (such as driving data discussed with respect to step 421 in FIG. 4A). At step 3401, the method may create a contract agreement between two or more of a driver, parent, and insurance company (e.g., an auto-insurance company). For example, step 3401 may include creating a contract between the driver and the insurance company, the parent and the insurance company, the driver and the parent, or all three of the driver, parent, and insurance company. Once a contract is created, at step 3401, the method may proceed to step 3402. At step 3402, the method may include receiving the driving data reflecting a driving performance of the driver. Once the driving data is received by the system, the method may move on to step on 3403. At step 3403, the method may include determining, based on the driving data, if the driver has passed or failed a challenge. In some embodiments, the contract may detail the credentials and qualifications for determining whether a challenge is considered to be passed or failed. In various embodiments, the insurance company may determine the standards for judging whether a challenge is passed or failed.. If the system determines that the driver passed a challenge, at step 3403, then the method may proceed to step 3404. At step 3404, the method may include calculating a decrease in the insurance rate (e.g., insurance premium) of the driver. The decrease in the insurance premium of the driver may be based on by how much the driver passed the challenge. In some embodiments, the more difficult the challenge is, the greater the decrease may be. Also, the amount of the decrease may depend on the type of challenge. For example, if a speeding challenge is passed, the decrease may be more than if a geo-fence challenge is passed. The decrease in the insurance rate may be implemented in the form of a discount on a future insurance premium (e.g., next year's insurance bill). If at step 3403, it is determined that a challenge was failed, the method may proceed to step 3405. At step 3405, the method may include calculating an increase in the insurance rate (e.g., insurance premium) of the driver. The increase in the insurance premium of the driver may be based on by how much the driver failed the challenge. In some embodiments, the more difficult the challenge is, the less the increase may be. Also, the amount of the decrease may depend on the type of challenge. For example, if a braking challenge is failed, the increase may be more than if a speeding challenge is failed. In some embodiments, the increase in rate may be implemented in the form of a short term adjustment, long term adjustment, a fine, or one time only adjustment.

In some embodiments, the contract may be an active document, where the parent and driver can change the agreed upon contract. For example, the parent may be able to change parameters of the contract such as speed or curfew based on the route and destination of the driver's trip. In various embodiments, the system may allow for the driver to make a request for a parameter change, such as a change to the geo fence. For example, the driver may use his/her phone to transmit a request for a change in area or change in speed along with a reason, like road closing, or going to use the highway. The parent may receive the request and accept or reject it.

In some embodiments, when the contract is set up, the challenges are agreed upon. For example, the parent and teen may decide the teen is to complete x number or challenges, or try x number or hard challenges, x number of medium challenges, and x number of easy challenges over a certain time period (where "x" is 1, 2, 3, etc.). In various embodiments, the method of forming the contract may involve the driver and the parent negotiating to agree on terms of the contract for certain periods of time such as days, weeks, months, trips, and/or based on the drivers schedule. For example, if the driver has soccer practices on Tuesday, Wednesday, and Thursday and the practices are at different times and at different places, the contract variables such as speed, geo-fence, and curfew could differ for each of those days. In some embodiments, the contract may contain a pre-approved list of routes for travel, or pre-approved list of routes for certain locations outside the geo-fence based on the destination for the driver. In various embodiments, the contract may be one where the parent and driver agree on how often points or badges could be exchanged for gifts. For example, the driver and parent may agree that the driver may redeem prizes at any time or at the expiration of the contract. In some embodiments, the contract might only be effective for a certain period of time (e.g., until the driver reaches a certain age or has been driving for a certain period of time) or for a variable amount of time (e.g., until a certain number of challenges are attempted and/or passed). In some embodiments, the contract, as agreed upon by the parent and driver, may detail which type or class of prizes the teen driver may redeem. In various embodiments, the contract may specify, outline, or otherwise describe goals and milestones agreed upon by the parent and the driver. For example, the driver and parent may agree that, and structure the contract so that, if the driver completes certain driving challenges (thereby exhibiting good driving behavior) for a certain amount of time, the driver may receive certain pre-determined rewards. In various embodiments, the contract may allow for the driver to input trip destinations and allows the parent to approve them.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A computing system comprising:
one or more processors; and
memory storing computer-executable instructions that, when executed by the one or more processors, cause the computing system to:
provide a template comprising a plurality of fields;
receive a plurality of parameters entered using the plurality of fields;
establish, based on the plurality of parameters entered using the plurality of fields, a digital contract, wherein the plurality of parameters set one or more conditions;
associate, based on one or more of the parameters, the digital contract with a first user associated with a mobile computing device;
receive, from the mobile computing device, a set of vehicle telematics data determined by at least one of an accelerometer, a global positioning system (GPS), and gyroscope of the mobile computing device during a plurality of trips;
monitor the mobile computing device for usage of applications while the vehicle telematics data indicate that the mobile computing device is in a moving vehicle;
determine, based on the vehicle telematics data, that the one or more conditions are not met;
receive, from the mobile computing device, an indication that one or more trips of the plurality of trips are not associated with driving carried out by the first user, wherein the indication is based on the usage of applications on the mobile computing device while in a moving vehicle;
determine a reduced set of the vehicle telematics data with vehicle telematics data associated with the one or more trips removed;
determine, based on the reduced set, that the one or more conditions are met; and
transmit, to the mobile computing device, a notification that the first user has met the one or more conditions.

2. The computing system of claim 1, wherein the one or more conditions is based on a driving condition for a respective trip.

3. The computing system of claim 1, wherein the computer-executable instructions, when executed by the one or more processors, cause the computing system to:
after establishing the digital contract, provide an access code for the mobile computing device to activate a computer program that configures the mobile computing device to transmit the vehicle telematics data to the computing system.

4. The computing system of claim 1, wherein the computer-executable instructions, when executed by the one or more processors, cause the computing system to:
prior to providing the template and based on determining that the first user is associated with an insurance policy of a second user, provide the second user with access to a webpage for establishing the digital contract.

5. The computing system of claim 1, wherein the computer-executable instructions, when executed by the one or more processors, cause the computing system to:
after determining that the first user passed the one or more conditions, determine a reward for the first user; and
store information indicating the reward.

6. A method comprising:
providing a template comprising a plurality of fields;
receiving a plurality of parameters entered using the plurality of fields;

establishing, based on the plurality of parameters entered using the plurality of fields, a digital contract, wherein the plurality of parameters set one or more conditions;

associating, based on one or more of the parameters, the digital contract with a first user associated with a mobile computing device;

receiving, from the mobile computing device, a set of vehicle telematics data determined by at least one of an accelerometer, a global positioning system (GPS), and gyroscope of the mobile computing device during a plurality of trips;

monitoring the mobile computing device for usage of applications while the vehicle telematics data indicate that the mobile computing device is in a moving vehicle;

determining, based on the vehicle telematics data, that the one or more conditions are not met;

receiving, from the mobile computing device, an indication that one or more trips of the plurality of trips are not associated with driving carried out by the first user, wherein the indication is based on the usage of applications on the mobile computing device while in a moving vehicle;

determining a reduced set of the vehicle telematics data with vehicle telematics data associated with the one or more trips removed;

determining, based on the reduced set, that the one or more conditions are met; and transmitting, to the mobile computing device, a notification that the first user has met the one or more conditions.

7. The method of claim 6, wherein the one or more conditions is based on a driving condition for a respective trip.

8. The method of claim 6, further comprising:
after establishing the digital contract, providing an access code for the mobile computing device to activate a computer program that configures the mobile computing device to transmit the vehicle telematics data.

9. The method of claim 6, wherein the establishing the digital contract comprises determining that the plurality of parameters comply with an applicable law.

10. The method of claim 6, wherein the establishing the digital contract comprises:
establishing a geo-fence within which the first user agrees to drive; and
indicating a telephone number to which a second notification is to be sent in case the first user drives outside of the geo-fence.

11. The method of claim 6, further comprising:
prior to the providing the template and based on determining that the first user is associated with an insurance policy of a second user, providing the second user with access to a webpage for establishing the digital contract.

12. The method of claim 6, wherein the template comprises one or more fields for establishing the one or more conditions.

13. The method of claim 6, wherein the receiving the vehicle telematics data is based on the mobile computing device having a battery level above a threshold.

14. The method of claim 6, further comprising:
receiving a first request for a challenge from the mobile computing device;
receiving a second request for a challenge from a second mobile computing device associated with an entity that is a party to the digital contract; or
receiving a third request for a challenge from an insurance company computing device associated with an insurance company managing one or more servers.

15. The method of claim 6, further comprising:
based on a determination that the one or more conditions are met, determining, based on the digital contract, a reward for the first user.

16. A system comprising:
a database configured to store a plurality of contracts in association with a plurality of insurance policies; and
one or more servers, comprising one or more processors, memory, and one or more network interfaces configured to communicate with a computing device, a first mobile computing device, and a second mobile computing device, wherein the one or more servers are configured to:
provide a template comprising a plurality of fields;
receive a plurality of parameters entered using the plurality of fields;
establish, based on the plurality of parameters entered using the plurality of fields, a digital contract, wherein the plurality of parameters set one or more conditions;
associate, based on one or more of the parameters, the digital contract with a first user associated with a mobile computing device;
receive, from the first mobile computing device, a set of vehicle telematics data determined by at least one of an accelerometer, a global positioning system (GPS), and gyroscope of the first mobile computing device during a plurality of trips;
monitor the mobile computing device for usage of applications while the vehicle telematics data indicate that the mobile computing device is in a moving vehicle;
determine, based on the vehicle telematics data, that the one or more conditions are not met;
receive, from the mobile computing device, an indication that one or more trips of the plurality of trips are not associated with driving carried out by the first user, wherein the indication is based on the usage of applications on the mobile computing device while in a moving vehicle;
determine a reduced set of the vehicle telematics data with vehicle telematics data associated with the one or more trips removed;
determine, based on the reduced set, that the one or more conditions are met; and
transmit, to the first mobile computing device, a notification that the first user has met the one or more conditions.

17. The system of claim 16, wherein the one or more servers are configured to:
determine that the first user is on probation for violating the digital contract; and
select another set of conditions designated for users on probation.

18. The system of claim 16, wherein the one or more servers are configured to:
determine that the first user failed to meet the one or more conditions; and
transmit, to the second mobile computing device, a second notification indicating that the first user has failed to meet the one or more conditions.

19. The system of claim 16, wherein the one or more servers are configured to:
determine the one or more conditions is further based on a location of the first mobile computing device or a route that the first user is expected to travel.

20. The system of claim 16, wherein the one or more servers are configured to:
receive, from the first mobile computing device, a token that enables the one or more servers to send push notifications to the first mobile computing device,
wherein the notification indicating that the first user has received a reward comprises a push notification transmitted to the first mobile computing device based on the token.

* * * * *